US012748609B2

(12) United States Patent
Sano et al.

(10) Patent No.: US 12,748,609 B2
(45) Date of Patent: Sep. 29, 2026

(54) ENHANCED CONTROLS FOR THE DISPLAY OF REAL-TIME TEXT IN CALLS AND MEETINGS

(71) Applicant: Microsoft Technology Licensing, LLC, Redmond, WA (US)

(72) Inventors: Christopher M. Sano, Seattle, WA (US); Ralph Georges Maamari, Kelowna (CA); Shery Sharonjit Sumal, Vancouver (CA); Purnima M. Rao, Bellevue, WA (US); Patrick A. Lyons, Redmond, WA (US); Yashu Xu, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 246 days.

(21) Appl. No.: 18/768,962

(22) Filed: Jul. 10, 2024

(65) Prior Publication Data

US 2026/0017070 A1 Jan. 15, 2026

(51) Int. Cl.

*G06F 9/451* (2018.01)
*G10L 15/26* (2006.01)
*H04L 12/18* (2006.01)

(52) U.S. Cl.

CPC .............. *G06F 9/451* (2018.02); *G10L 15/26* (2013.01); *H04L 12/1813* (2013.01)

(58) Field of Classification Search

CPC ...... G06F 9/451; G10L 15/26; H04L 12/1813
See application file for complete search history.

(56) References Cited

U.S. PATENT DOCUMENTS

2011/0145744 A1 6/2011 Haynes et al.
2011/0238734 A1 9/2011 Curry et al.
2014/0267579 A1* 9/2014 Montero ............... H04N 7/147 348/14.11

(Continued)

OTHER PUBLICATIONS

International Search Report and Written Opinion received for PCT Application No. PCT/US2025/034408, mailed on Oct. 30, 2025, 11 pages.

(Continued)

*Primary Examiner* — Mahelet Shiberou

(74) *Attorney, Agent, or Firm* — Scott Y. Shigeta; Newport IP, LLC

(57) ABSTRACT

The techniques disclosed herein provide enhanced controls for the display of real-time text (RTT) in calls and meetings. RTT is the ability for someone to send a text message on a character-by-character basis to everybody else in a call or meeting. The system disclosed herein integrates RTT, video, and live captions all in one central experience. This integrated experience allows users to participate equitably by making RTT accessible to users regardless of the operating mode they are in and still concurrently access other meeting content, including video streams, chat messages, live captions, transcripts, and artificial intelligence (AI) tools, such as Copilot. In one embodiment, during an online conference, in response to one of the attendees activating a RTT mode, when at least one user minimizes a meeting stage, such as for the purpose of multitasking while listening, the conference application maintains a display area for displaying RTT.

20 Claims, 48 Drawing Sheets

Example Process of Minimizing a UI with RTT and shared content: Receiving input to minimize / close the UI

(56) References Cited

U.S. PATENT DOCUMENTS

| | | | | |
|---|---|---|---|---|
| 2019/0171716 | A1* | 6/2019 | Weber | H04N 7/15 |
| 2023/0384914 | A1* | 11/2023 | Fitch | H04L 65/1089 |
| 2024/0154833 | A1* | 5/2024 | Zotto | G06F 40/40 |
| 2024/0163123 | A1* | 5/2024 | Legatski | G06F 3/013 |
| 2024/0163390 | A1* | 5/2024 | Hutto | H04N 5/2628 |
| 2024/0243938 | A1* | 7/2024 | Teng | H04L 12/1818 |
| 2026/0037114 | A1* | 2/2026 | Chang | G06F 3/04845 |

OTHER PUBLICATIONS

"Human Factors (HF); Real-Time Text (RTT) in Multiparty Conference Calling", ETSI Technical Report 103 708, V1.1.1, Retrieved From: https://www.etsi.org/deliver/etsi_tr/103700_103799/103708/01.01.01_60/tr_103708v010101p.pdf, Aug. 2022, 52 Pages.

Wijk et al., "Framework for Real-Time Text over IP Using the Session Initiation Protocol (SIP)", Network Working Group, Retrieved From: https://datatracker.ietf.org/doc/html/rfc5194, Jun. 2008, pp. 1-31.

* cited by examiner

Example Process of Activating RTT Mode: UI showing operating state before RTT Mode Example Process of Activating RTT Mode: UI showing selection of RTT Mode menu item Example Process of Activating RTT Mode: UI showing operating state in RTT Mode RTT Mode: UI region for RTT generated for each client participating in the communication session Devices 11E through 11H also mirroring the same activity RTT Mode: RTT is displayed on each client device as each character is entered by one user Devices 11E through 11H also mirroring the same activity Devices 11E through 11H also mirroring the same activity RTT Mode: RTT is displayed on each client device as each character is entered by one user Devices 11E through 11H also mirroring the same activity RTT Mode: RTT is displayed on each client device as each character is entered by one user Devices 11E through 11H also mirroring the same activity Example Process of Minimizing a UI with RTT and shared content: Meeting UI is reduced in size while the display of RTT is maintained Example Process of Minimizing a UI with RTT and shared content: Receiving Input to minimize / close the UI Example Process of Minimizing a UI with RTT and shared content: Shared content removed from the Meeting UI while the display of RTT is maintained Example Process of Minimizing a UI with RTT and shared content: Meeting UI with shared content is closed while the display of RTT is maintained Devices 11E through 11H also having the capability of generating the audio signal 231

Active RTT user highlighted as Active Speaker (without Live Captioning): UI during Active Typing UI displayed on computer of person providing RTT input, User A 10A Active RTT user highlighted as Active Speaker (without Live Captioning): UI Prior to Active Typing Example: UI displayed on computer of recipients of the RTT, e.g., User C 10C
-User B through User H view the same UI features Example: Live Captioning with RTT In Live Captioning Mode, voice input of individual users is transcribed in real-time and displayed with RTT Example: Live Captioning with RTT In Live Captioning Mode, voice input of individual users is transcribed in real-time and displayed with RTT Example: Live Captioning with RTT In Live Captioning Mode, voice input of individual users is transcribed in real-time and displayed with RTT

ENHANCED CONTROLS FOR THE DISPLAY OF REAL-TIME TEXT IN CALLS AND MEETINGS

BACKGROUND

There are a number of different types of collaborative systems that allow users to communicate. For example, some systems allow people to collaborate by sharing content using video and audio streams, shared files, chat messages, etc. Some systems manage communication sessions, which are also referred to herein as online meetings, virtual reality sessions, broadcasts, etc. Such sessions can have a distinct start time and an end time that occur on specific dates. People can schedule these sessions on a calendar and have a number of events scheduled throughout the day. Users can schedule meetings in advance, invite other participants, and use various content sharing features such as audio, video, chat, screen sharing, whiteboards, etc.

Although some existing systems provide a number of features that allow people to collaborate during specific events, such systems do not provide an equitable experience for all users. For example, existing systems do not provide an environment that gives equitable presence for people who are deaf or hard-of-hearing (D/HH). Existing systems have a number of user interface features that bring focus to users who are talking in an online meeting. When a person is talking, a user interface may highlight their name or image. Such systems do not have similar features that bring focus to users who primarily rely on text communication.

Existing systems present other technical issues in that they do not provide features that enable D/HH participants to communicate messages to a presenter. For example, when a presenter is sharing their desktop during a meeting, it may be difficult for D/HH participants to send a message to the presenter, as most systems do not include features for displaying messages while someone is maximizing the display area of their shared content. Users who can provide a vocal input to a meeting audio stream can freely communicate with the presenter. Thus, furthering the issue of inequitable presence in online meetings. Such issues are exacerbated when users are on small screen devices, which further reduces a system's ability to provide additional UI features that can bring focus to D/HH participants.

In addition to the above-described issues, existing systems may not provide equitable presence for users in certain situations. For example, in a call involving an emergency, a user may be in a situation where speaking is not safe. Equitable presence may also not be afforded to other users who may be unable to speak due to an injury, illness, or in a situation where a microphone is not working, etc. In such scenarios, other forms of text communication may be necessary. Without features that can accommodate users in these scenarios, a system may not allow users to effectively communicate with others or have a strong presence in a meeting or call.

SUMMARY

The techniques disclosed herein provide enhanced controls for the display of real-time text (RTT) in calls and meetings. RTT is the ability for someone to send a text message on a character-by-character basis to everybody else in a call or meeting. The system disclosed herein integrates RTT, live video streams, live audio streams, chat messages, live captions, and other shared meeting content all in one central experience. This integrated experience allows users to participate equitably by making RTT accessible to users regardless of the operating mode they are in. The system also generates graphical elements to highlight a video, image, or name of a user to show that they are actively providing RTT. Such features bring focus to RTT users as if they are an active speaker in a meeting. In some embodiments, during an online conference, in response to one of the attendees activating a RTT mode, when at least one user minimizes a meeting stage, such as for the purpose of multitasking while listening, the conference application maintains a display area for displaying RTT. The disclosed features allow communication systems to create a more inclusive experience for everyone participating in meetings. These features enable people who are D/HH, or others in situations where text communication is needed, to participate equitably in real-time conversations.

In some embodiments, a user interface can bring highlight to a user who is actively typing RTT to show them as an active presenter. The generated highlight for RTT contributors can be similar to graphical highlights that are provided to those who are contributing vocal input to a meeting audio stream. In some embodiments, a meeting UI can include a number of video stream renderings of participants. Highlighted boxes can be displayed around active presenters, which includes both users who are actively typing RTT, and users who are actively providing vocal input to an audio stream shared with participants. In addition, the system can highlight a rendering of the RTT by generating a box or other graphical indicators around or near the RTT. A user interface can also increase the size of video renderings of users who are actively typing RTT or rearrange videos of active RTT contributors to a more pronounced position within an arrangement, e.g., a grid, of participant video streams. Such features provide equitable presence to both RTT contributors and vocal input contributors.

The disclosed features provide a consistent experience for everyone in a meeting. When RTT mode is invoked, the RTT region of a meeting UI is activated for each participant of a meeting, not just for the participant who is using RTT to type. Regardless of what mode each participant is in, regardless of whether they're looking at that main stage or if they've minimized their meeting window, the device of each participant still displays a pop-up window and displays RTT in response to the detection of an input contributing RTT. This automatic pop-up window can be shown to a presenter, who may be focused on shared content and who also may have minimized an RTT window.

Some embodiments also provide a live caption feature, where the system generates live caption text from a vocal input of meeting participants and combines that live caption text with RTT. This enables the system to generate a single conversation stream that includes what speaking participants are verbally saying in a meeting with RTT content provided by a typing user. This enables the users that are communicating using the RTT to directly respond to comments that are made by speaking participants, and vice versa. This provides a number of technical benefits in that users can see different modes of communication in one user interface. A system can also inject that single conversation stream in a transcript and/or AI tools such as Copilot, and then factor the input from RTT users like it is verbal input.

In some embodiments, the system includes settings for each participant to control RTT functions in individual meeting. For example, settings for a specific participant can cause a system to automatically activate RTT for all meetings for that particular participant. That setting also means that, when that participant joins a meeting, RTT is activated for all users in that meeting, and a RTT UI is displayed for all users of that meeting. So that each user has a universal experience in viewing, not only by displaying the content provided in the RTT, but also providing the gestures expressed by the speed and manner in which the RTT is provided by each user. As described in more detail below, the disclosed techniques provide several ways to control RTT mode of a meeting: by use of a universal setting that persists across all meetings for a user, during the setup process of a meeting, or during the meeting.

The technical challenge of providing equitable presence and effective communication is solved by the technical solution of dynamically controlling the display of real-time text in calls and meetings. The system provides improved user interaction by automatically providing access to RTT and bringing awareness to users providing RTT. The disclosed techniques also provide tools to control when RTT mode is invoked. This eliminates the need for users to manually control when RTT mode is invoked or control when RTT is displayed. The disclosed features also provide a streamlined process so users do not have to interrupt a meeting to access content, such as RTT, or invoke other UI features to be noticed in meetings. This improvement to interactions with a computer is also helpful in small-screen devices where space is limited for displaying content and controls for displaying specific types of content.

By providing equitable meeting presence and controls for displaying RTT, systems described herein provide benefit over existing systems because fewer manual inputs are needed to see shared content and to bring attention to RTT contributors. This eliminates the element of human error when it comes to manually setting preferences and permissions. Such benefits can increase the efficiency and security of a computing system by reducing the number of times a user needs to interact with a computing device to obtain information or display information. For example, if users in a meeting miss shared content because of inefficient human interactions, they have to resort to prolonged meetings, extensive use of meeting recordings, or require duplicate copies of previously shared content that may require email systems, etc. Thus, various computing resources such as network resources, memory resources, and processing resources can be reduced by mitigating scenarios where content is missed or inadvertently restricted. Also, the disclosed techniques of automatically controlling the RTT mode or the display of RTT windows can ultimately lead to a reduction in undesirable permission settings, which can also leave exposed attack vectors.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

FIGS. 1A-1E show a system 100 that provides enhanced controls for the display of real-time text (RTT) in calls and meetings. RTT is the ability for someone to send a text message on a character-by-character basis to everybody else in a call or meeting. The system disclosed herein provides an integrated experience that allows users to participate equitably by making RTT accessible to users regardless of the operating mode they are in. All participants of a meeting or call can concurrently access RTT with other meeting content, including video streams, chat messages, live captions, transcripts, and artificial intelligence (AI) tools, etc.

For illustrative purposes, the example system shown in the figures includes a number of computing devices (11A-11I) each associated with individual users (10A-10I). The computers are each interconnected using a communication session for sharing video signals, audio signals, and other shared content such as documents, text messages, and RTT.

In this example, there are a number of users (10A-10I) in a meeting, where User A 10A, Serena Davis, is associated with a first computing device 11A, User B 10B, Miguel Silva, is associated with a second computing device 11B, User C 10C, Michael Wong, is associated with a third computing device 11C, User D 10D, Krystal Mckinney, is associated with a fourth computing device 11D, User E, Jazmine Simmons, is associated with a fifth computing device 11E, User F 10F, Daniela Mandera, is associated with a sixth computing device 11F, User G 10G, Ray Tanaka, is associated with a seventh computing device 11G, and User H 10H, Will Newman, is associated with an eighth computing device 11H, and User I 10I, Cassie Price, is associated with a ninth computing device 11I. Although this example only includes nine participants of an online meeting, it can be appreciated that the system can include any number of devices and a corresponding number of participants for either a call or a meeting.

FIGS. 1A-1E also show an example of UI features that can be used to activate RTT mode for a meeting. This embodiment involves a method where the RTT mode is activated during a meeting. Other embodiments described in more detail below can control the activation of RTT mode by the use of preferences that persist across all meetings for a particular user, or by the use of specialized UIs that are used to set up individual meetings.

Figure 1A:
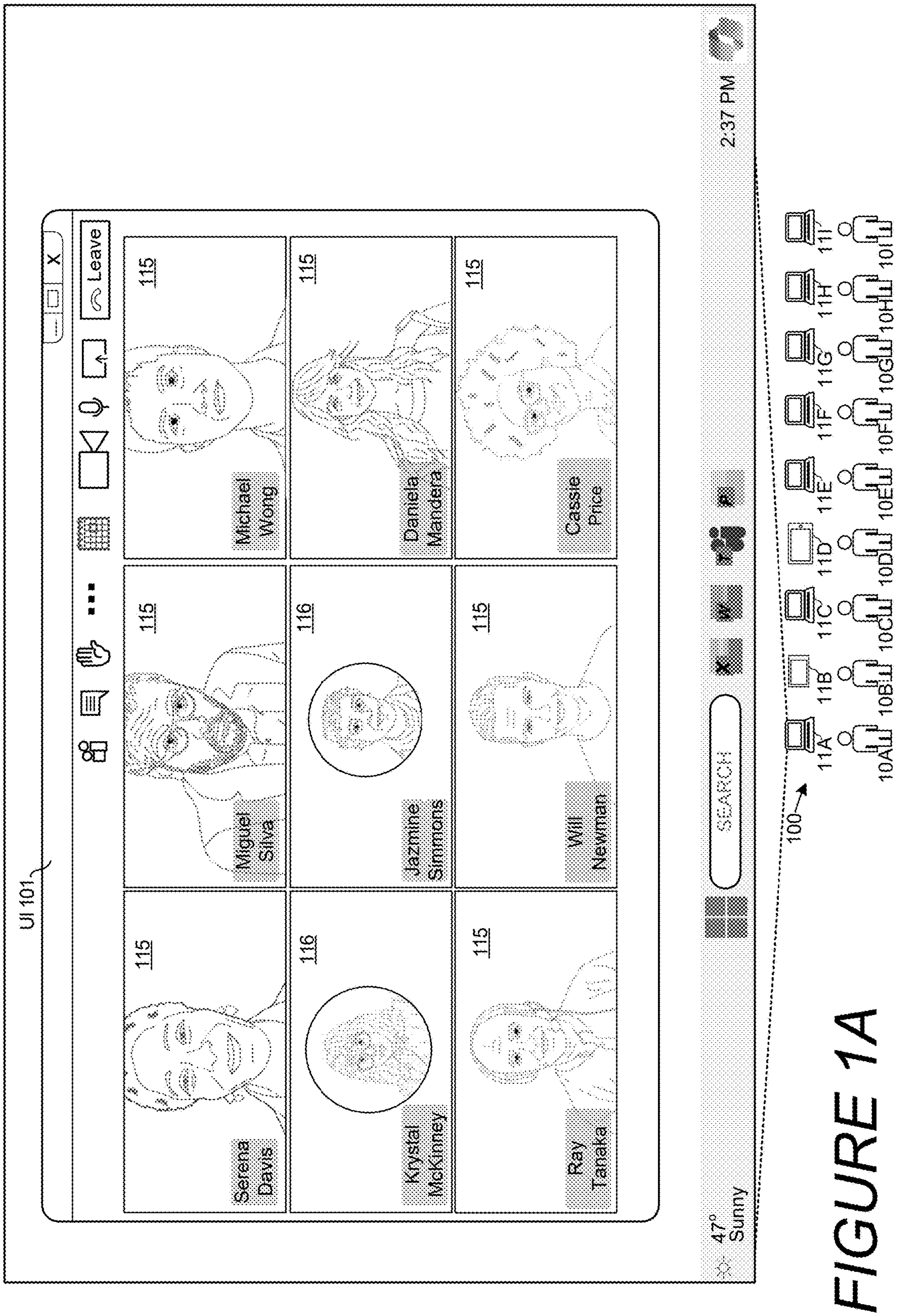
FIG. 1A is a block diagram of a system for providing enhanced controls for real-time text in calls and meetings, this figure also showing an example user interface (UI) for a communication session, e.g., an online meeting.

FIG. 1A shows a computer, e.g., the first computer 11A of User A 10A, that is operating in a first operating mode for managing the display of shared content of a meeting in a meeting user interface 101. This first mode of operation causes one or more devices of a meeting to display shared video streams, audio streams, chat messages, shared documents, without sharing RTT.

Figure 1B:
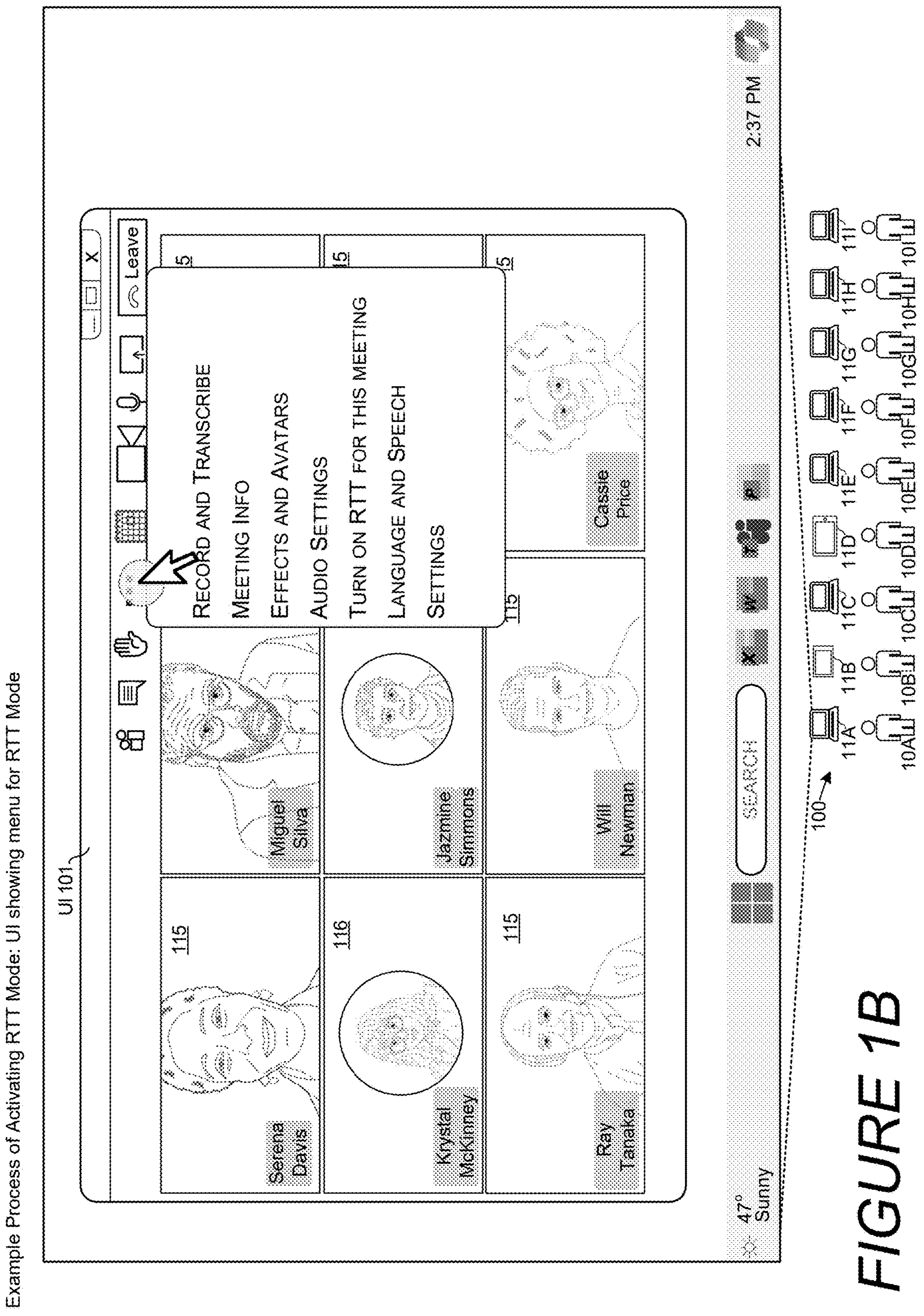
FIG. 1B shows an example of a user interface control element for accessing a menu having a real-time text mode option.
Figure 1C:
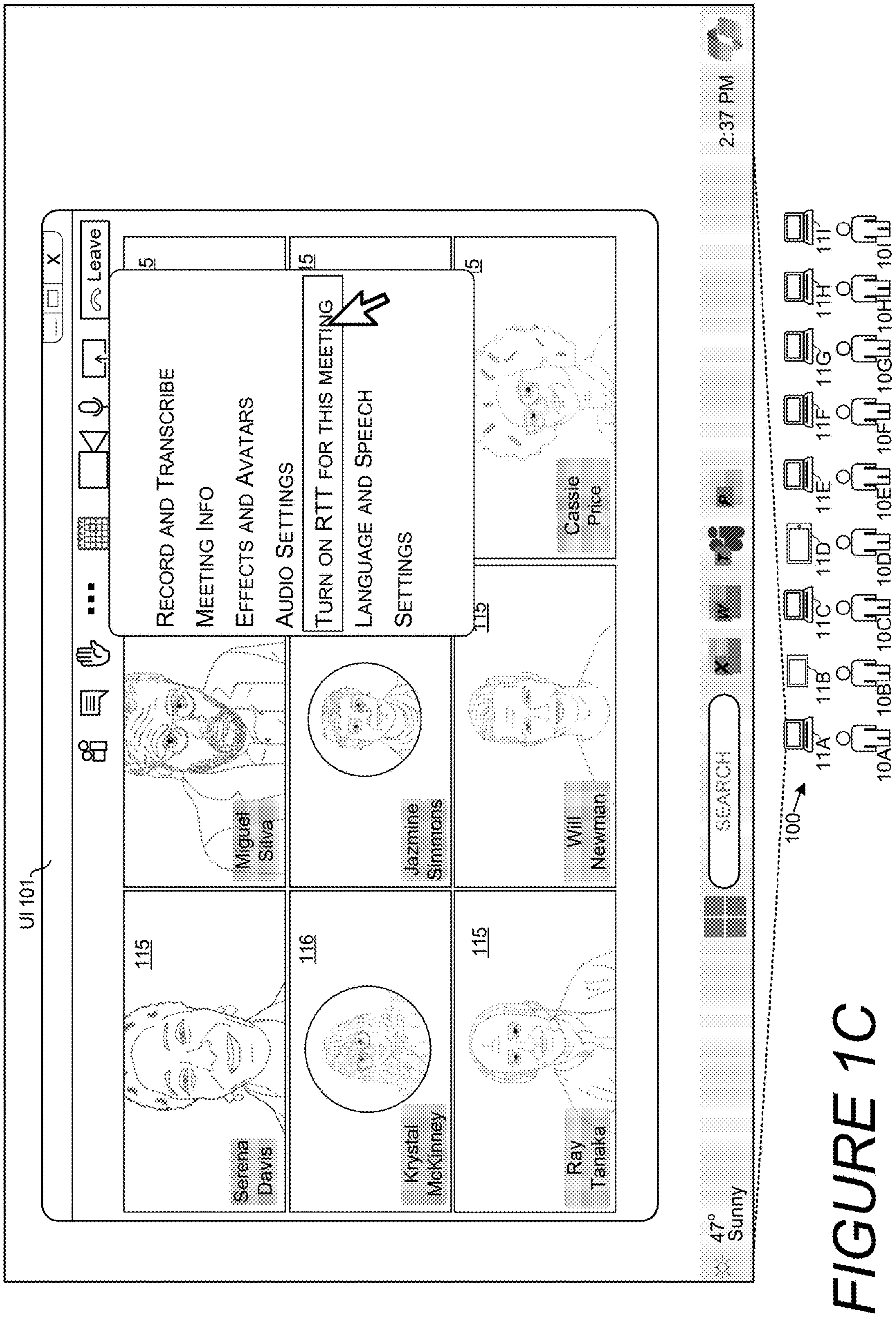
FIG. 1C shows an example of a user interface control element for activating a real-time text mode for a meeting.
Figure 1D:
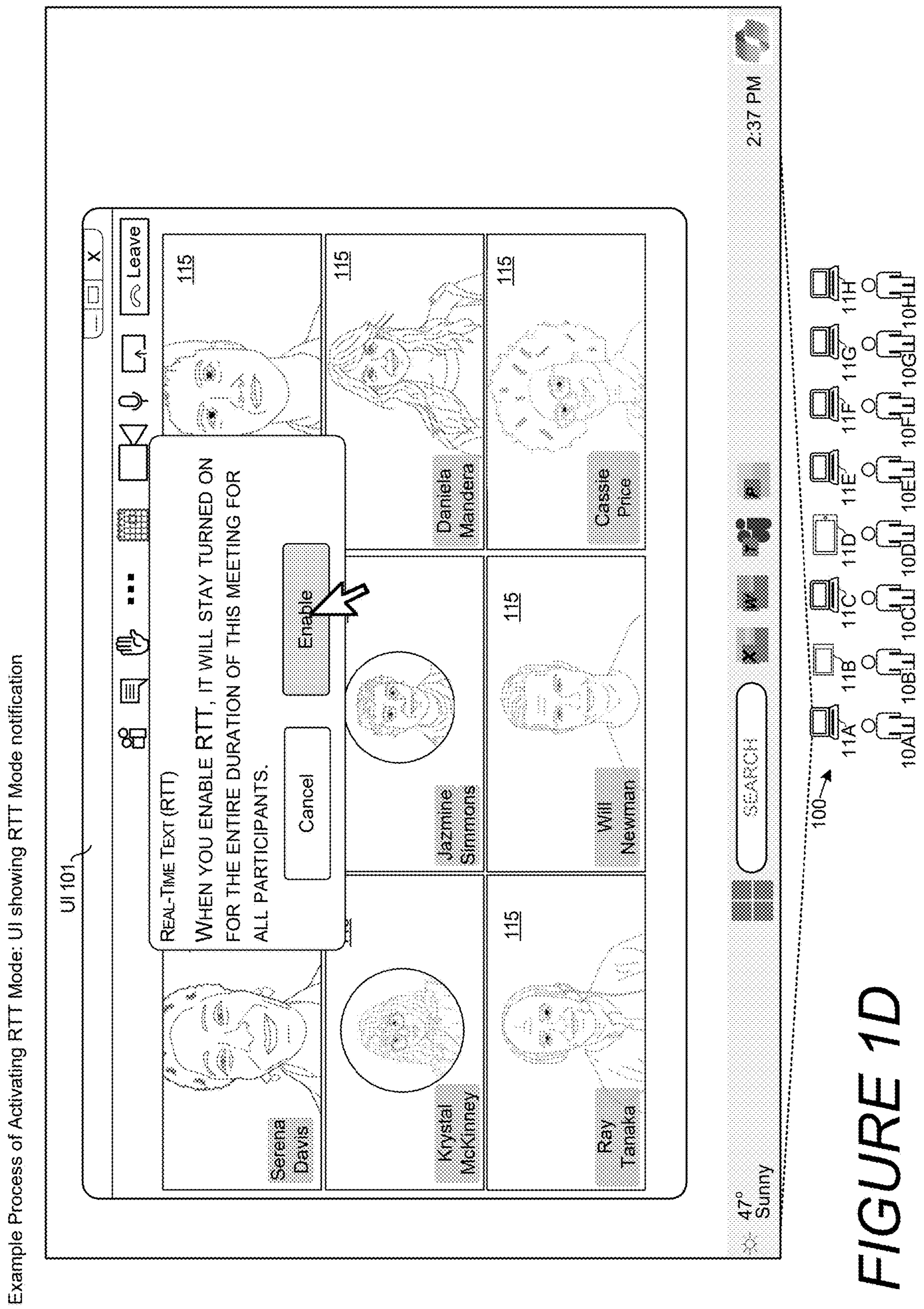
FIG. 1D shows an example of a notification describing the features of the real-time text mode.

To activate the RTT mode during a meeting, the meeting UI 101 shown in FIG. 1B provides a menu having a selectable control element for activating the RTT mode. In response to the selection of the selectable control element for activating the RTT mode, e.g., by the input shown in FIG. 1C, the system displays a notification shown describing the functionality of the RTT mode. An example of the notification is shown in FIG. 1D. In this example, the notification describes that RTT mode applies to each participant in the meeting. The notification can provide a first option for cancelling the request to activate RTT mode, and a second option for confirming the request. As shown in FIG. 1D, in response to a selection of the second option for confirming the request, the system activates the RTT mode for the meeting.

Figure 1E:
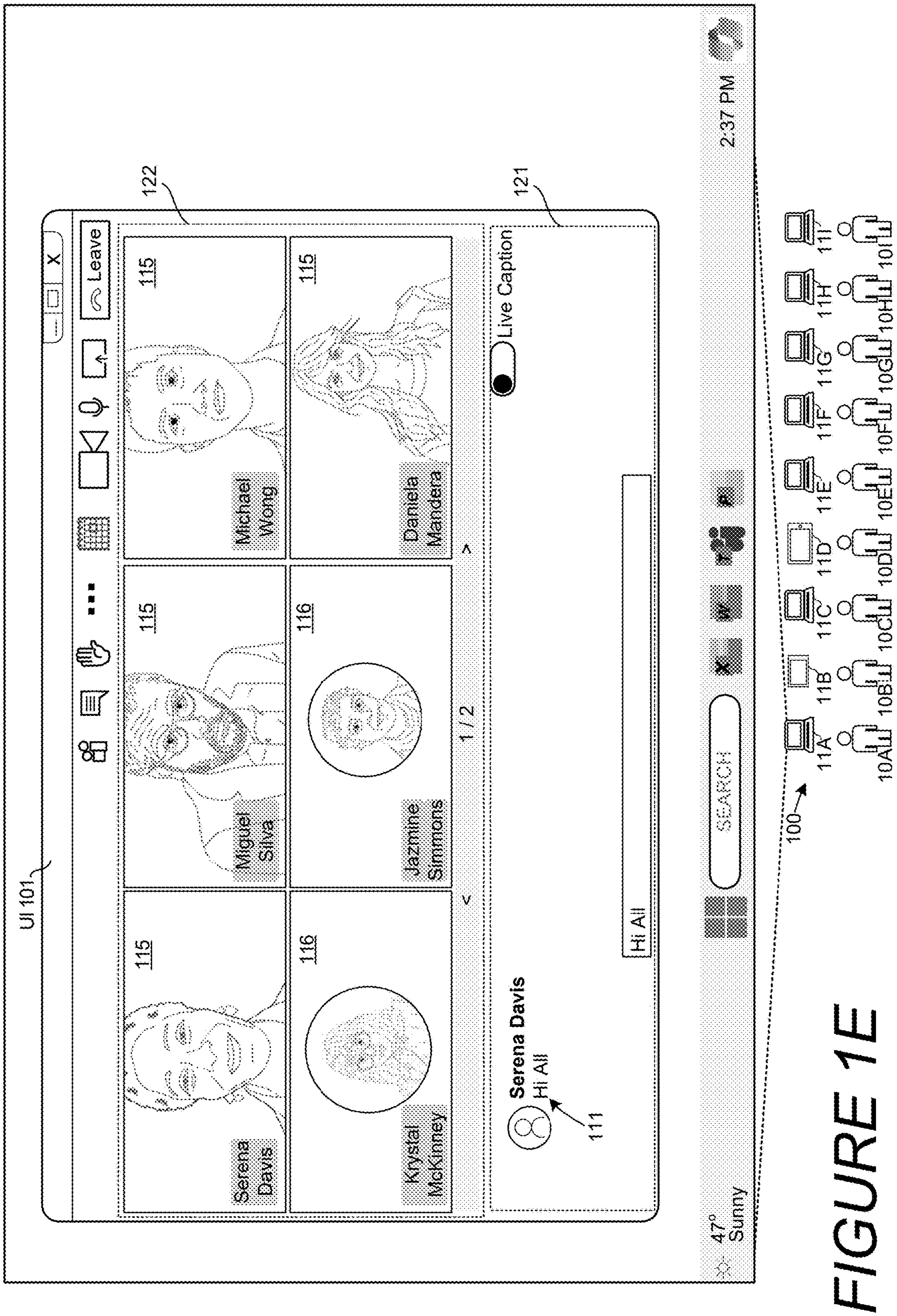
FIG. 1E shows an example of a meeting UI that is displayed once the real-time text mode is invoked.

While in RTT mode, as shown in FIG. 1E, the system generates a UI 101 that includes a first region 121 reserved for displaying the real-time text 111 ("RTT 111") and a second region 122 reserved for shared content, such as video streams 115 and images 116 shared between one or more computing devices 11A-11I participating in the communication session. The second region 122 can also be used to display renderings files and video files. Although this example shows a UI arrangement having two regions, a system in RTT mode can also display different UI arrangements displaying RTT. For example, while in RTT mode, a UI can include RTT 111 separate from a UI displaying shared content, as shown in FIG. 3B, a UI can include RTT 111 without the display of video streams 115 and images 116, as shown in FIG. 4B and FIG. 5B.

Referring now to FIGS. 2A-2K, the functionality of RTT mode is shown and described below. When one user activates RTT mode for a meeting or call, all users receive RTT that is generated by the participants, and each user has a user interface that displays RTT. In this example, the UI for each user includes a first region 121 reserved for RTT and a second region 122 reserved for video streams and shared files. The second region also referred to herein as the "stage."

Figure 2A:
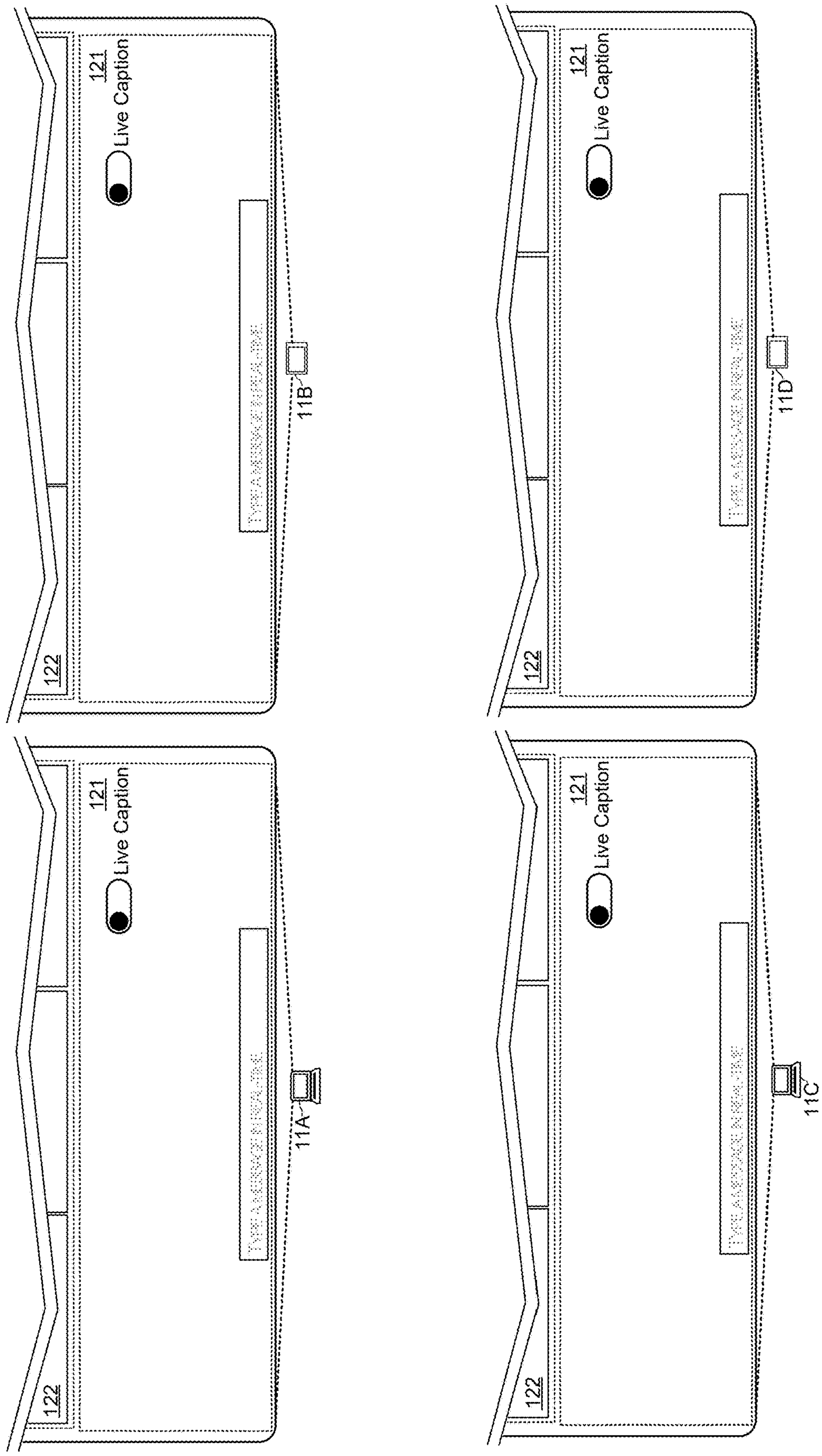
FIG. 2A shows a first character that is provided as an input, and communicated to computers of participants of a meeting while the system is in the real-time text mode.
Figure 2B:
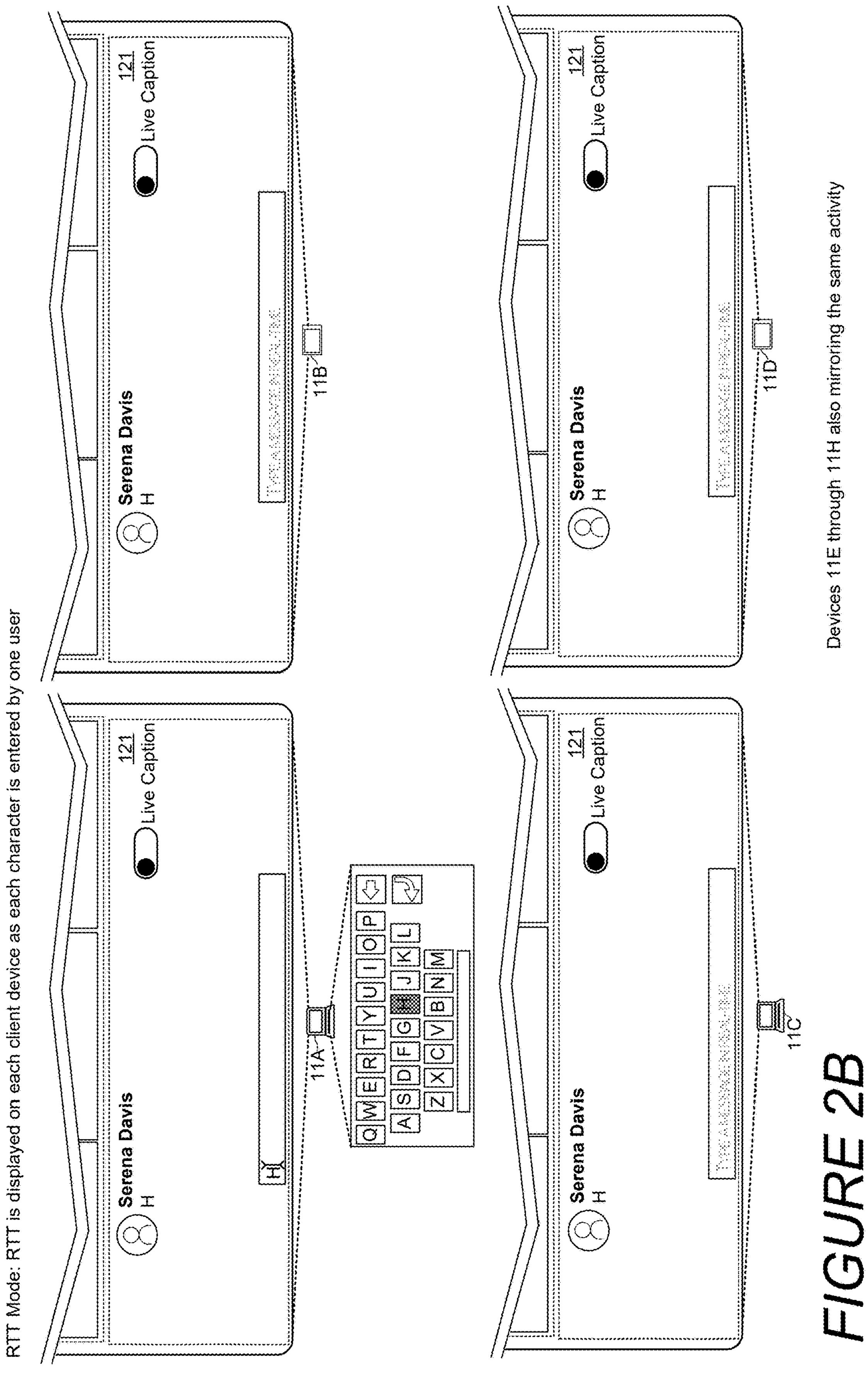
FIG. 2B shows a second character that is provided as an input, and communicated to computers of participants of a meeting while the system is in the real-time text mode.
Figure 2C:
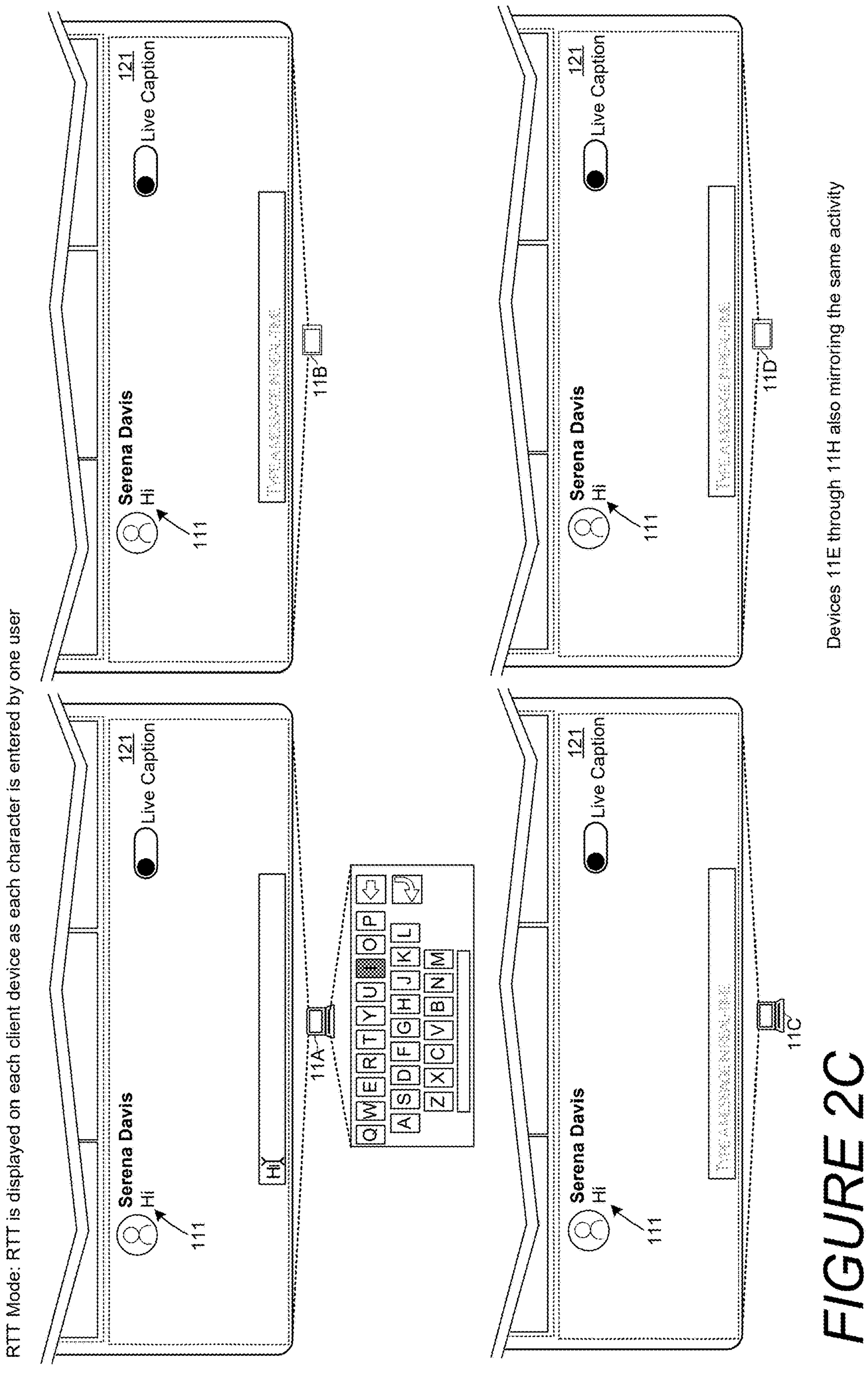
FIG. 2C shows a third character that is provided as an input, and communicated to computers of participants of a meeting while the system is in the real-time text mode.
Figure 2D:
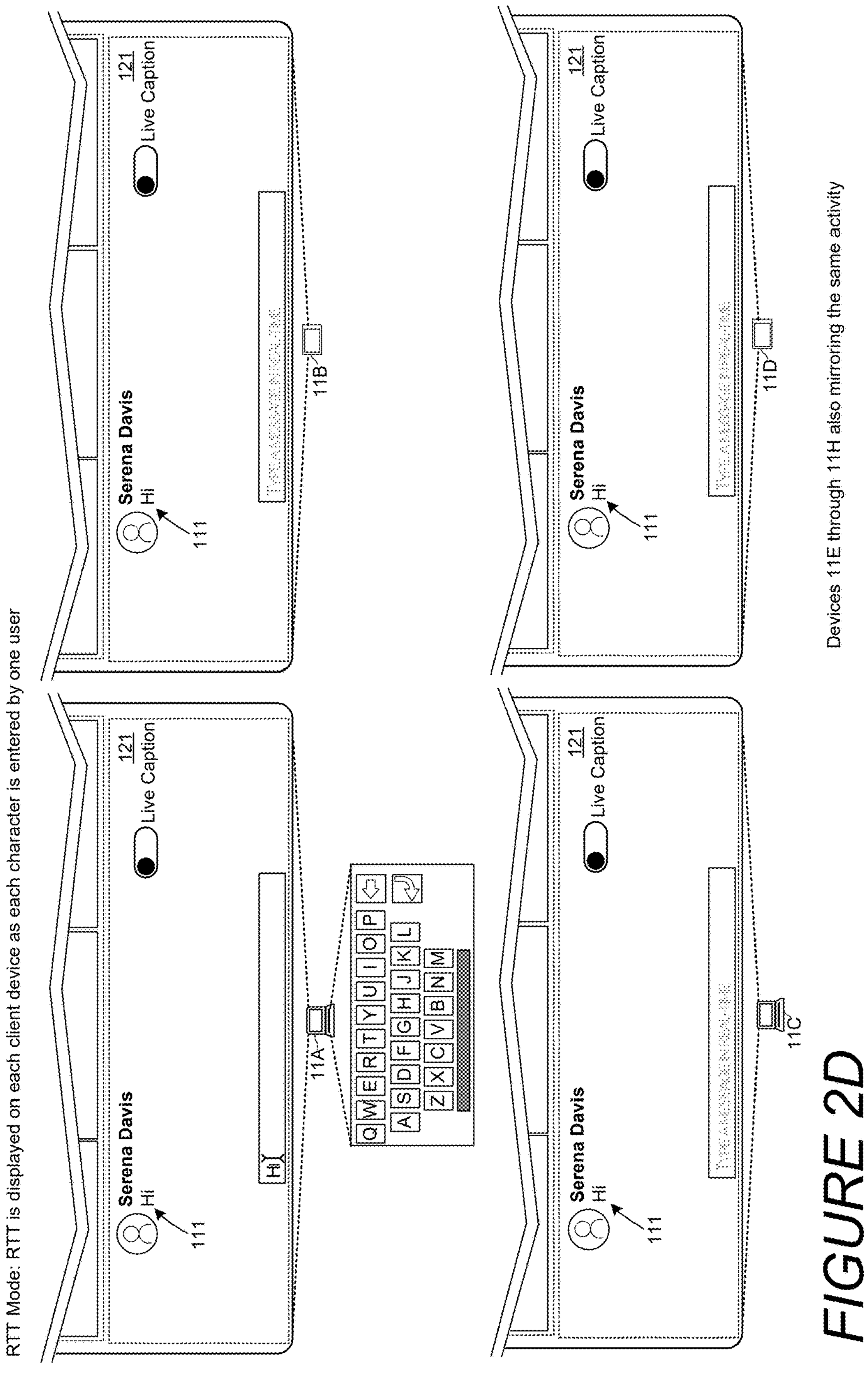
FIG. 2D shows a fourth character that is provided as an input, and communicated to computers of participants of a meeting while the system is in the real-time text mode.
Figure 2E:
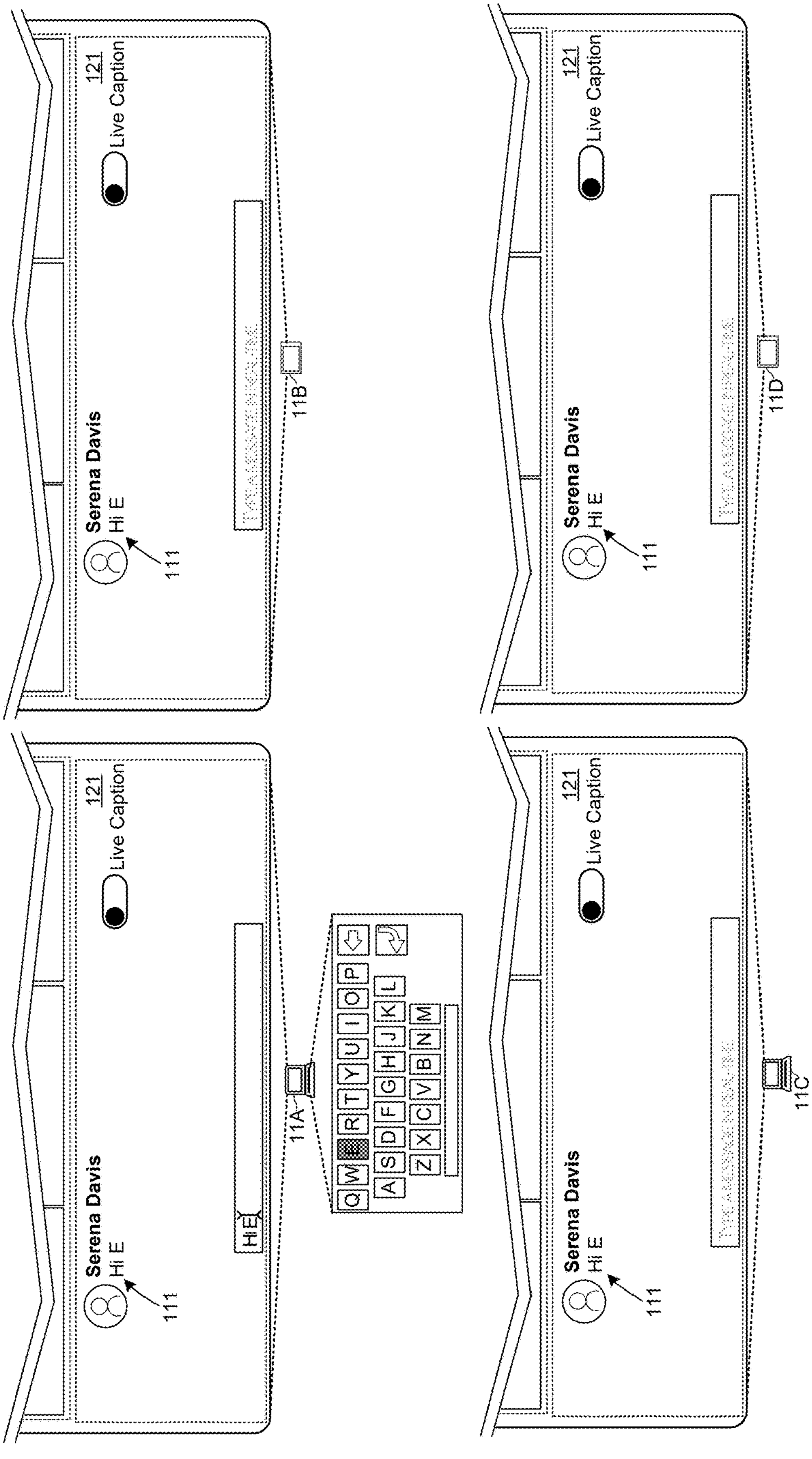
FIG. 2E shows a fifth character that is provided as an input, and communicated to computers of participants of a meeting while the system is in the real-time text mode.
Figure 2F:
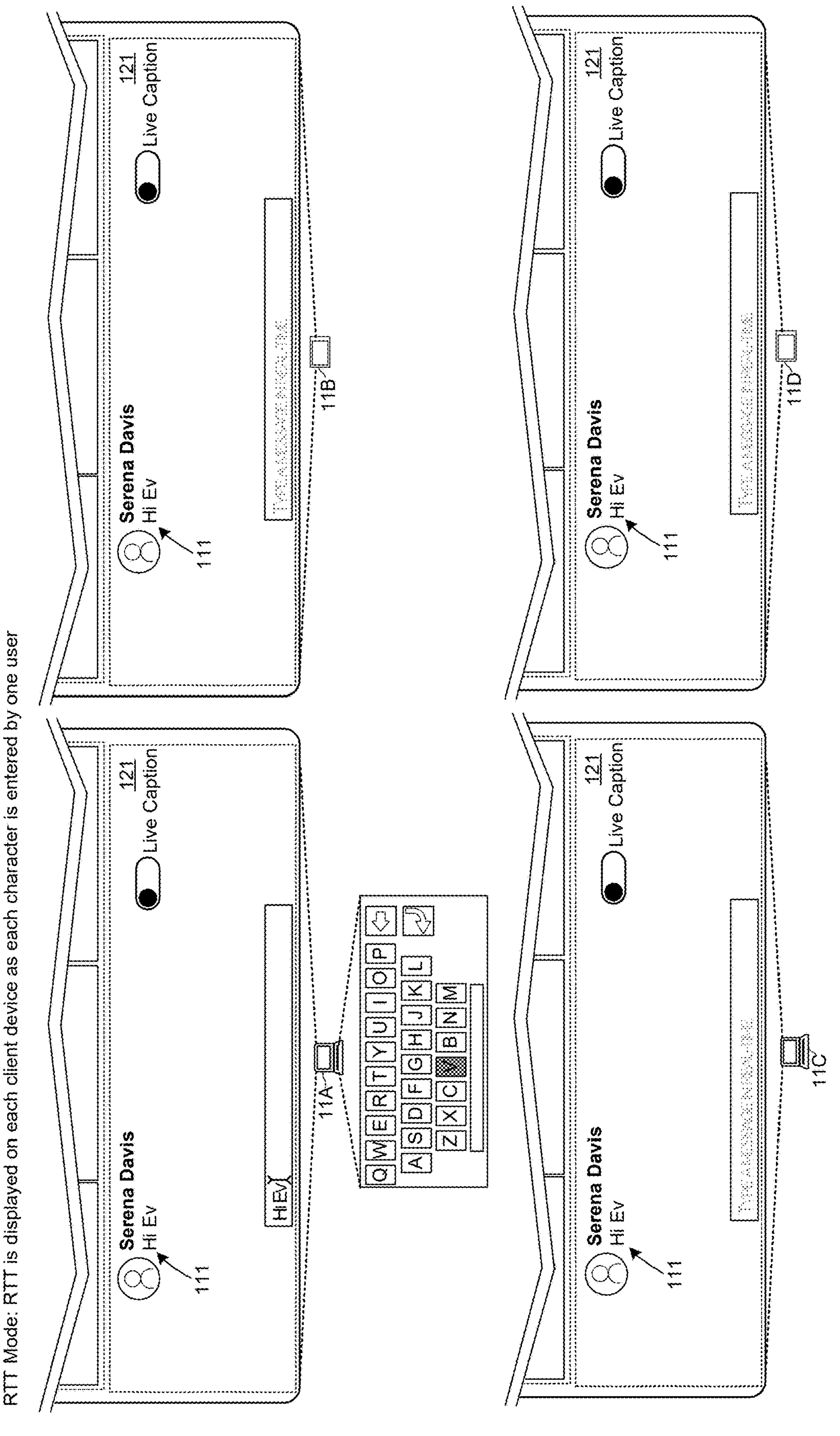
FIG. 2F shows a sixth character that is provided as an input, and communicated to computers of participants of a meeting while the system is in the real-time text mode.
Figure 2G:
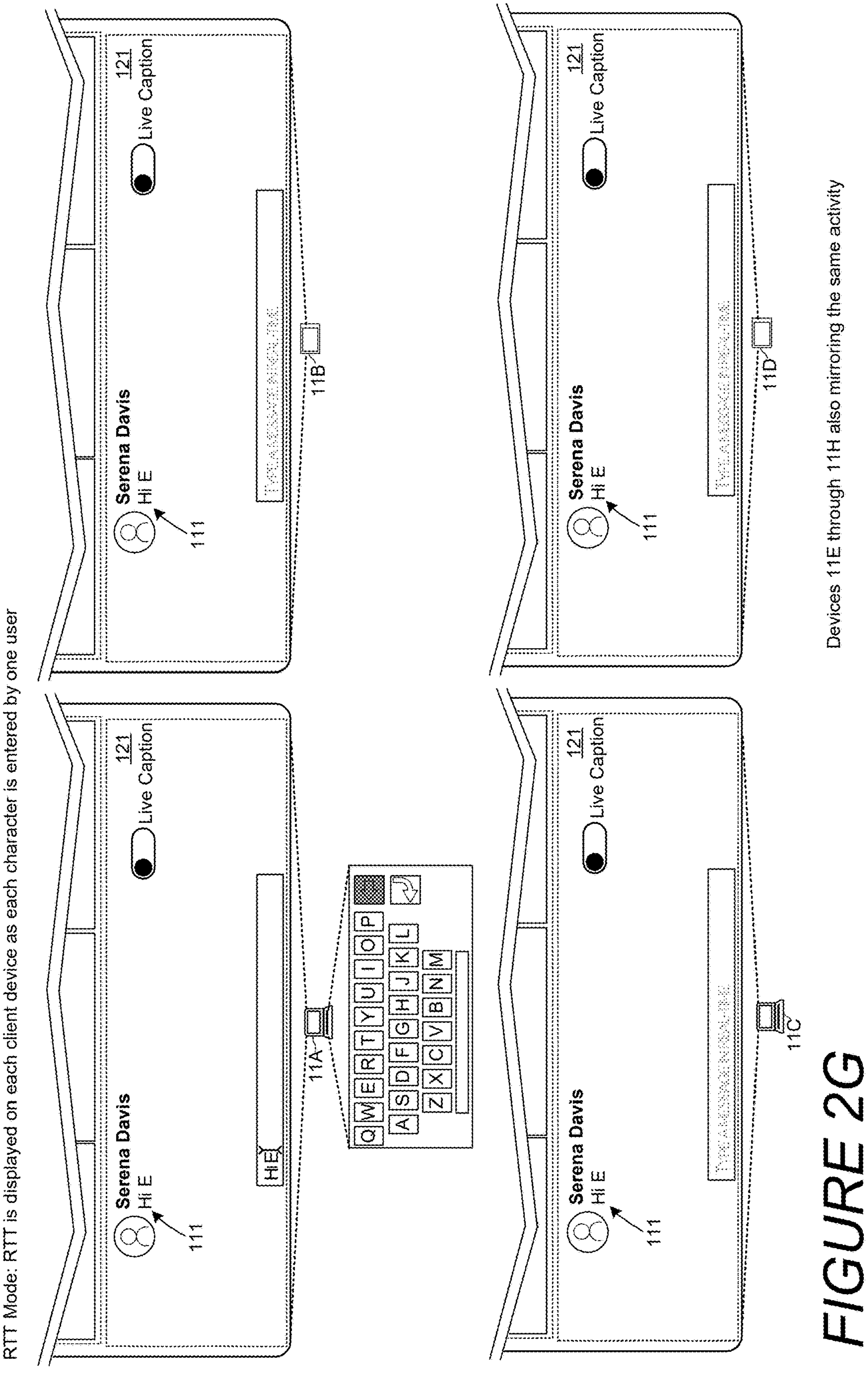
FIG. 2G shows a delete control character that is provided as an input and communicated to computers of participants of a meeting while the system is in the real-time text mode.
Figure 2H:
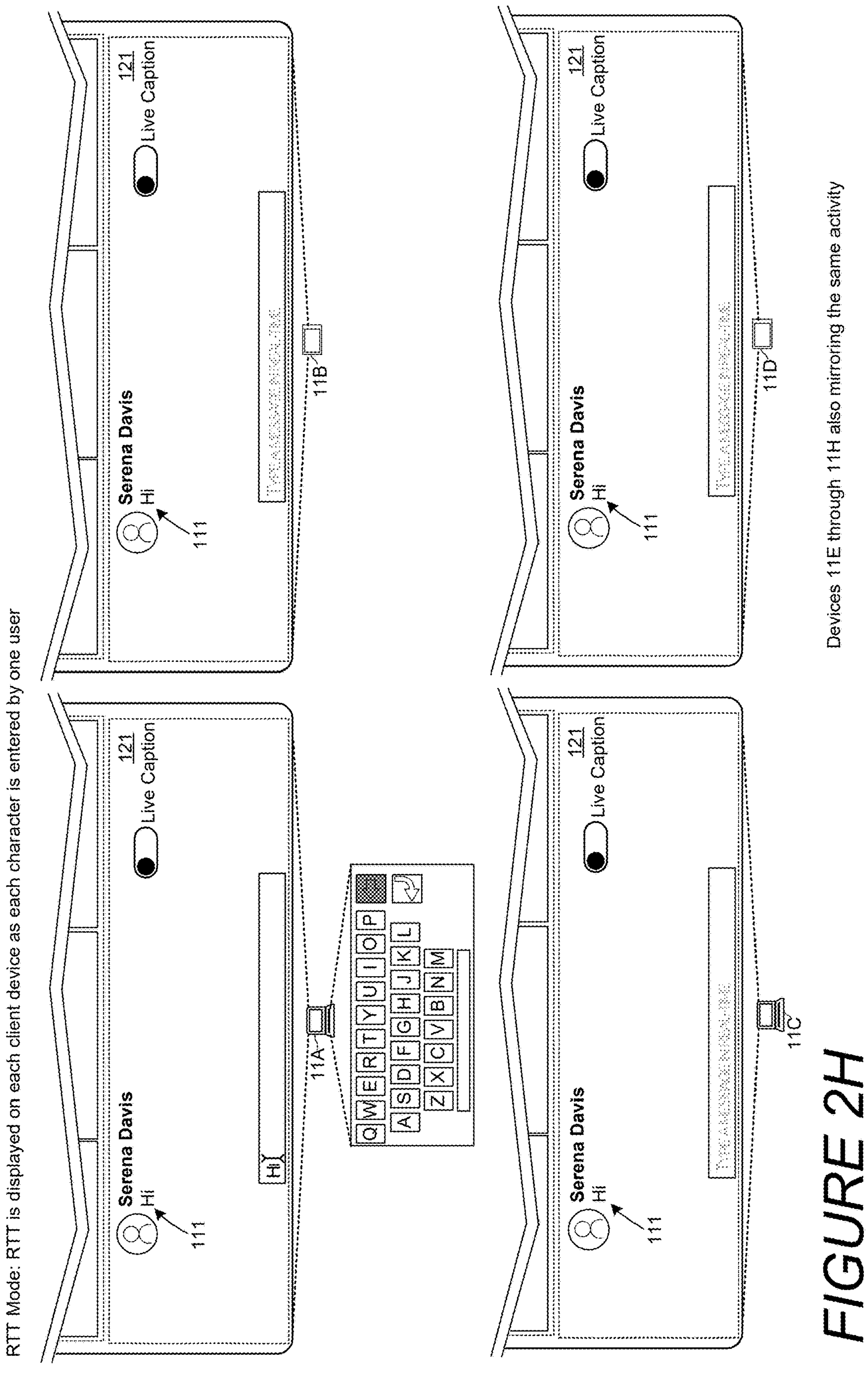
FIG. 2H shows a delete control character that is provided as an input and communicated to computers of participants of a meeting while the system is in the real-time text mode.
Figure 2I:
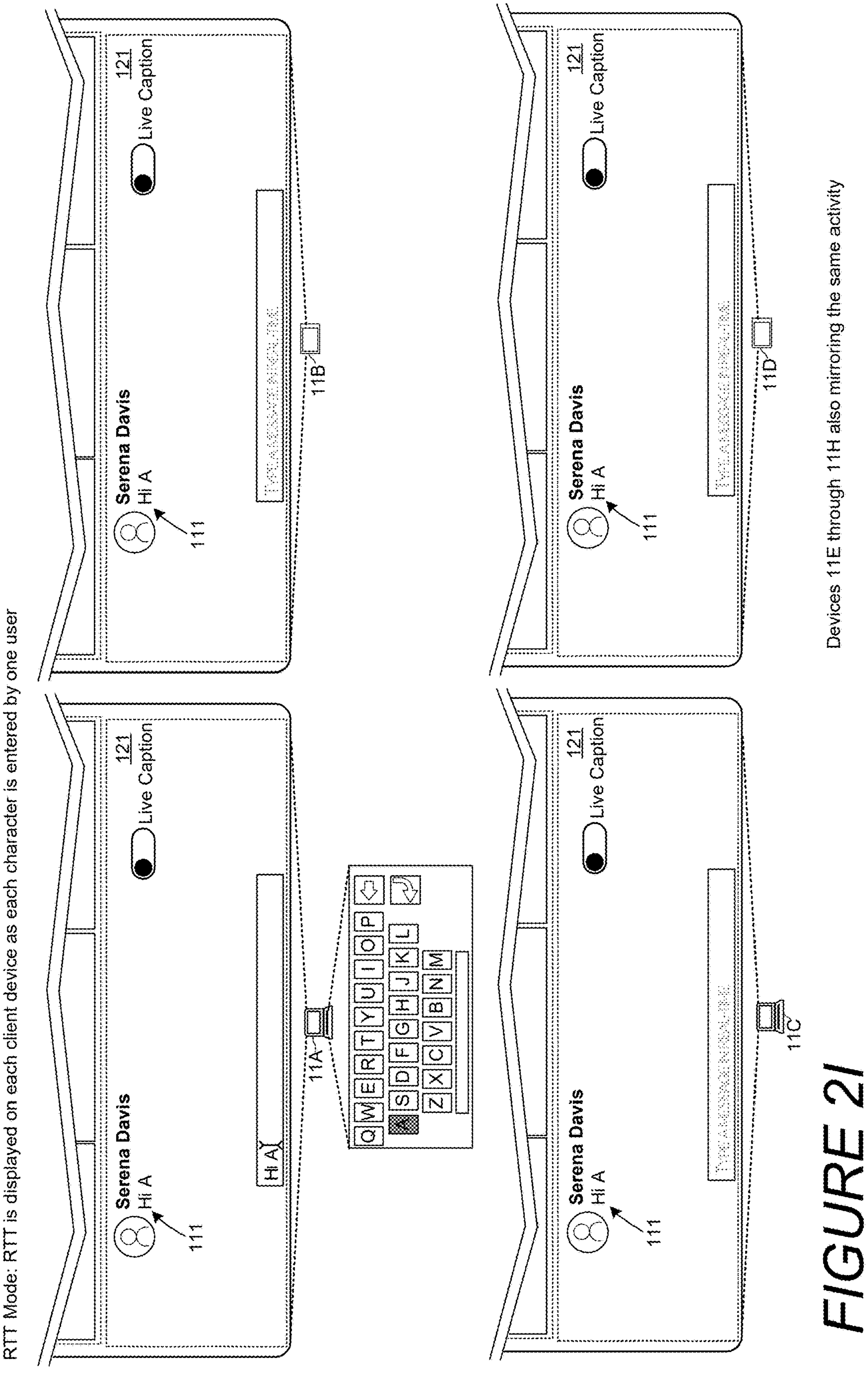
FIG. 2I shows a ninth character that is provided as an input, and communicated to computers of participants of a meeting while the system is in the real-time text mode.
Figure 2J:
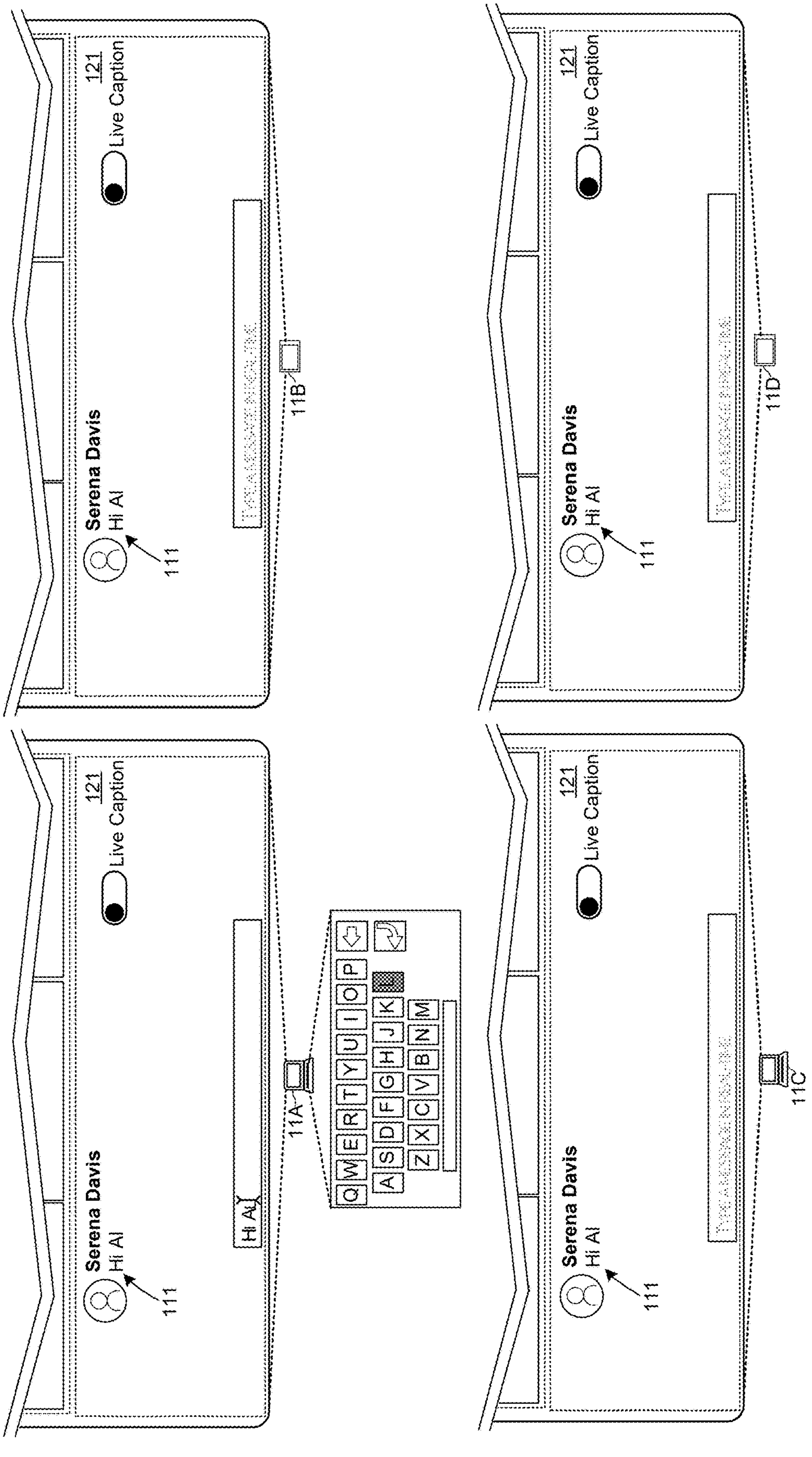
FIG. 2J shows a tenth character that is provided as an input, and communicated to computers of participants of a meeting while the system is in the real-time text mode.
Figure 2K:
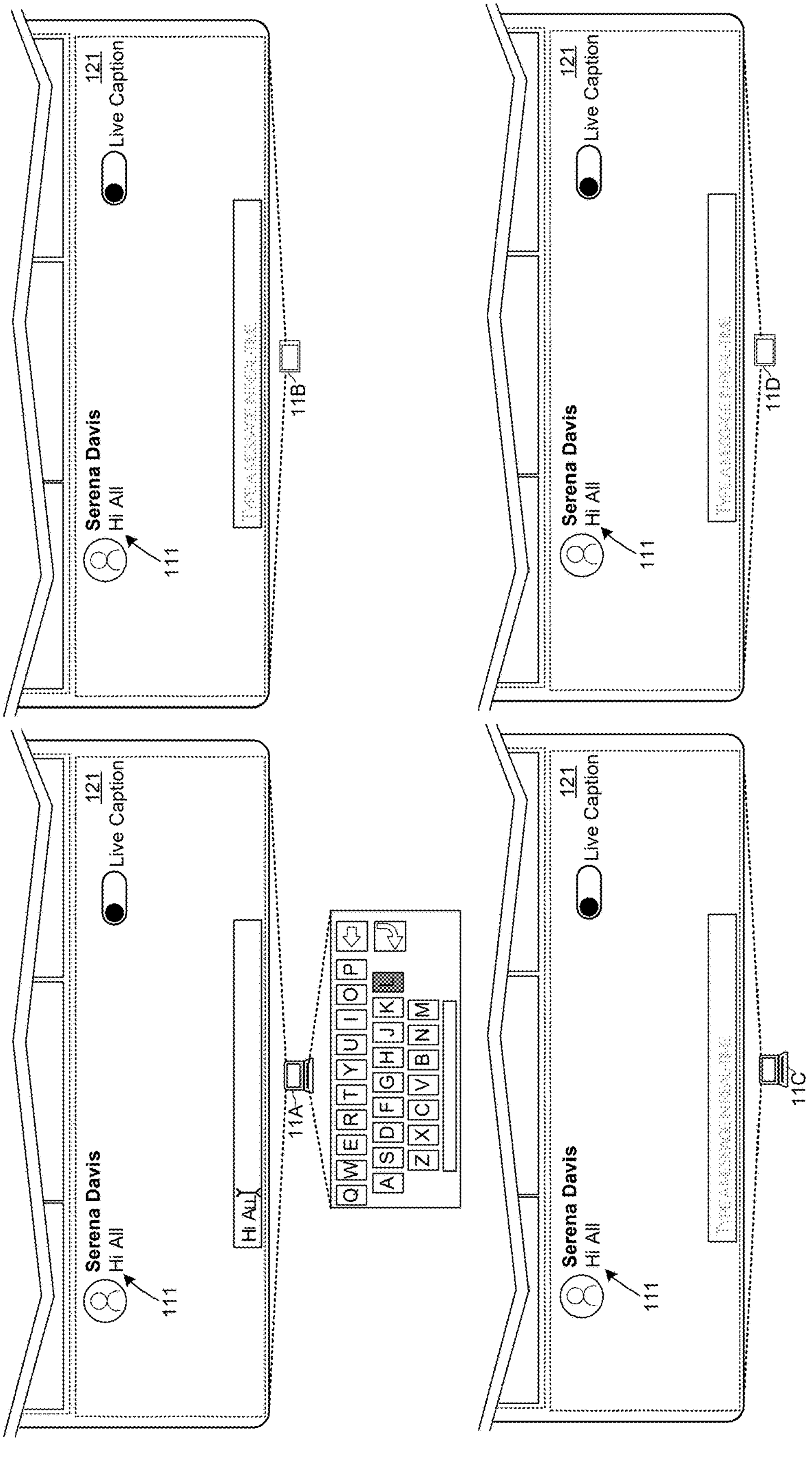
FIG. 2K shows an eleventh character that is provided as an input, and communicated to computers of participants of a meeting while the system is in the real-time text mode.

While in RTT mode, as shown in FIG. 2B, when a user, such as User A, types an individual character at their computer, e.g., the first computer 11A, the system communicates each character from the first computing device 11A to other computing devices 11B-11I of individual meeting participants 10B-10I. Each of the individual characters are separately transmitted from the first computing device 11A to the other computing devices 10B-10I in response to individual character input entries received at the first computing device 11A. This communication protocol applies to all computers transmitting RTT.

As shown in FIG. 2B, when User A provides an input for the letter "H", code for the letter "H" is transmitted to each remote device 10B-10I in the meeting and displayed in the RTT region of the UI at each remote device 10B-10I. Then, as shown in FIGS. 2C-2K, as User A types each character into the input device of the first device 11A, each character is transmitted to, and displayed on, each of the other devices 11B-11I. This includes the transmission of editing characters, such as the delete character, and any other symbol having an assigned ASCII number. The system also maintains the order in which the characters are entered at a device receiving the key input. Thus, if User A enters the sequence H-E-L-L-O, the letters show up in the same sequence on the other devices. The system can perform a verification process to maintain the correct sequence in case the transfer of some individual characters is unduly delayed between the devices. As shown in the example of FIGS. 2C-2K, each device 11B-11I that receives an individual character causes a display of the individual character as it is received.

In some embodiments, during an online meeting, while in RTT mode, if a meeting UI 101 includes both RTT and other shared content, such as shared images and/or live video streams, when a user minimizes the meeting UI, the system maintains a display area for displaying RTT. As described in more detail below, the minimization of a meeting UI can include reducing the size of a user interface, reducing a number of images or video stream renderings in the user interface, and/or reducing the size of images or video stream renderings in the user interface.

Figure 3A:
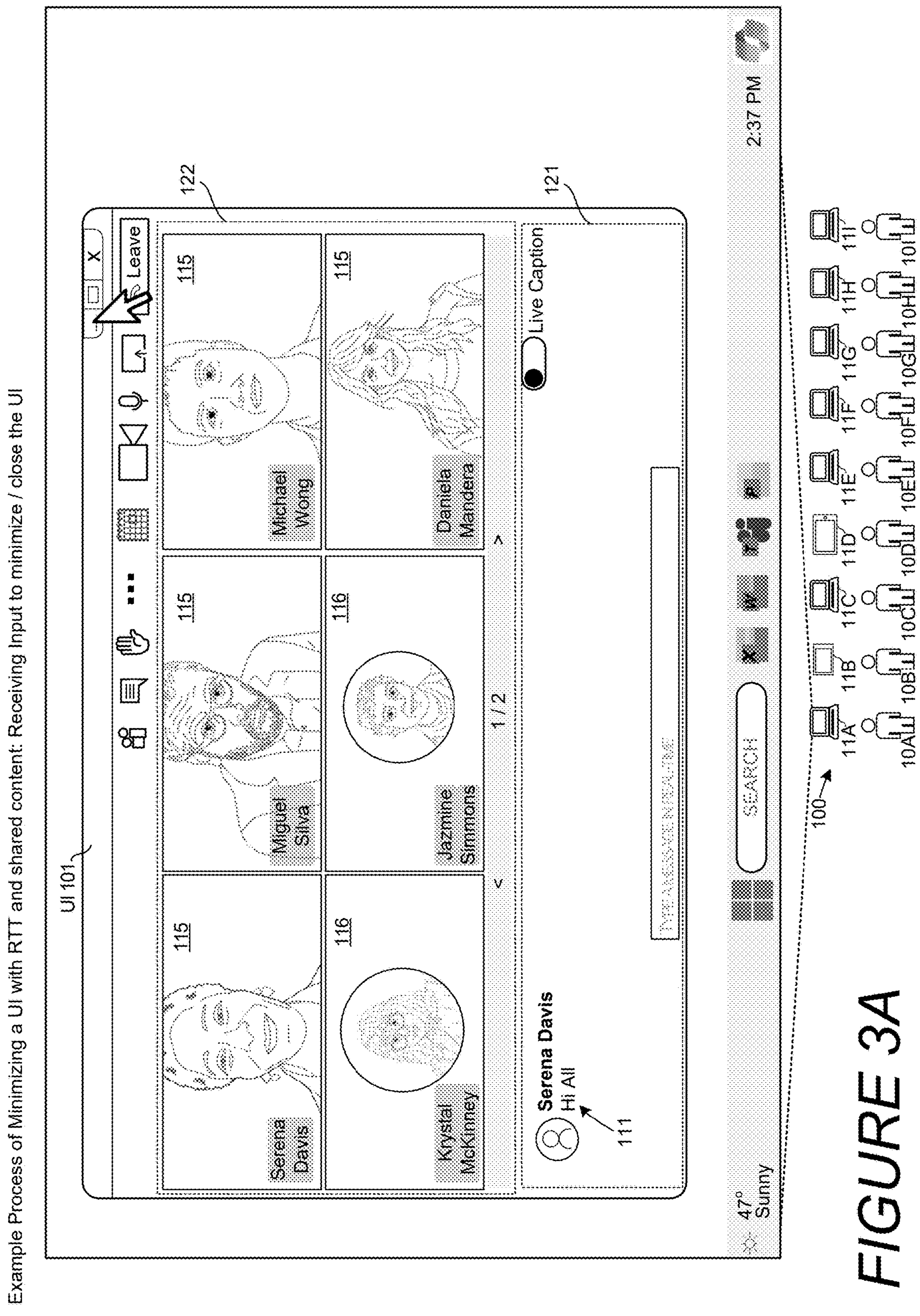
FIG. 3A shows a first user interface arrangement showing a stage of a meeting with a display of real-time text.
Figure 3B:
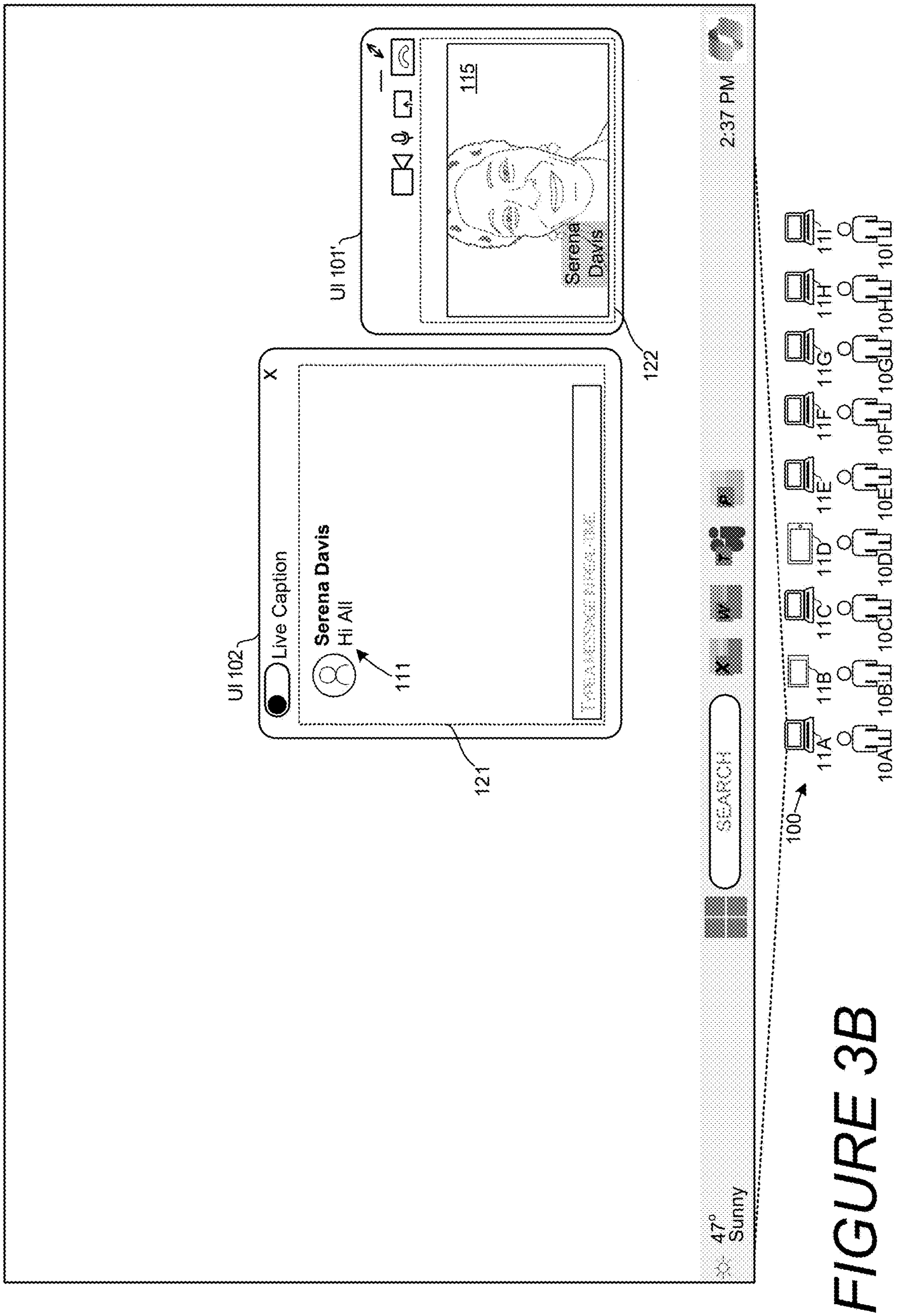
FIG. 3B shows a first user interface arrangement showing a reduced stage of a meeting with a display of real-time text.

FIGS. 3A-3B show an example of a process where an input to reduce the size of a meeting UI 101 causes the display of a first UI reserved for RTT and separate display of a modified meeting UI having a reduced number of images and meeting controls. FIG. 3A shows a device receiving an input for minimizing a meeting UI 101 displaying real-time text 111 and shared content, e.g., at least one of the video stream 115 or the image 116. For illustrative purposes, an input for "minimizing" a UI can mean, reducing the size of the UI, reducing a size of an image or video in the UI, reducing a number of images or video renderings in the UI, or closing the UI. When an input is received to minimize a UI concurrently displaying RTT with shared content, the system maintains a display of the RTT either in a separate UI or in a UI that shows both RTT and shared content.

In this example, as shown in FIG. 3B, in response to the input to minimize the UI, e.g., reduce the size of the first user interface arrangement 101, the system maintains the display of the real-time text 111 while reducing the size of the first user interface arrangement 101 to display a modified meeting UI 101'. The real-time text 111 can be displayed in a new UI 102 having a region 121 reserved for real-time text 111. In the process of reducing the size of the first user interface arrangement 101, the system reduces the number of displayed video streams 115 or images 116. In this particular example, the system generates the modified meeting UI 101' having a region 122 reserved for video streams and images, which in this example, only shows one video rendering 115 of a meeting participant and meeting control buttons, e.g., a hangup button, sharing button, and camera and microphone control buttons.

Figure 4A:
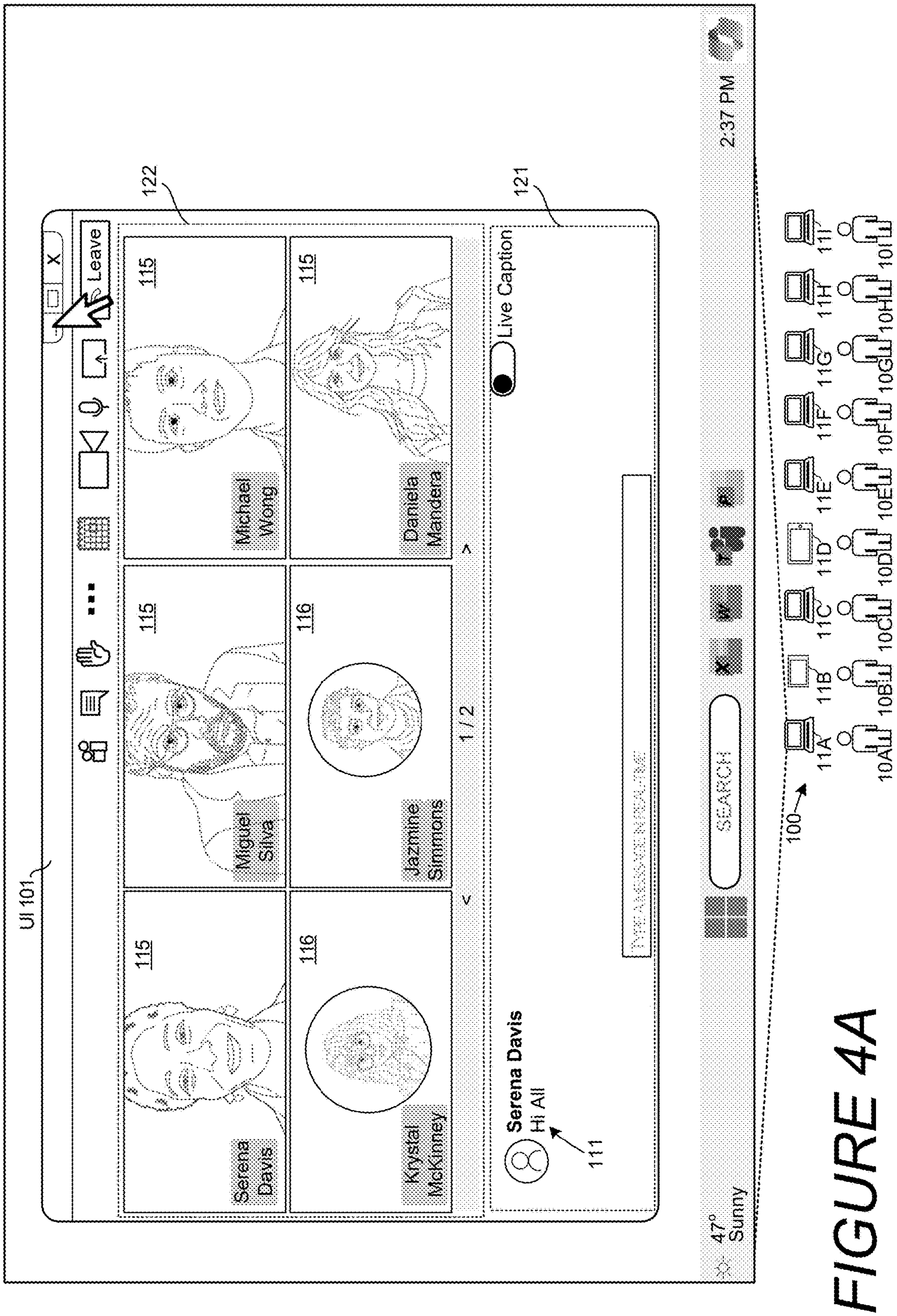
FIG. 4A shows a first user interface arrangement showing a stage of a meeting with a display of real-time text.
Figure 4B:
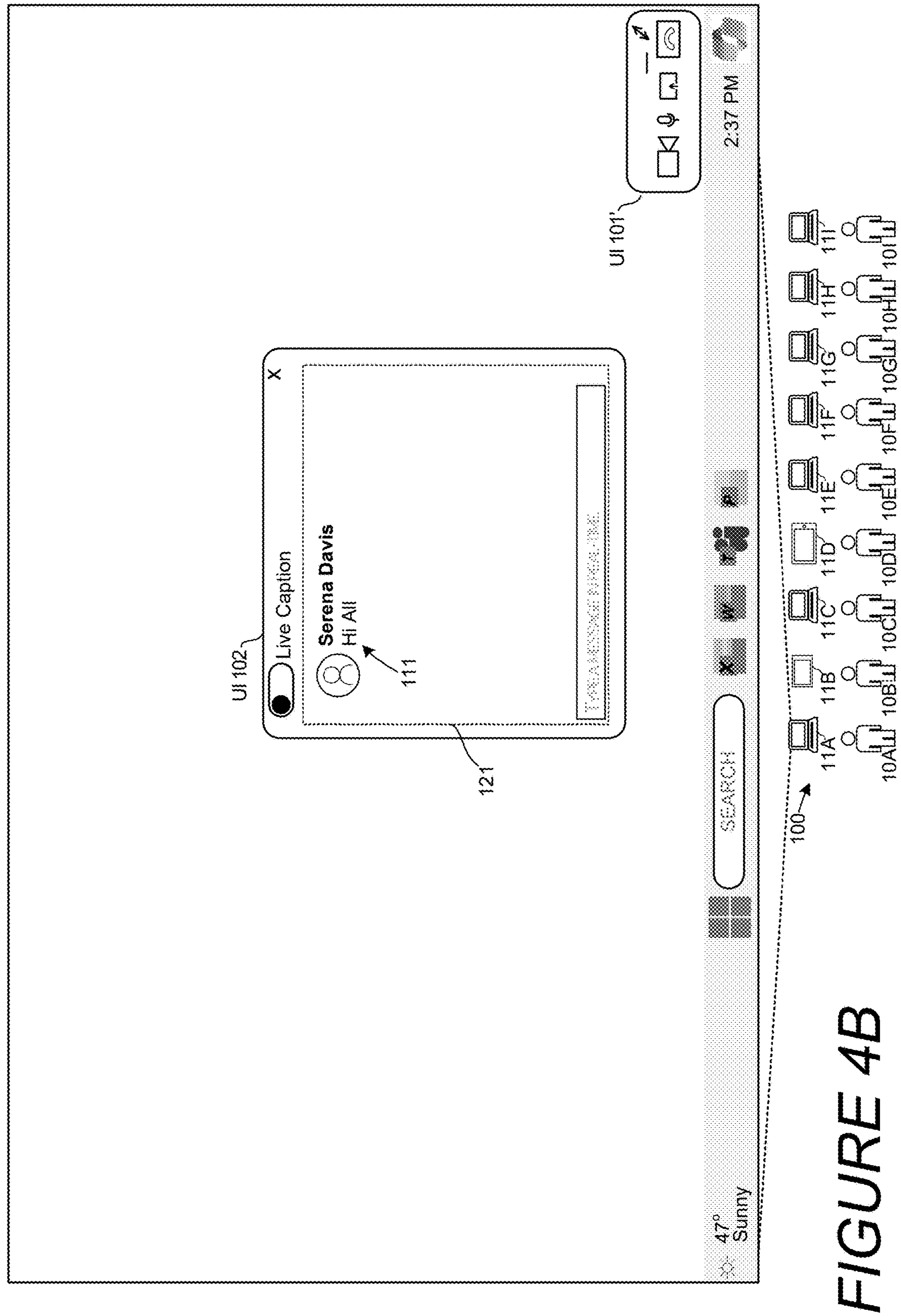
FIG. 4B shows a first user interface arrangement showing a reduced stage of a meeting without video streams or images, the reduced stage concurrently displayed with a display of real-time text.

FIGS. 4A-4B show an example of a process where an input to minimize, e.g., reduce the size of a meeting UI 101, which causes the display of a separate UI reserved for RTT and a display of a modified meeting UI displaying control buttons without displaying shared content, e.g., meeting images or video stream renderings. FIG. 4A shows a device receiving an input for minimizing a meeting UI 101 displaying real-time text 111 and the at least one of the video stream 115 or the image 116. In this example, as shown in FIG. 4B, in response to the input to minimizing the first user interface arrangement 101, the system maintains the display of the real-time text 111 while reducing the size of the first user interface arrangement 101 to display a modified meeting UI 101'. The real-time text 111 is displayed in a new UI 102 having a region 121 reserved for real-time text 111. In this particular example, the system generates the modified meeting UI 101' having a region 122 reserved for meeting control buttons without the display of shared videos or images.

Figure 5A:
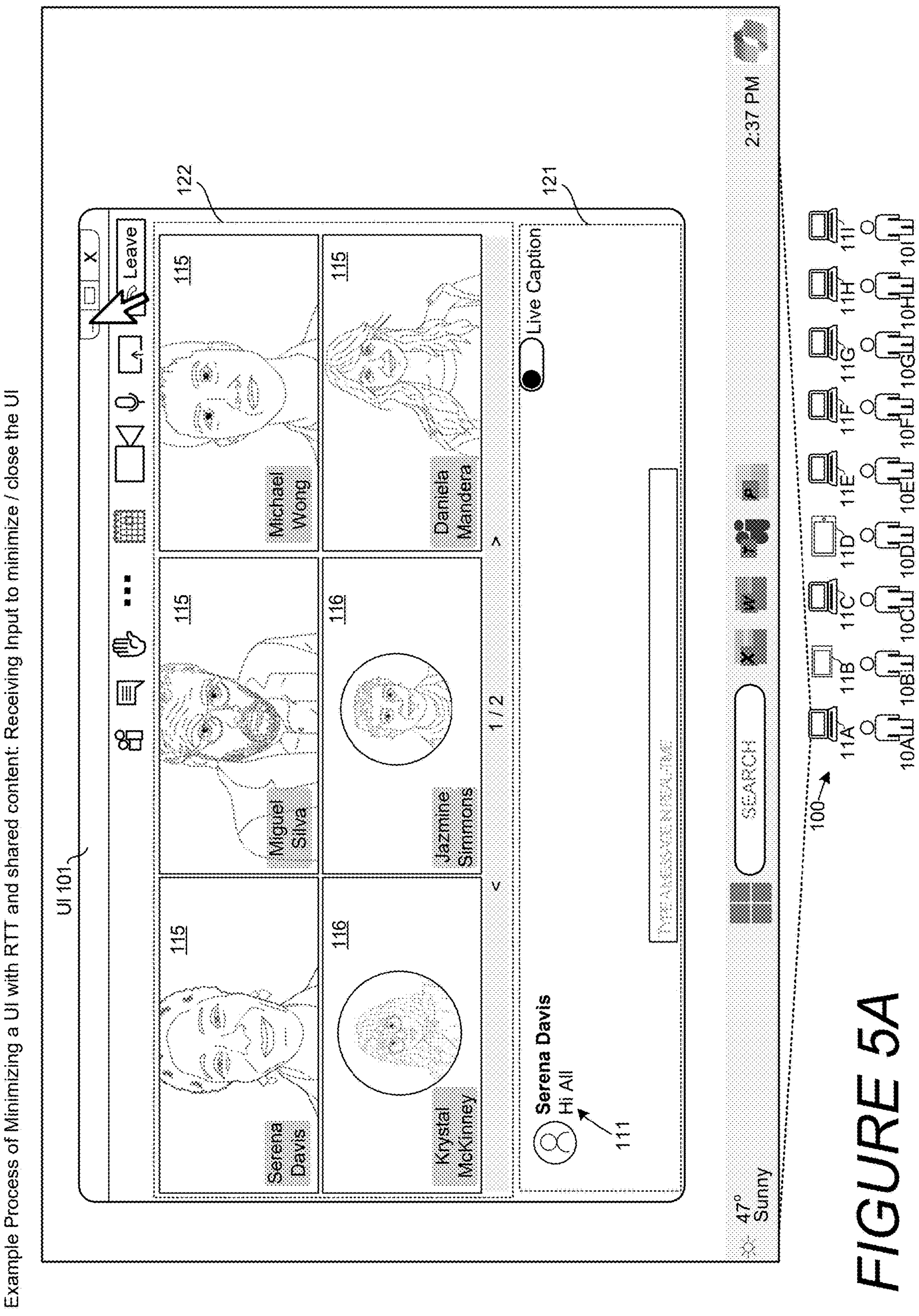
FIG. 5A shows a first user interface arrangement showing a stage of a meeting with a display of real-time text.
Figure 5B:
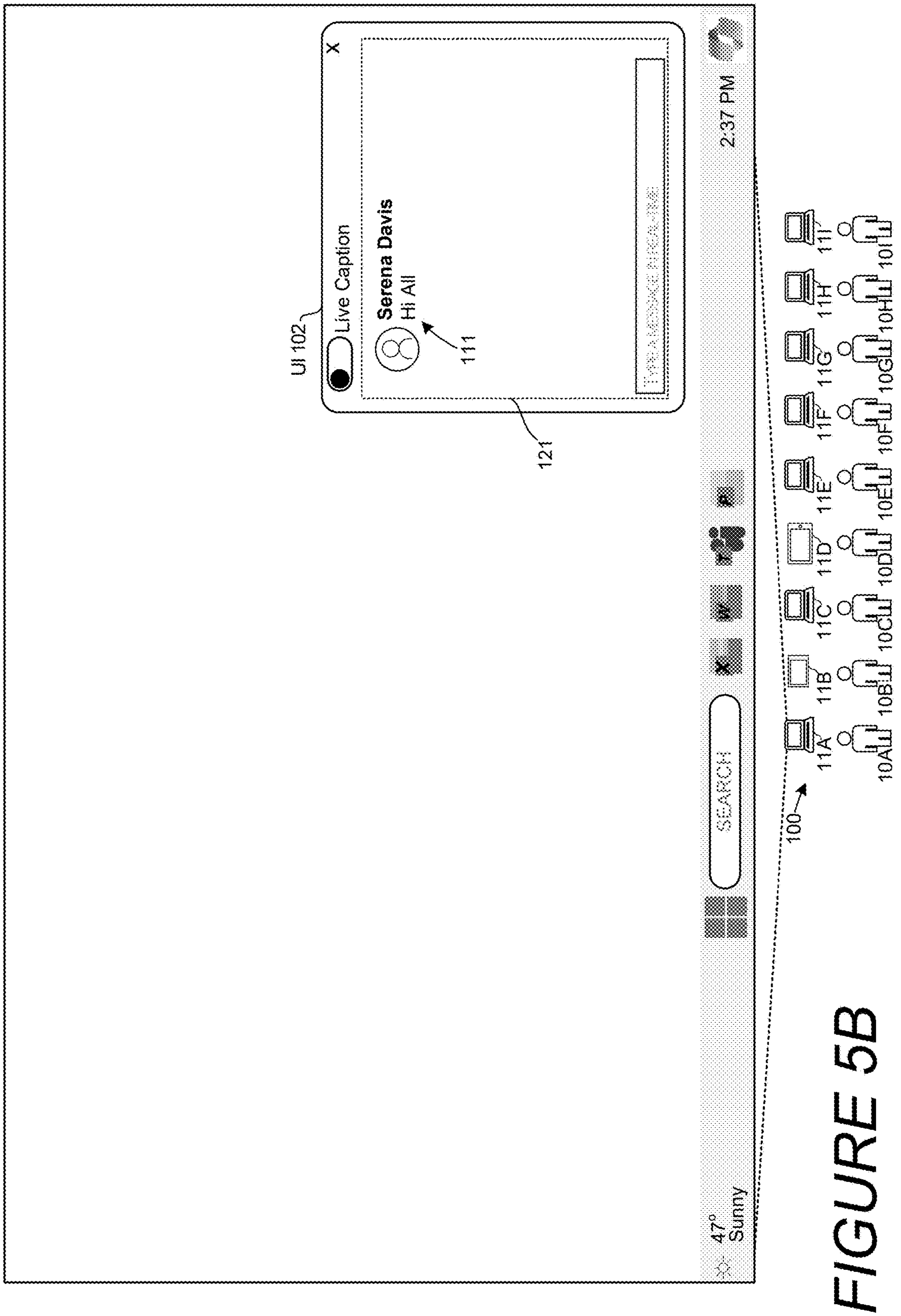
FIG. 5B shows a first user interface arrangement showing a minimized stage of a meeting and a display of real-time text.

FIGS. 5A-5B show an example of a process where an input to minimize the UI 101 causes the display of a separate UI reserved for RTT and removes the display of the shared images and video stream renderings. FIG. 5A shows a device receiving an input for minimizing a UI 101 displaying real-time text 111 and the at least one of the video stream 115 or the image 116. In this example, as shown in FIG. 5B, in response to the input to minimize the first user interface arrangement 101, the system maintains the display of the real-time text 111 while removing the first user interface arrangement 101. In a variation of this embodiment, in response to the input, the system can remove the shared content from the first user interface arrangement 101 of FIG. 5A while maintaining the display of the RTT in that same user interface.

Figure 6:
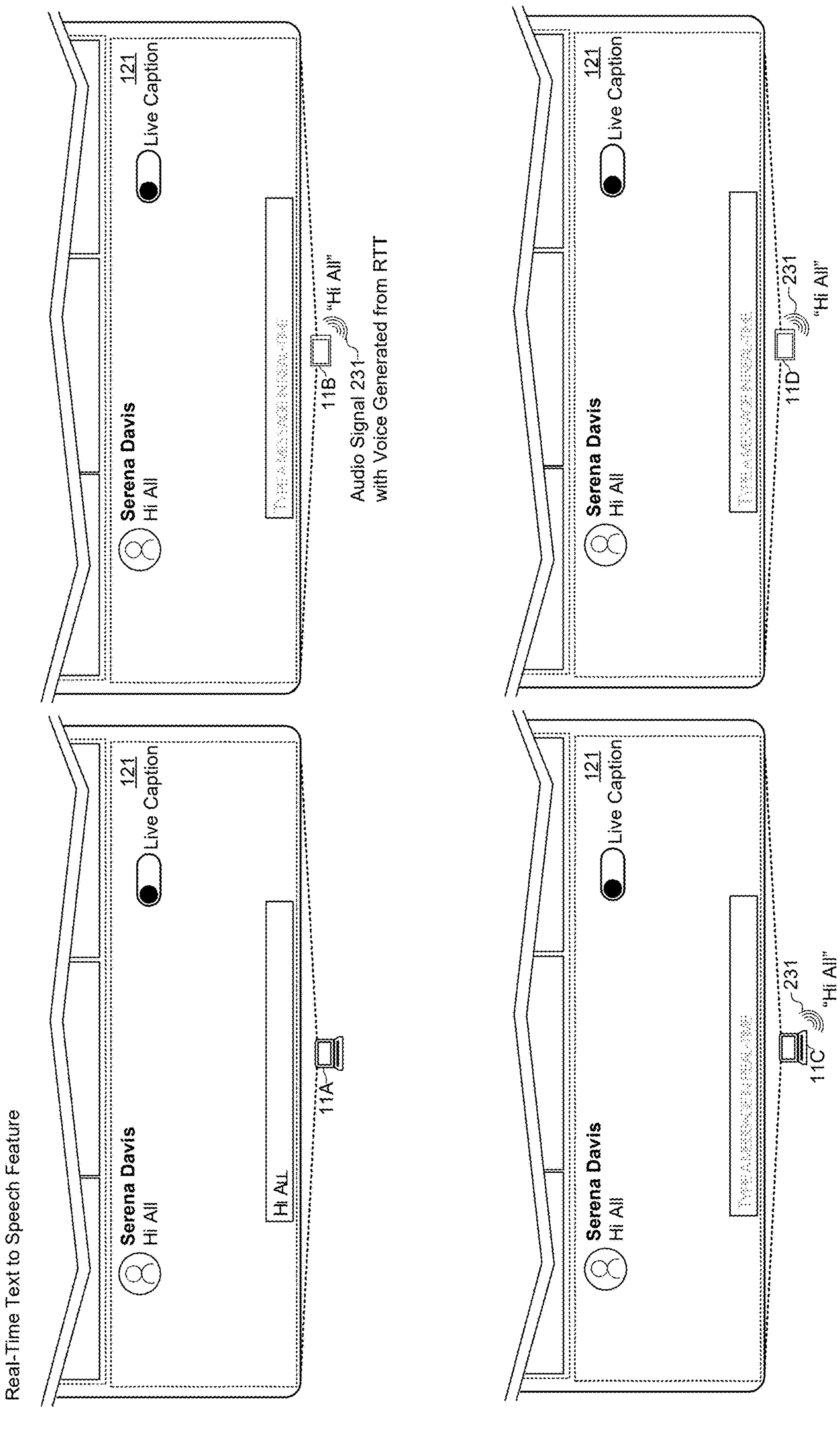
FIG. 6 shows a text-to-voice feature that generates an audio signal comprising a voice enunciating the real-time text received at each client device of a meeting.

FIG. 6 shows a text-to-voice feature that generates an audio signal 231 comprising a computer-generated voice enunciating words that are included in the real-time text received at each client device of a meeting. As shown, when User A types RTT at the first device, the RTT is displayed on a character-by-character basis at each of the other devices in the meeting. When the RTT is received at each device, the system generates a computer-generated voice enunciating words or phrases that are formed by the RTT. The audio signal 231 can be generated based on a word-by-word basis or the audio signal 231 can be generated in response to detecting one or more criteria. For instance, the audio signal 231 may be generated when the RTT forms a full sentence, a phrase, or a gesture. For example, the audio signal 231 may be generated when the RTT forms a predetermined phrase or expression, such as, "TTL" generates a voice saying "talk to you later," etc. The audio signal 231 can also include inflections or variations in the volume and/or tone in the computer-generated voice based on a rate the TTL is received or based on pauses in the timing of each character is received.

Referring now to FIGS. 7A-7D and 8A-8D, features for bringing focus to users who are providing RTT are shown and described below. Specifically, FIGS. 7A-7D show UI features from the perspective of a user contributing the RTT, and FIGS. 8A-8D show UI features from the perspective of users receiving the RTT.

Figure 7A:
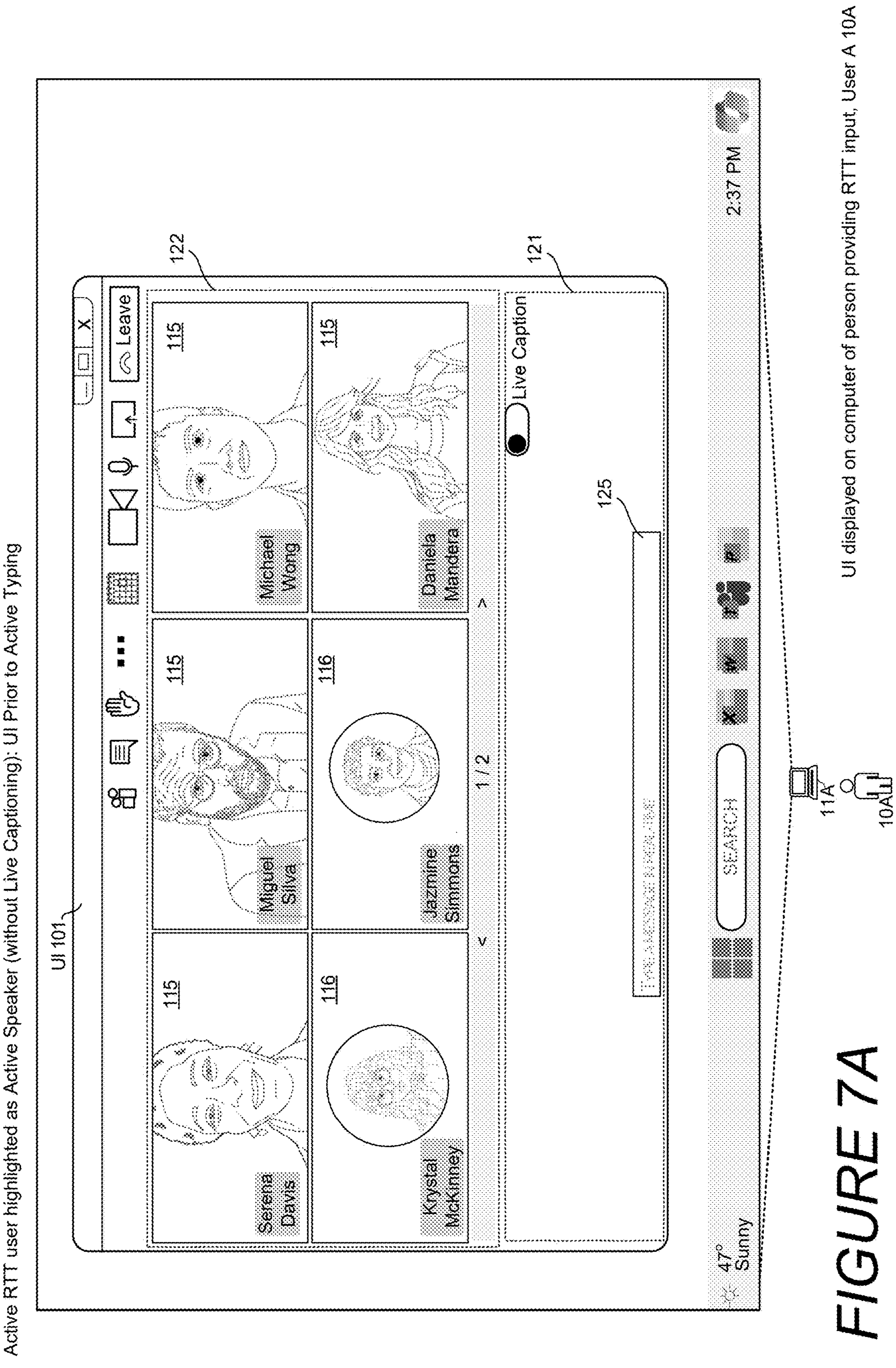
FIG. 7A shows UI features from the perspective of a user contributing the RTT, where a system generates graphical elements for drawing focus to a person actively typing real-time text, this figure showing a state of a UI where the user is not actively typing.
Figure 7B:
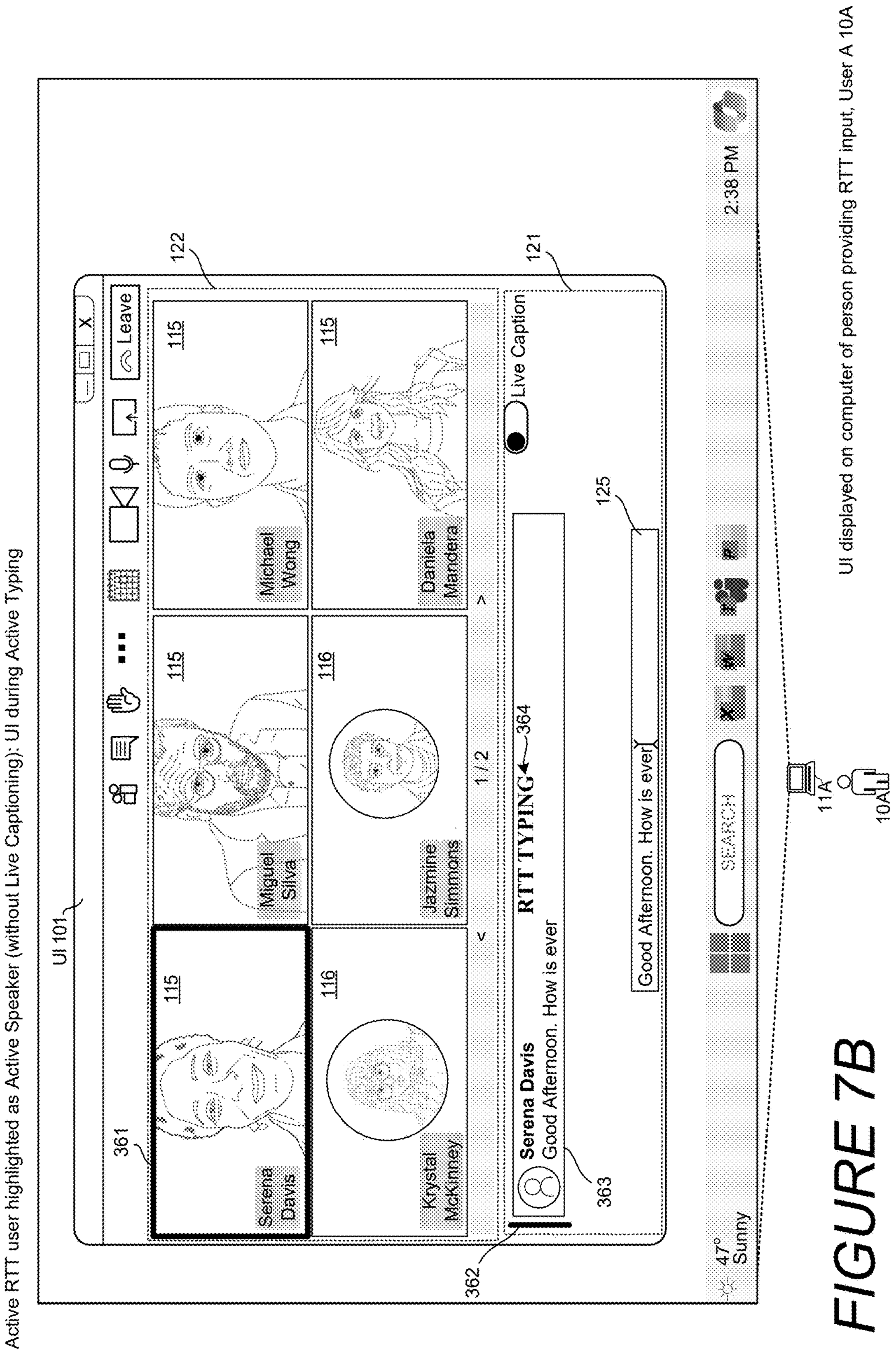
FIG. 7B shows UI features from the perspective of a user contributing the RTT, where a system generates graphical elements for drawing focus to a person actively typing real-time text, this figure showing a state of a UI where the user is actively typing RTT.
Figure 7C:
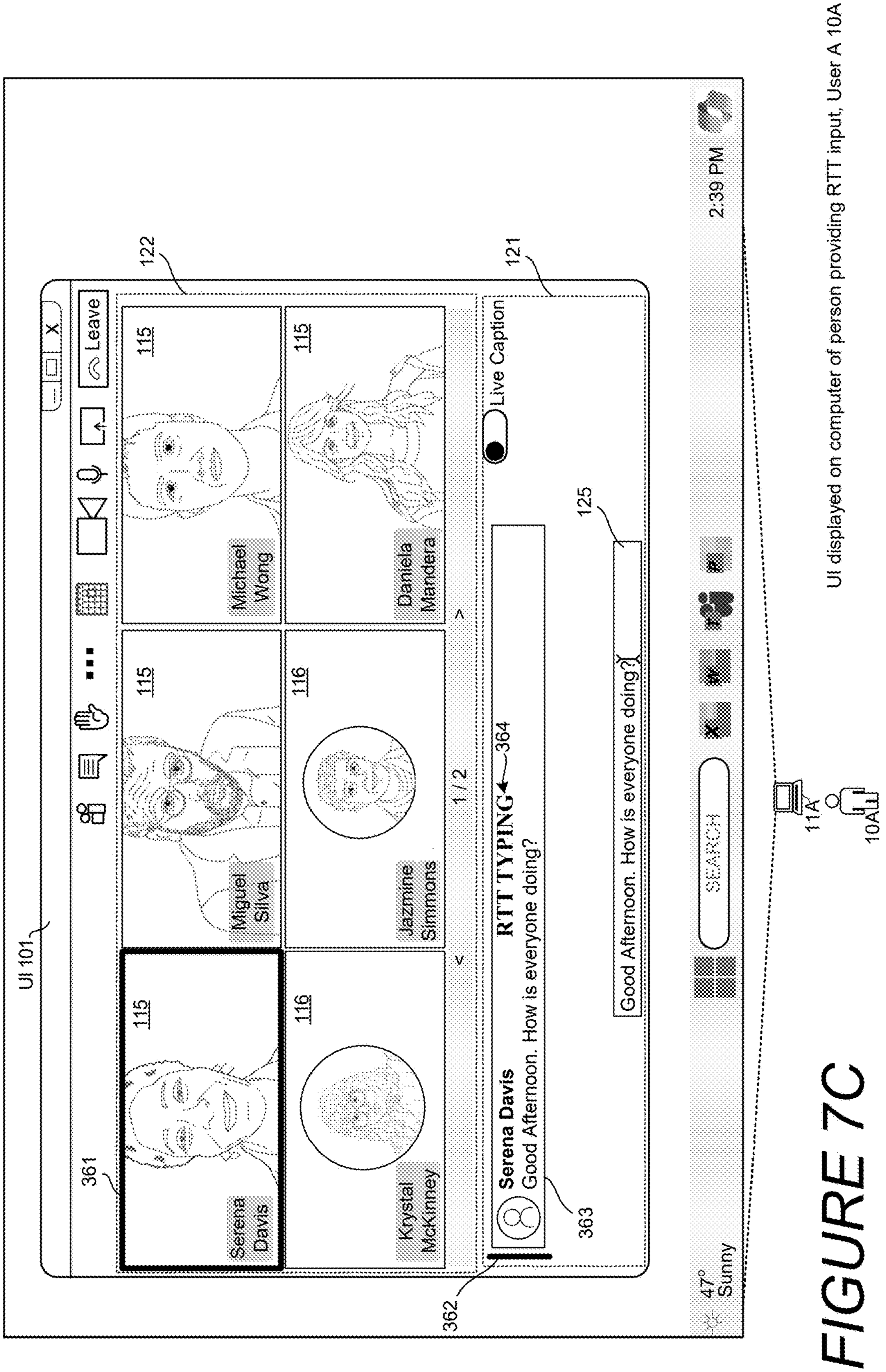
FIG. 7C shows UI features from the perspective of a user contributing the RTT, where a system generates graphical elements for drawing focus to a person actively typing real-time text, this figure showing a state of the UI where the user is continuing to type RTT.

The UI shown FIG. 7A shows a state of a meeting UI 101 when the meeting is in RTT mode but none of the users are providing RTT in the RTT input field 125. In this figure, since there is no active RTT typing, none of the user renderings, e.g., video renderings 115 or the image renderings 116, are highlighted. However, when User A starts to type RTT, as shown in FIG. 7B, one or more graphical indicators are displayed to bring focus to the user providing the RTT input. The graphical indicators can include a highlight 361 around an image or video of the user providing the RTT, a graphical indicator 362 in proximity to the RTT provided by the user, a graphical outline 363 around the RTT provided by the user, and/or a notification 364 describing the status of the RTT provided by the user. As shown in FIGS. 7B and 7C, the graphical indicators are displayed to bring focus to the user who is actively typing RTT, e.g., User A. For illustrative purposes, the system determines that a person is actively typing RTT when a person provides a text entry in the RTT entry field 125. As shown in FIGS. 7B and 7C, the user is typing text in the RTT entry field 125 and that input is causing the display of RTT in the content region displayed to all participants of the meeting.

Figure 7D:
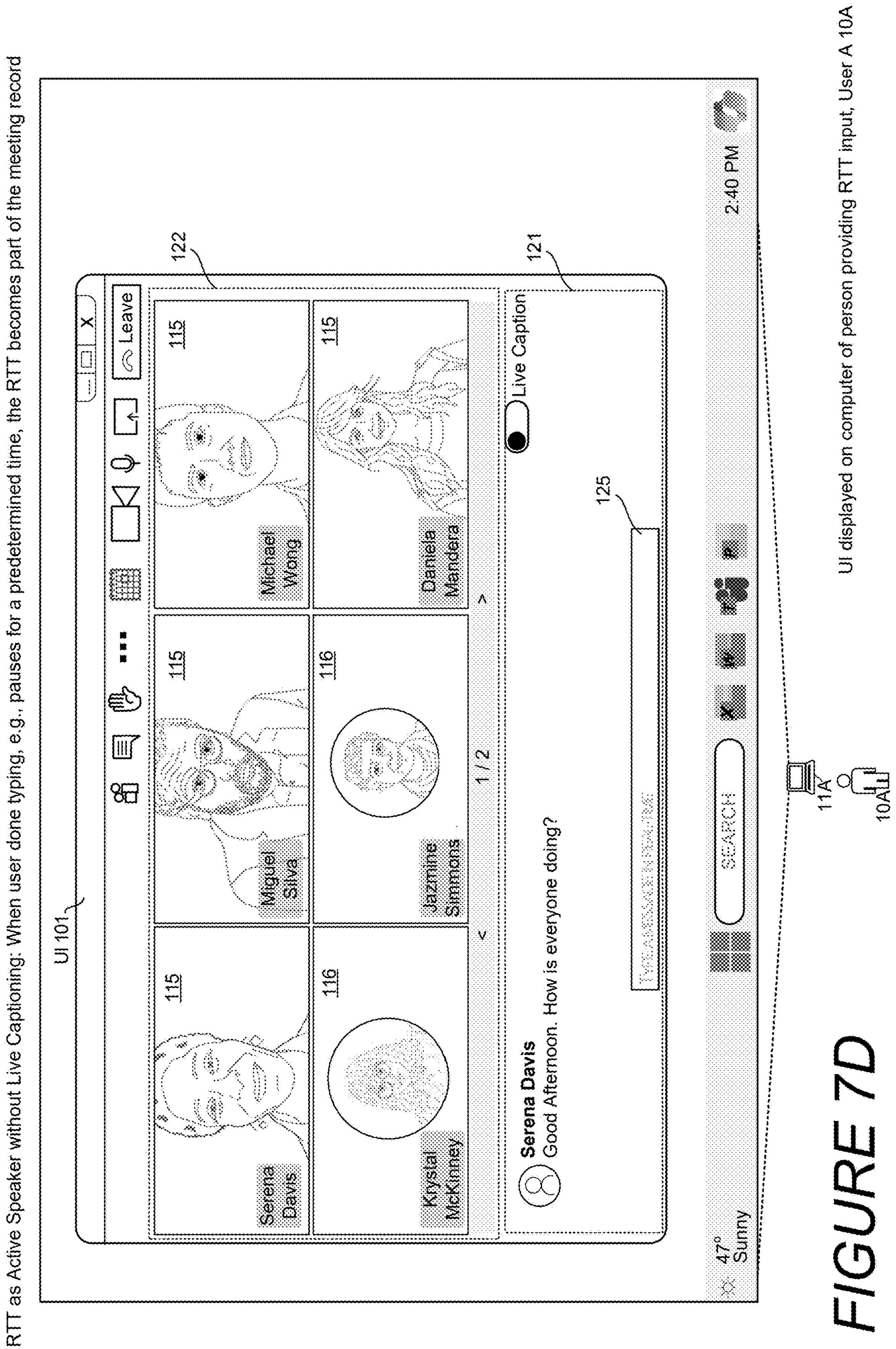
FIG. 7D shows UI features from the perspective of a user contributing the RTT, where a system generates graphical elements for drawing focus to a person actively typing real-time text, this figure showing a state of the UI after the user has stopped typing the RTT.

The system can determine that a person is actively typing RTT until that person stops typing for a predetermined time, which can be 3 to 5 seconds, or until a predetermined key is entered, e.g., a return character. FIG. 7D shows a state of the UI after the user has stopped typing the RTT for a predetermined period of time. When the system detects that the person is not actively typing RTT, the graphical indicators bringing focus to the RTT user are removed, and the RTT that has been received to that point becomes a fixed entry in the meeting records, e.g., that entry cannot be edited by providing additional input to the RTT text entry field 125. For illustrative purposes, a RTT entry includes a collection of characters that are entered in a single typing session that starts with one user typing text into the RTT field 125, and ends after the user has stopped for a predetermined time or until a predetermined key is entered.

Figure 8A:
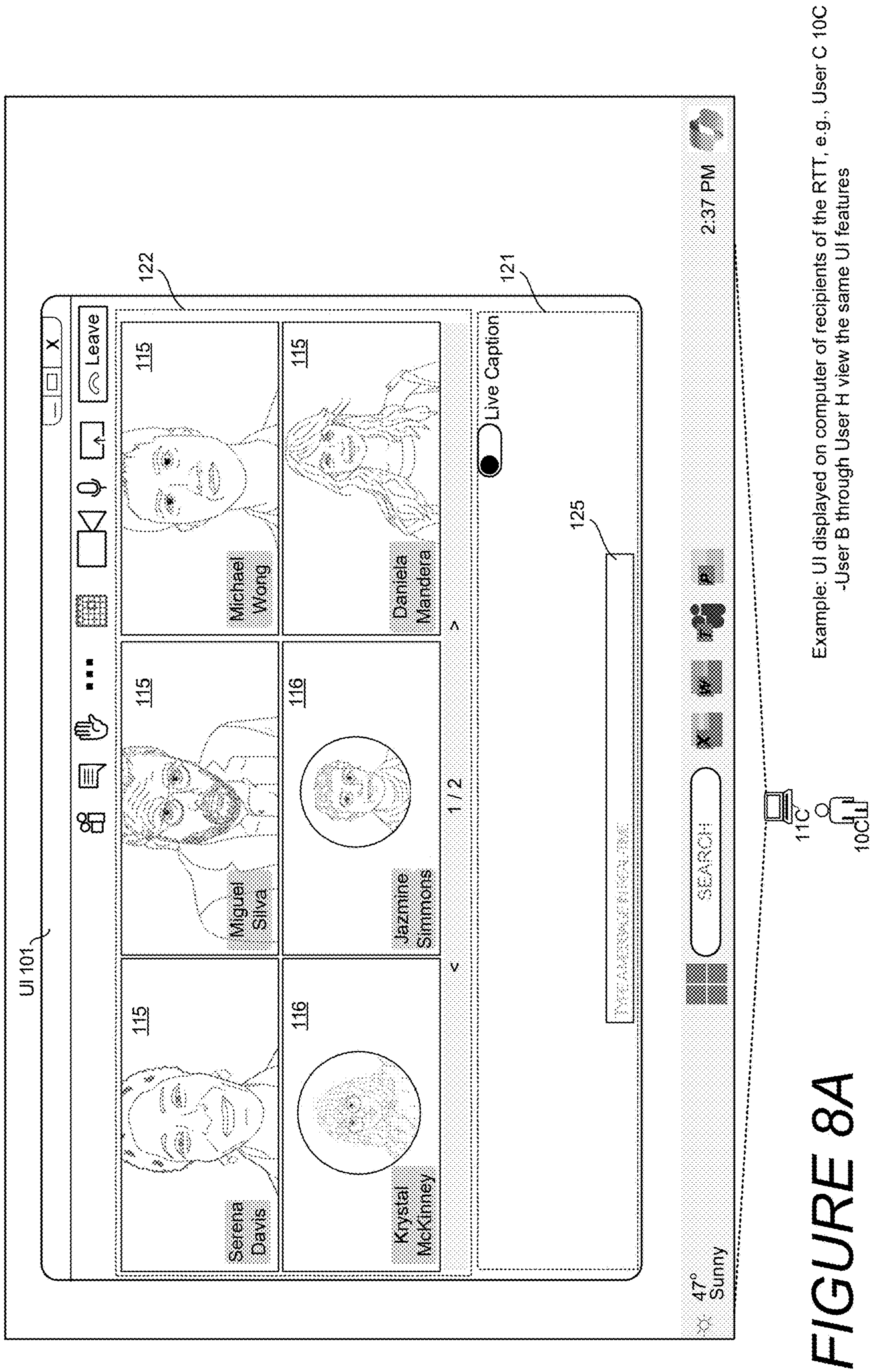
FIG. 8A shows UI features from the perspective of a user receiving RTT, where a system generates graphical elements for drawing focus to a person actively typing real-time text, this figure showing a state of a UI where the user is not actively typing.
Figure 8B:
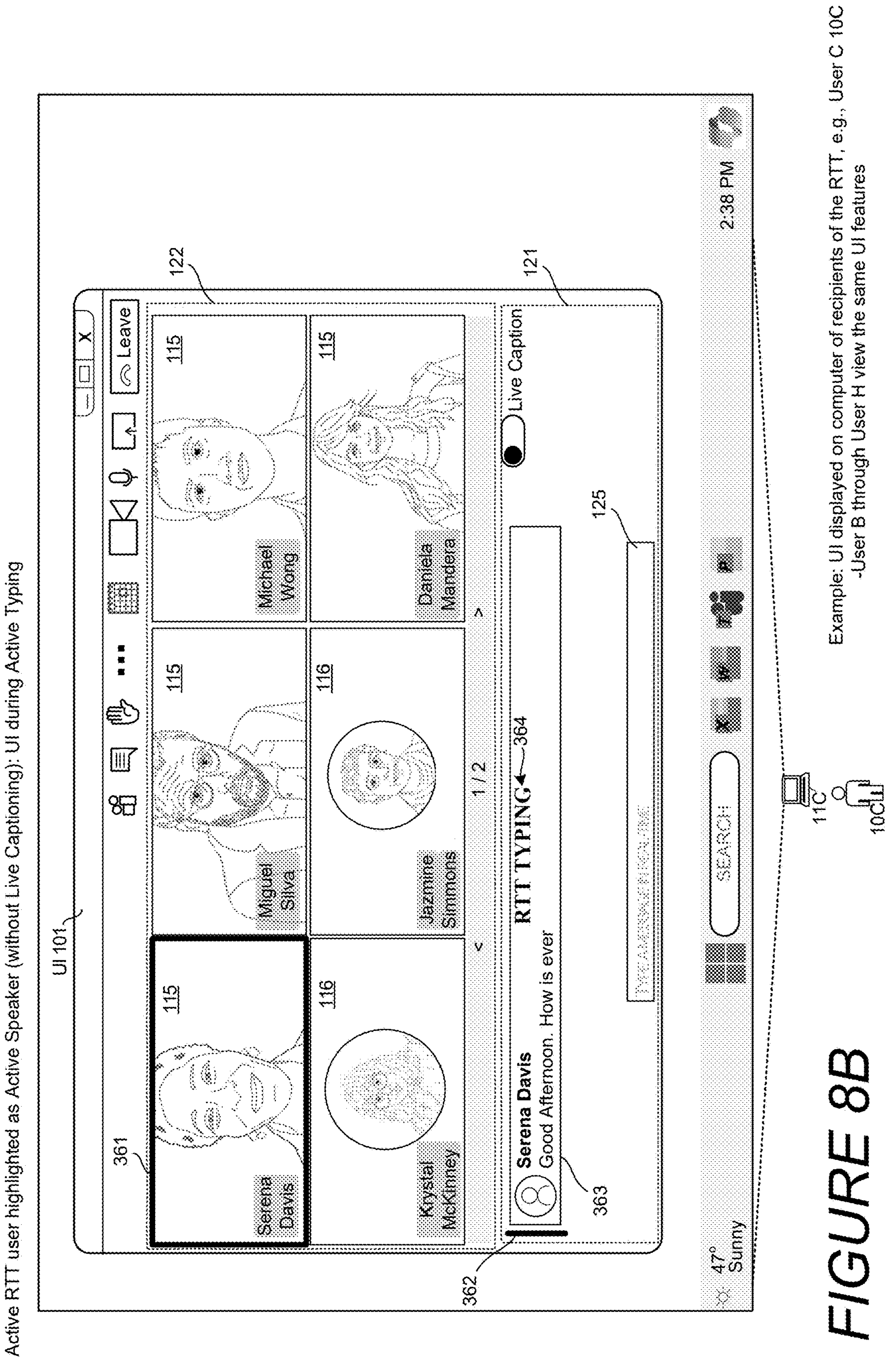
FIG. 8B shows UI features from the perspective of a user device receiving the RTT, where a system generates graphical elements for drawing focus to a person actively typing real-time text, this figure showing a state of a UI where the user is actively typing RTT.
Figure 8C:
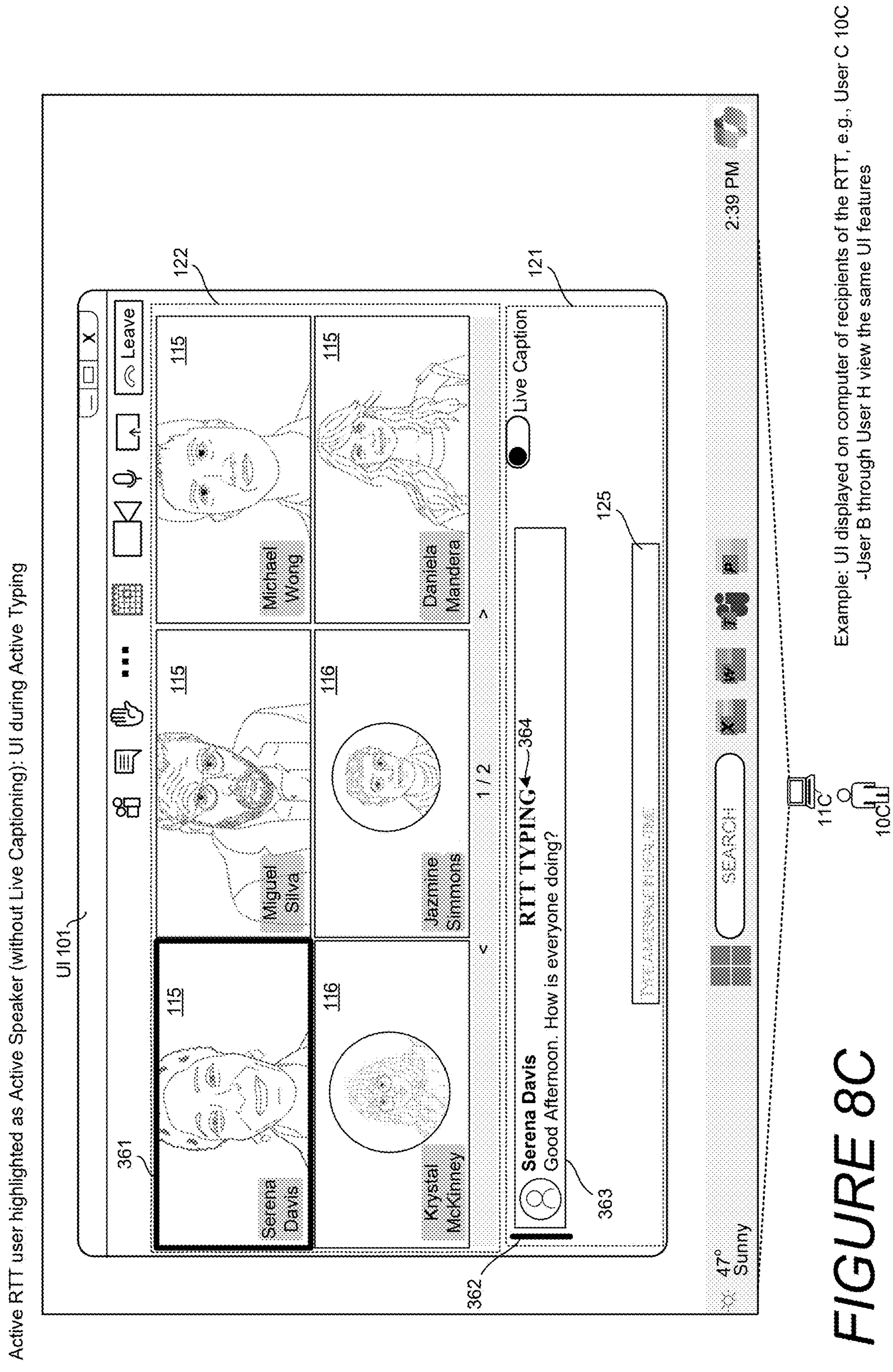
FIG. 8C shows UI features from the perspective of a user device receiving the RTT, where a system generates graphical elements for drawing focus to a person actively typing real-time text, this figure showing a state of the UI where the user is continuing to type RTT.
Figure 8D:
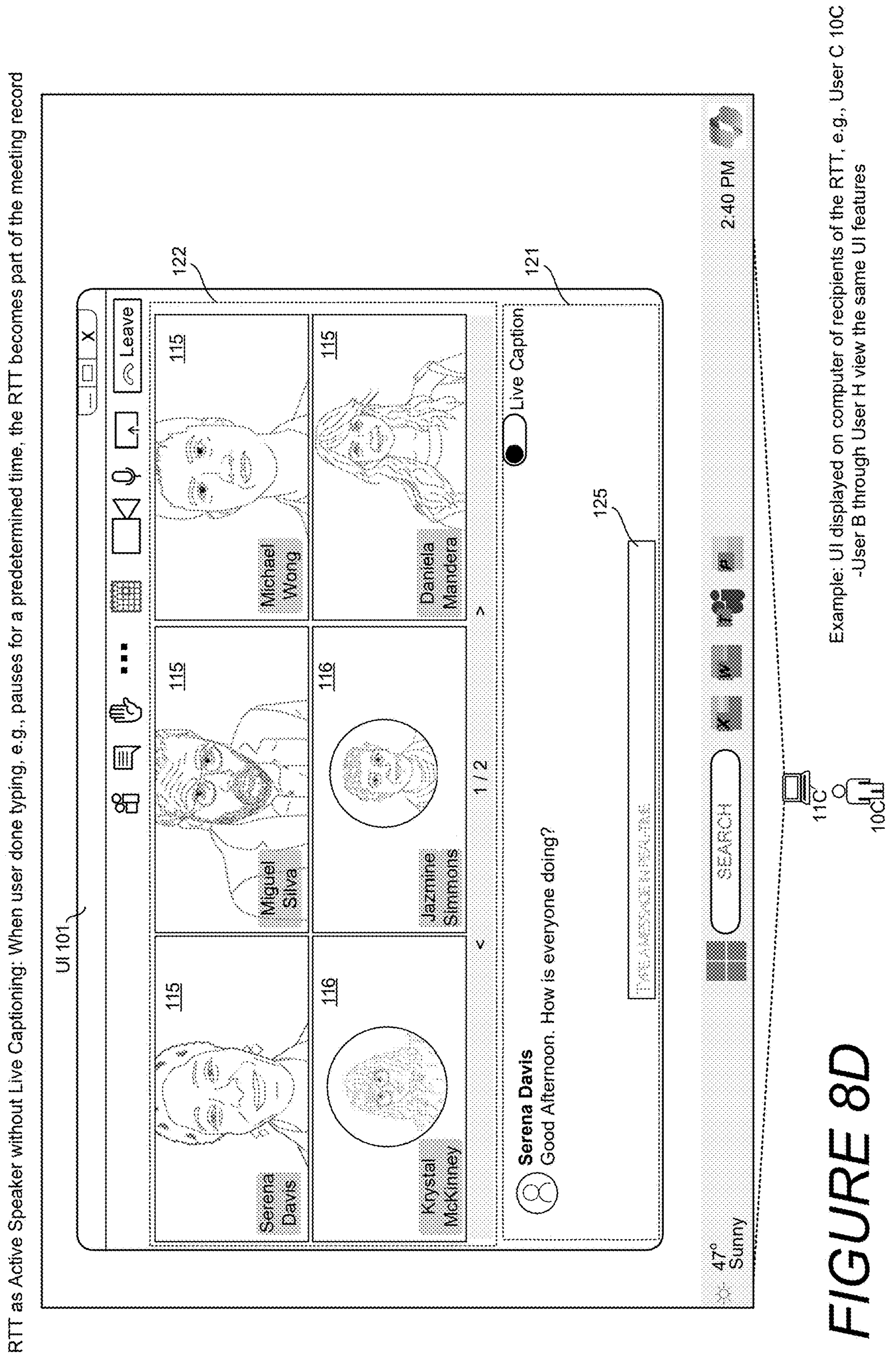
FIG. 8D shows UI features from the perspective of a user device receiving the RTT, where a system generates graphical elements for drawing focus to a person actively typing real-time text, this figure showing a state of the UI after the user has stopped typing the RTT.

FIGS. 8A-8D show a sequence of drawings that include the same sequence shown in FIGS. 7A-7D, however, these drawings show UI features from the perspective of users receiving the RTT. This particular example is specifically from the perspective from the device 11C of User C, and this same UI is also contemporaneously displayed on devices 11B-11I. In FIG. 8A, since there is no active RTT typing, none of the user renderings, e.g., video renderings 115 or the image renderings 116, are highlighted. However, when User A starts to type RTT, as shown in FIG. 8B, one or more graphical indicators are displayed to bring focus to the user (User A, Serena) providing the RTT key input. The graphical indicators can include a highlight 361 around an image or video of the user providing the RTT, e.g., User A, a graphical indicator 362 in proximity to the RTT text provided by the user, a graphical outline 363 around the RTT text provided by the user, and/or a notification 364 describing the status of the RTT provided by the user. As shown in FIGS. 8B and 8C, the graphical indicators are displayed to bring focus to the user who is actively typing RTT. In these figures, no text is displayed in the input field because User C is not providing an RTT input. FIG. 8D shows a state of the UI after User A has stopped typing the RTT for a predetermined period of time. In response, the graphical indicators bringing focus to User A are removed.

Referring now to FIGS. 9A-9F, embodiments for combining RTT with live caption text is shown and described below. When live caption mode is activated, the system generates live caption text from the vocal input of meeting participants and combines the live caption text with RTT in a single communication stream (also referred to herein as a "conversation" or "conversation stream"). This enables the system to generate a single communication stream that includes what speaking participants are saying verbally in a meeting with RTT content provided by typing participants. This enables the users that are communicating using the real-time text to directly respond to comments that are made by speaking participants, and enables the speaking participants to also respond in the same stream directly to real-time comments that are made by typing participants. This provides a number of technical benefits in that users can see different modes of communication in one user interface. A system can then inject that single communication stream in places like transcript and copilot, and then factor the input from RTT users like it is a verbal input.

Figure 9A:
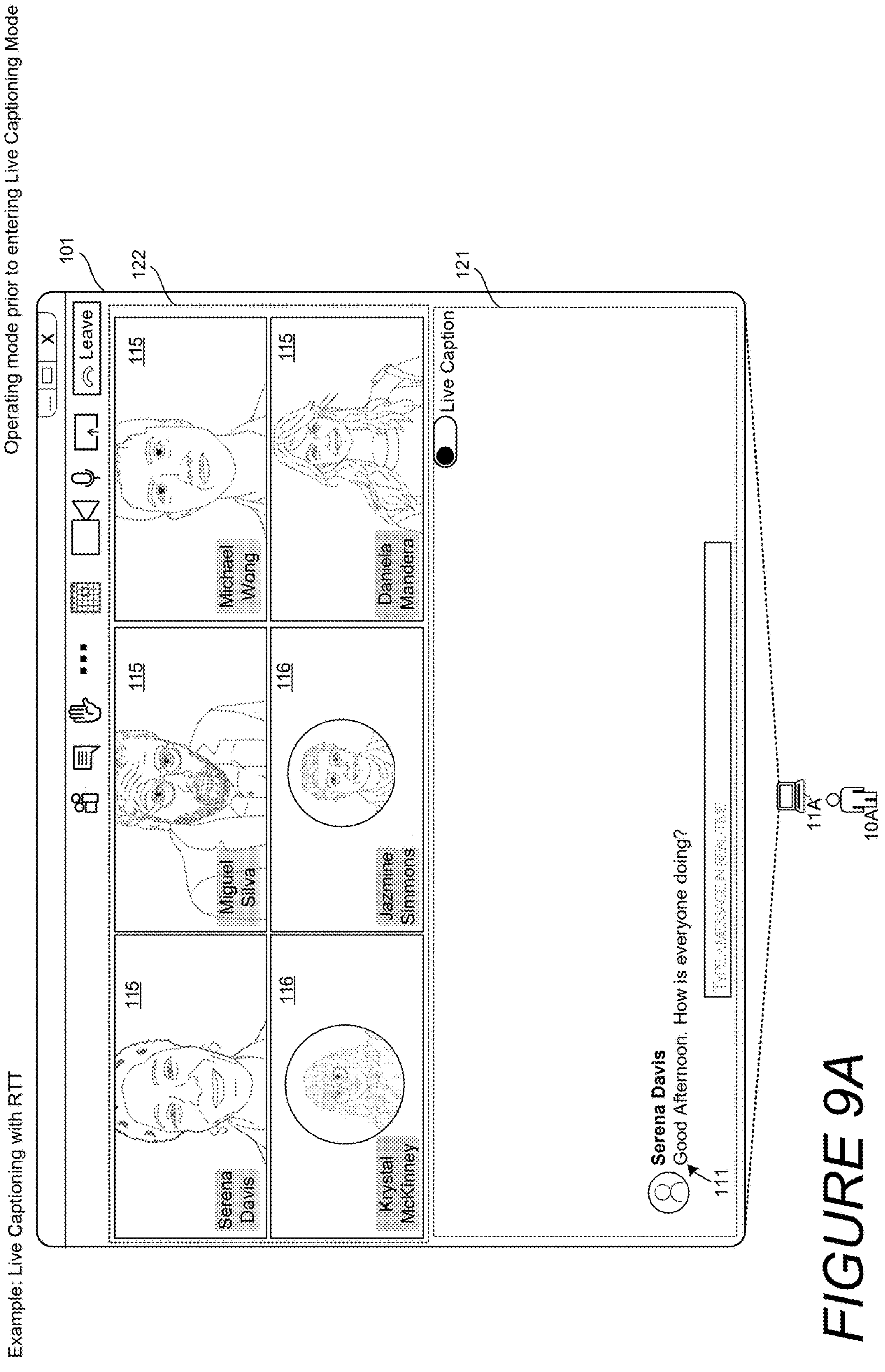
FIG. 9A pertains to an example of the live caption features, this figure showing a state of the UI prior to the activation of the live caption mode.
Figure 9B:
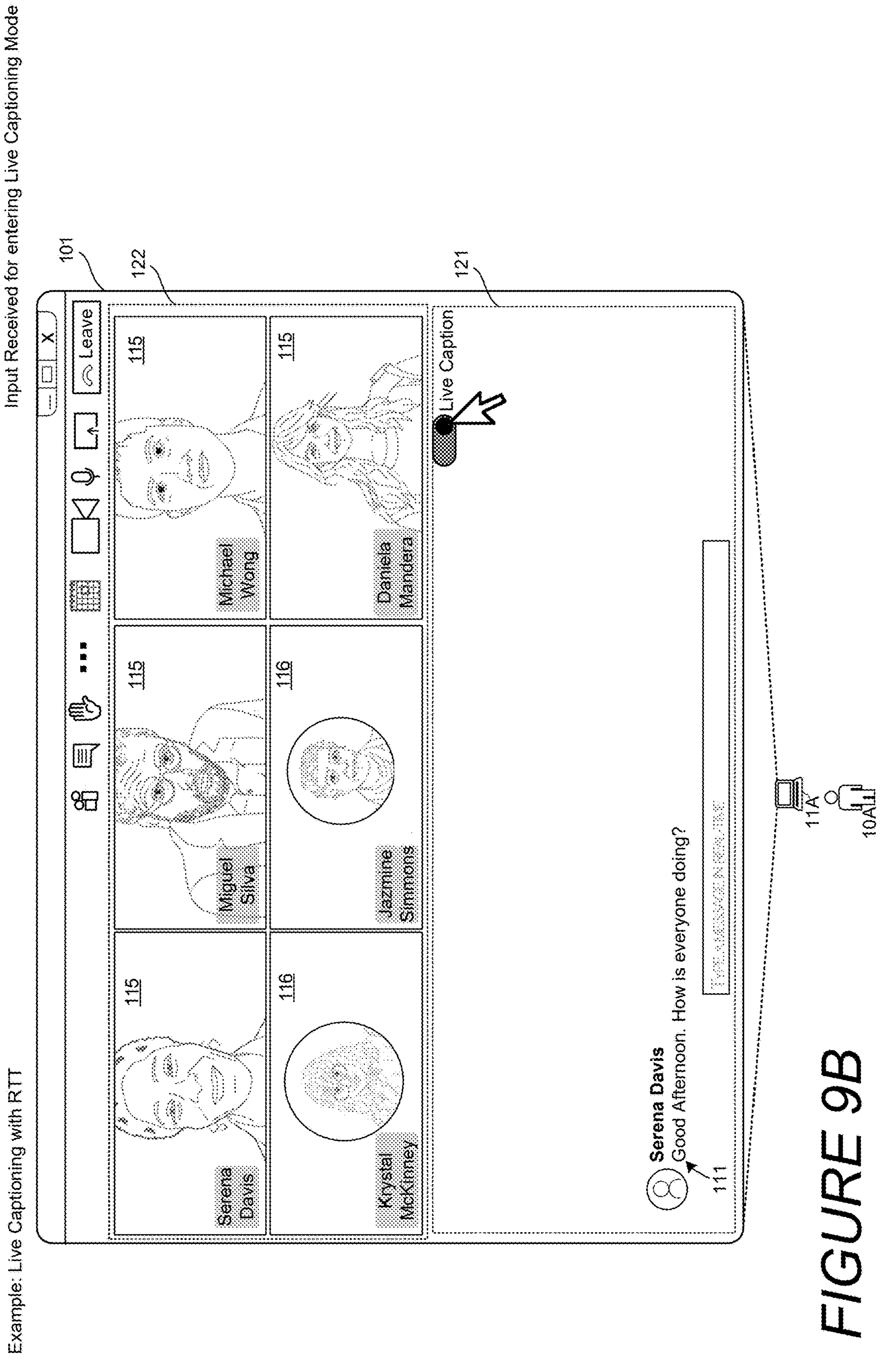
FIG. 9B pertains to an example of the live caption features, this figure showing a state of the UI during the activation of the live caption mode.

FIG. 9A shows a state of the meeting UI 101 before the activation of the live caption mode. In this example, the first display region 121 is reserved for RTT and live caption text. The UI is in a state where the first user has already posted an RTT entry to the conversation. FIG. 9B shows the state of the UI during the activation of the live caption mode. This can include an input from a pointing device or the input can be made via a voice command, or by the use of any other suitable device detecting a gesture input.

Figure 9C:
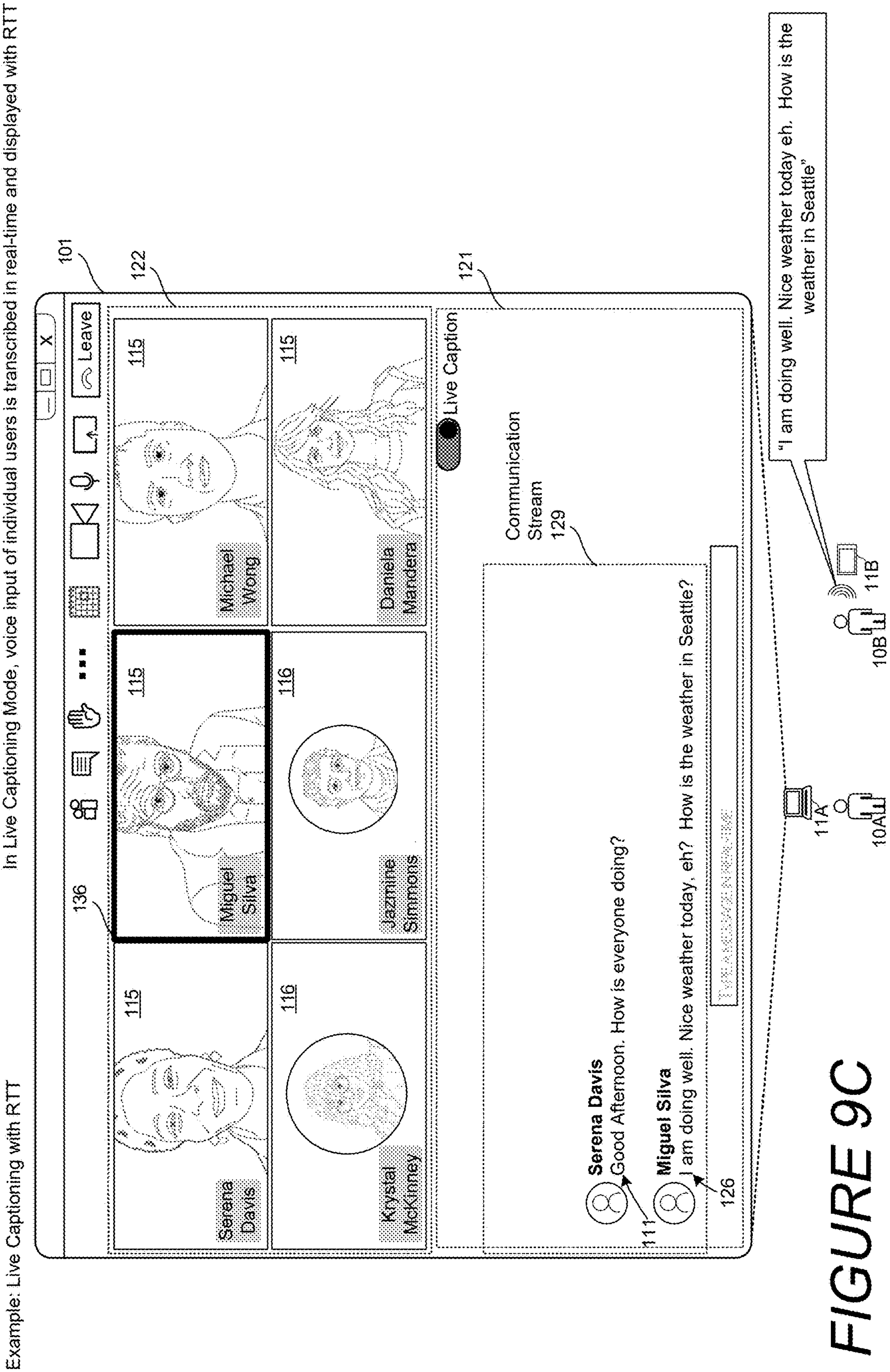
FIG. 9C pertains to an example of the live caption features, this figure showing a state of the UI while live caption mode is active, where a vocal input from a user is displayed in a UI region with RTT, and a highlight is generated for the user contributing the vocal input.

Once live caption mode is activated, the system generates live caption text from the vocal input of meeting participants and combines the live caption text with RTT in a single communication stream. As shown in FIG. 9C, while live caption mode is active, a vocal input provided by a user, such as User B at Device B, causes the system to transcribe the user's vocal input to generate live caption text 126. The live caption text 126 is added to a communication stream 129 that also includes the RTT 111. As the user is speaking in live caption mode, the system generates a highlight near the rendering of a video stream of the user to bring focus to the user that is talking.

Figure 9D:
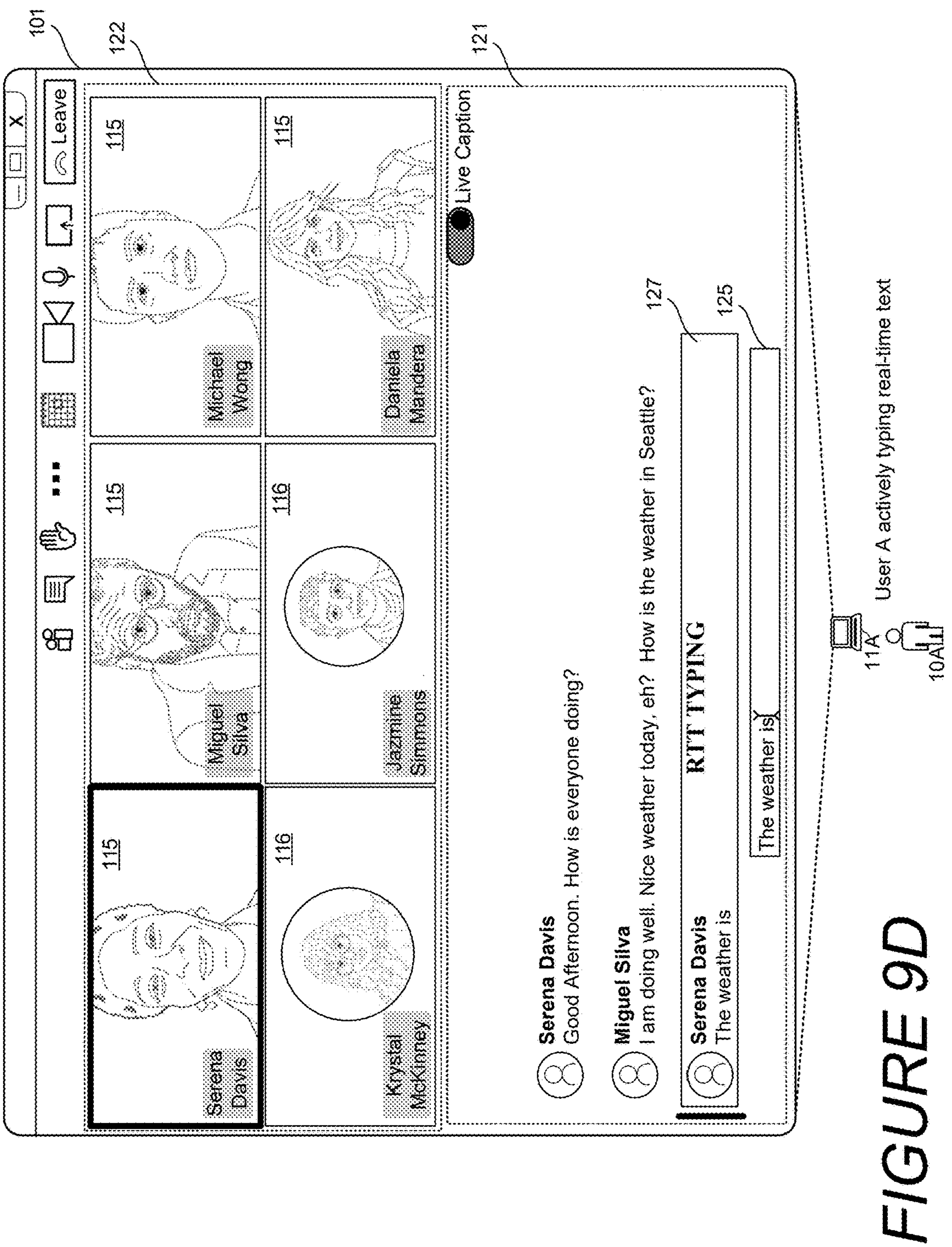
FIG. 9D pertains to an example of the live caption features, this figure showing a state of the UI while live caption mode is active, where an RTT input from a user is displayed in a UI region with text from a live caption, and a highlight is generated for the user contributing the RTT.

In FIG. 9D, User A starts to contribute additional RTT for a new entry. The RTT input from the user is displayed in the communication stream as a new entry that is separate from the previously added RTT ("Good Afternoon. How is everyone doing?") and the live caption text (I am doing well . . . "). As User A is typing, the system generates a highlight near the rendering of a video stream of User A. As shown, other visual indicators are also positioned around the newly added RTT to show that User A is actively contributing RTT.

Figure 9E:
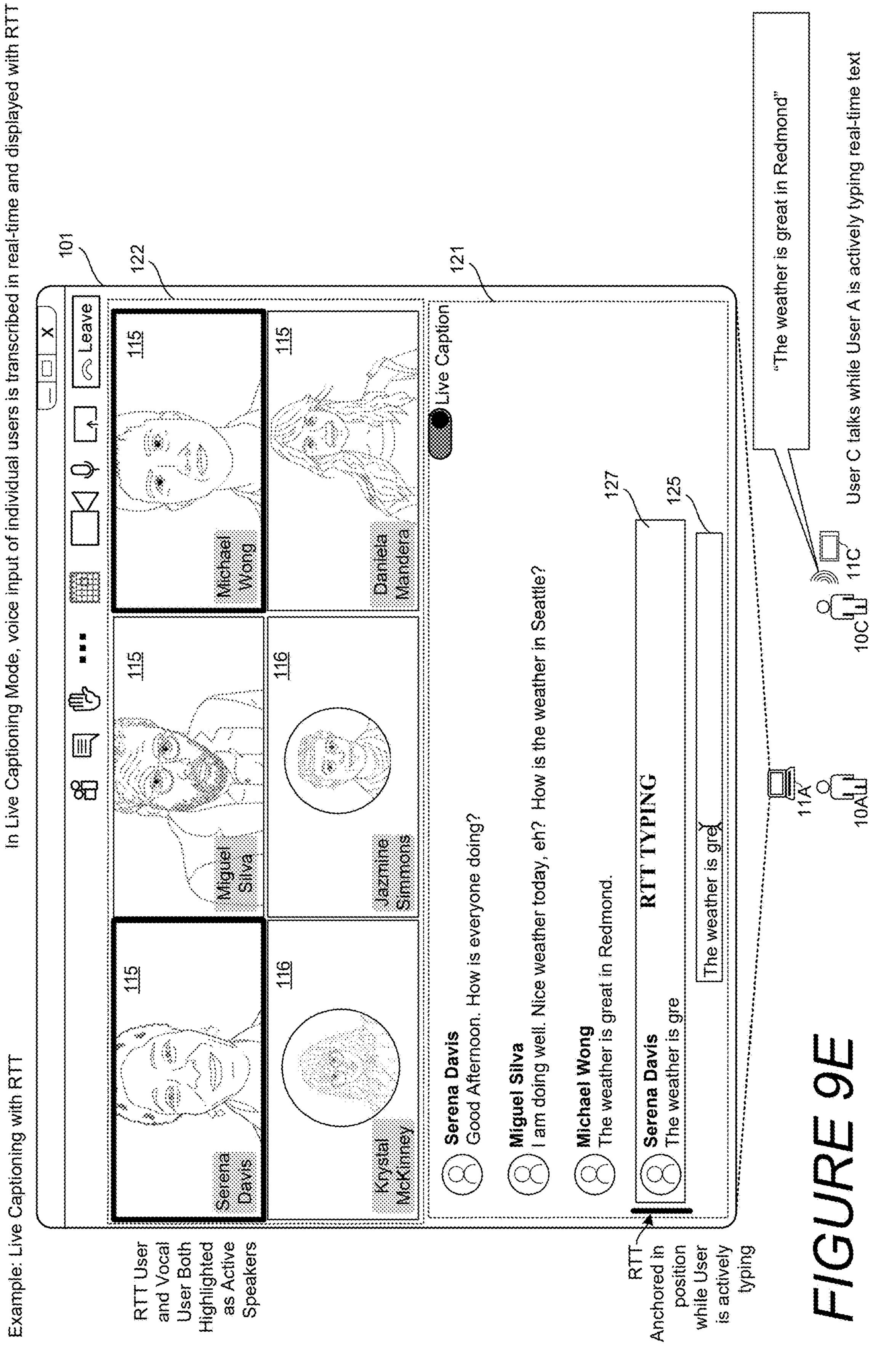
FIG. 9E shows an example of the live caption features, this figure showing a state of the UI while live caption mode is active, where an RTT input from a user is anchored in position while text from a live caption is added to the UI, and highlight is generated for the user contributing the RTT and the user contributing the contributing the vocal input.

In FIG. 9E, while User A continues to contribute additional RTT, User C contributes a vocal input. This causes the system to concurrently add the live caption text that is of User C to the communication stream, while User A continues to contribute additional RTT. As User A is actively typing, the system continues to generate a highlight around the rendering of a video stream of the typing user (User A), and while User C is speaking, the system generates a highlight around the rendering of a video stream of the user that is currently providing the vocal input (User C).

Figure 9F:
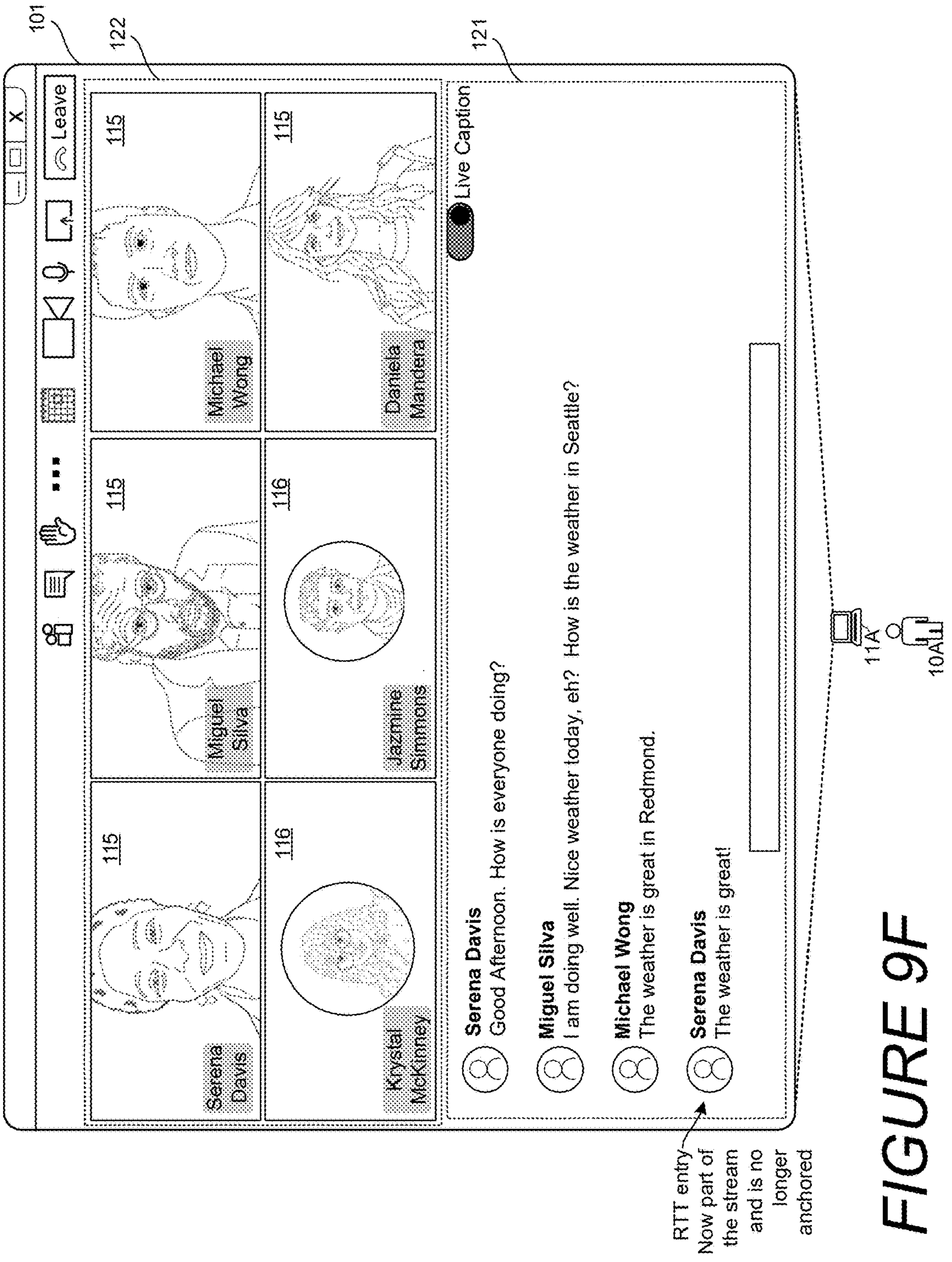
FIG. 9F shows an example of the live caption features, this figure showing a state of the UI after a user providing RTT has stopped typing for a predetermined time.

Also shown in FIGS. 9D and 9E, the system provides an anchoring feature for RTT that is currently being added to the communication stream. In this example, while User A is actively typing RTT, the RTT that is being added from the RTT entry field 125 is anchored in a predetermined position 127, such as the bottom of the conversation stream. As shown in FIGS. 9D and 9E, as User A is actively typing, the RTT being added to the communication stream is anchored at the bottom of the conversation stream until User A stops typing for a predetermined period of time or enters a predetermined key, e.g., the return key. As shown in FIG. 9F, after User A stops typing for a predetermined period of time or enters a predetermined key, that RTT is timestamped and added as an entry to the communication stream and is no longer anchored at the bottom of the conversation stream. From that point, newly received RTT or newly received live caption text is then positioned at the bottom of the conversation stream.

Referring now to FIGS. 10A-10E, techniques for controlling the display of RTT when a user contributes RTT to a closed RTT window are shown and described. This example is from the perspective of a UI that is displayed on a device 11C of User C 10C, and User A is providing the input to generate the RTT. This example starts at FIG. 10A, where User C provides an input to activate a screen sharing mode to share content in a desktop environment. While in screen sharing mode, a UI 102 is generated for the display of the RTT. This can also include the live caption text if the live caption mode is activated. Also shown, a meeting UI 101 is also generated for the display of one or more shared video streams or images.

Figure 10A:
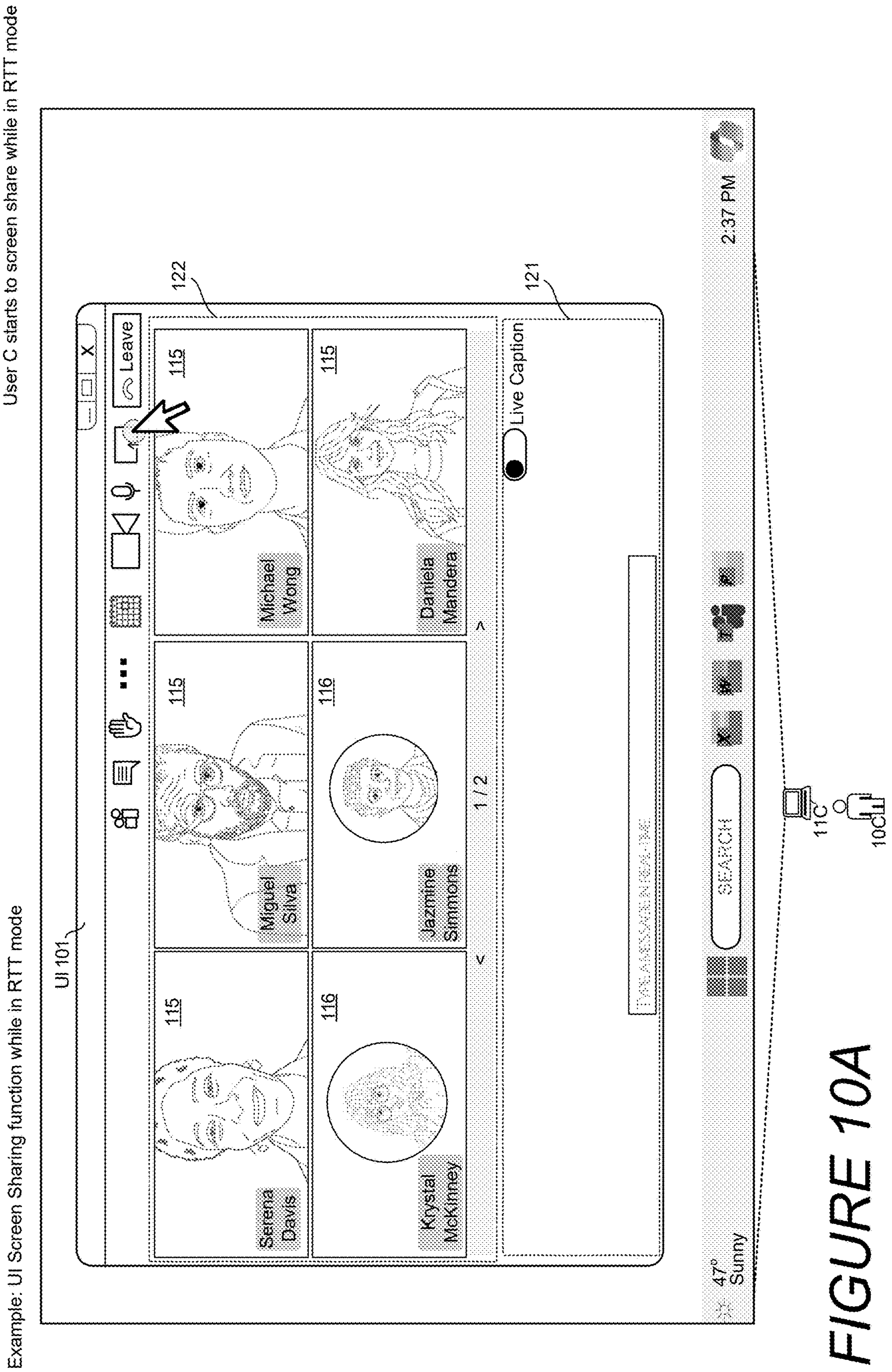
FIG. 10A pertains to a UI feature where a closed RTT window is automatically re-displayed when a user contributes RTT to a closed RTT window, this figure shows the state of a meeting where a user is activating a screen share to start a presentation.
Figure 10B:
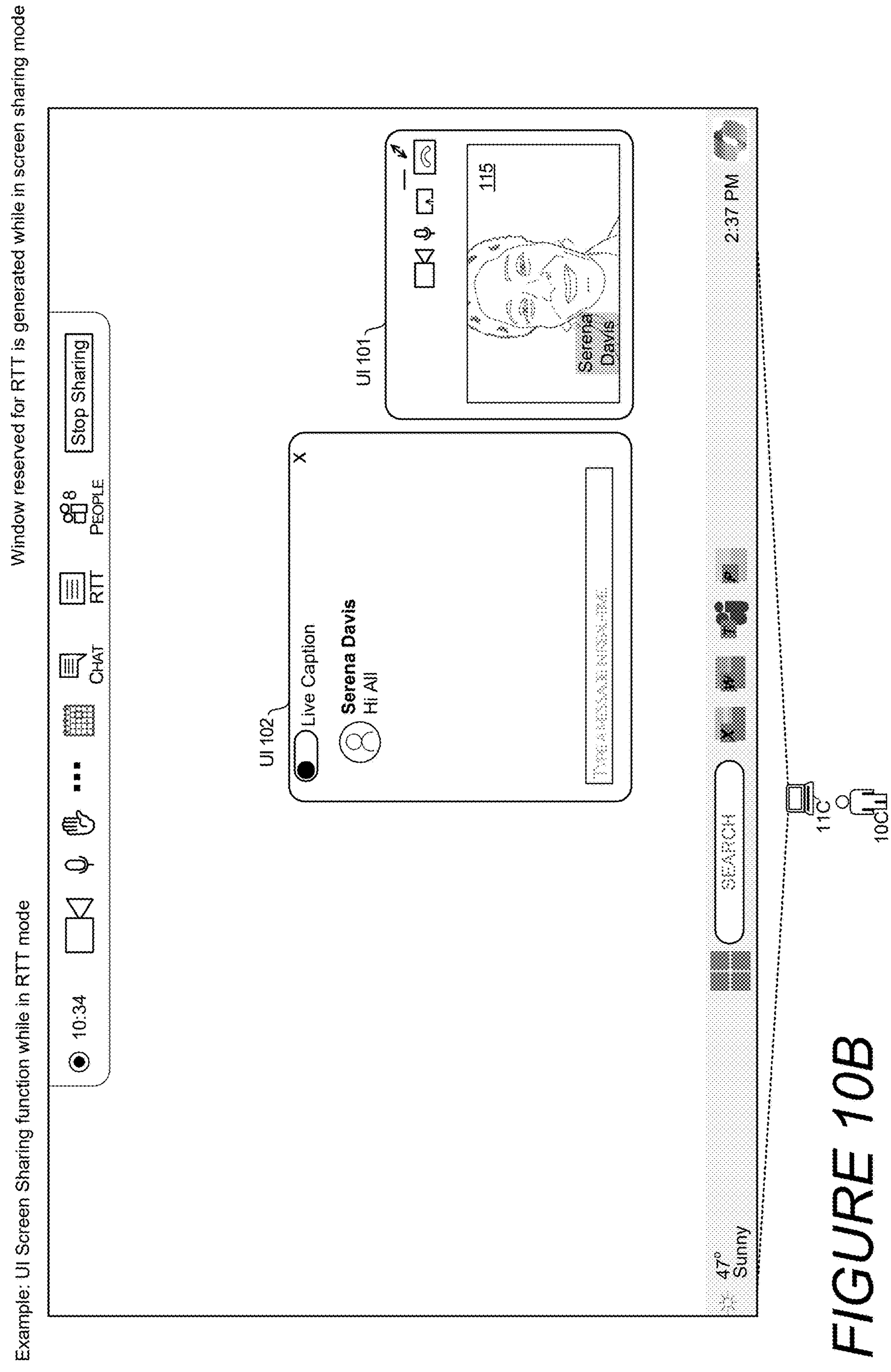
FIG. 10B pertains to a UI feature where a closed RTT window is automatically re-displayed when a user contributes RTT to a closed RTT window, this figure shows the state of a meeting that shows a meeting window and a RTT window while the user is sharing a screen.
Figure 10C:
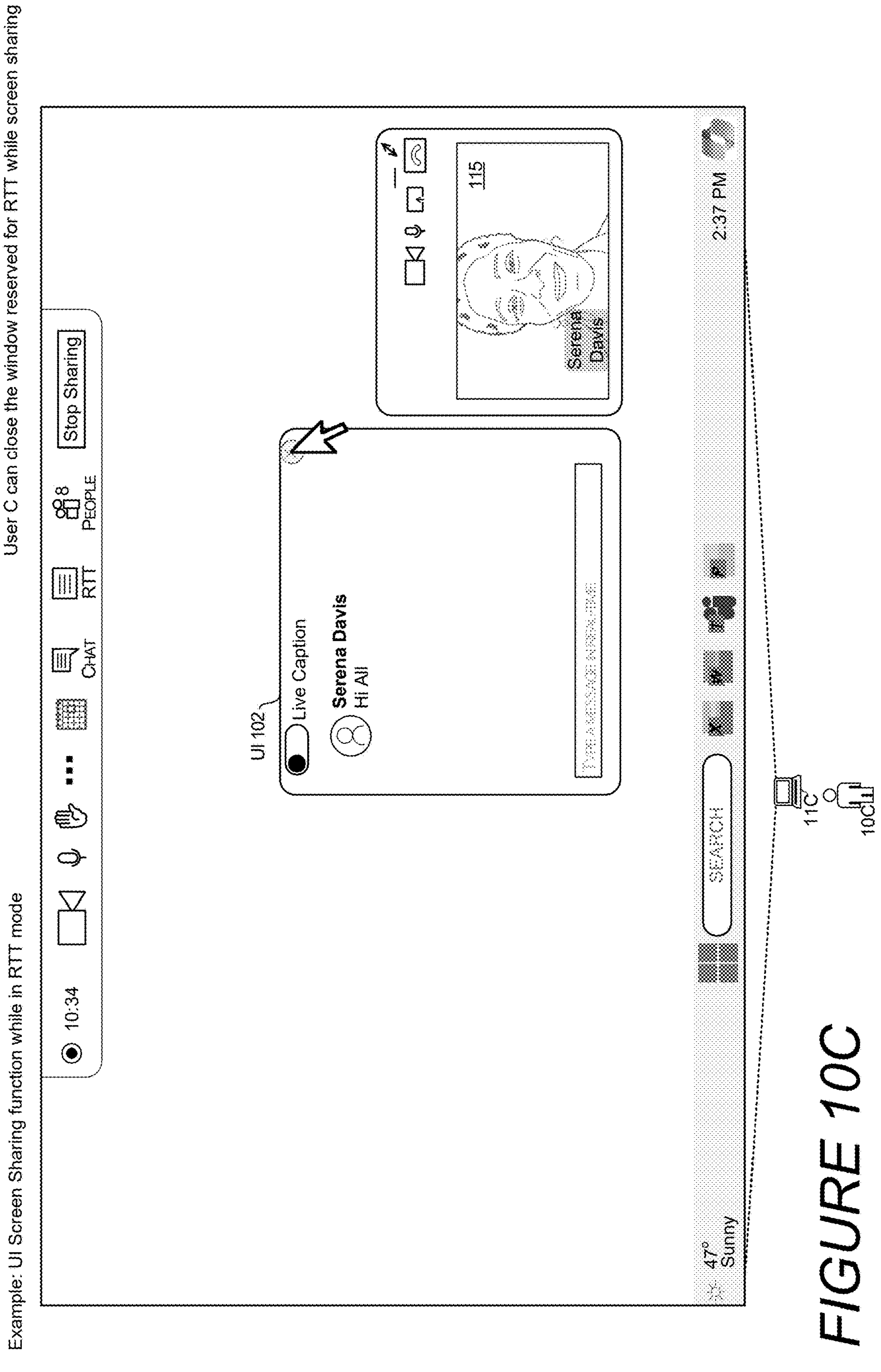
FIG. 10C pertains to a UI feature where a closed RTT window is automatically re-displayed when a user contributes RTT to a closed RTT window, this figure shows the state of a meeting where a user is providing an input to close the RTT window.
Figure 10D:
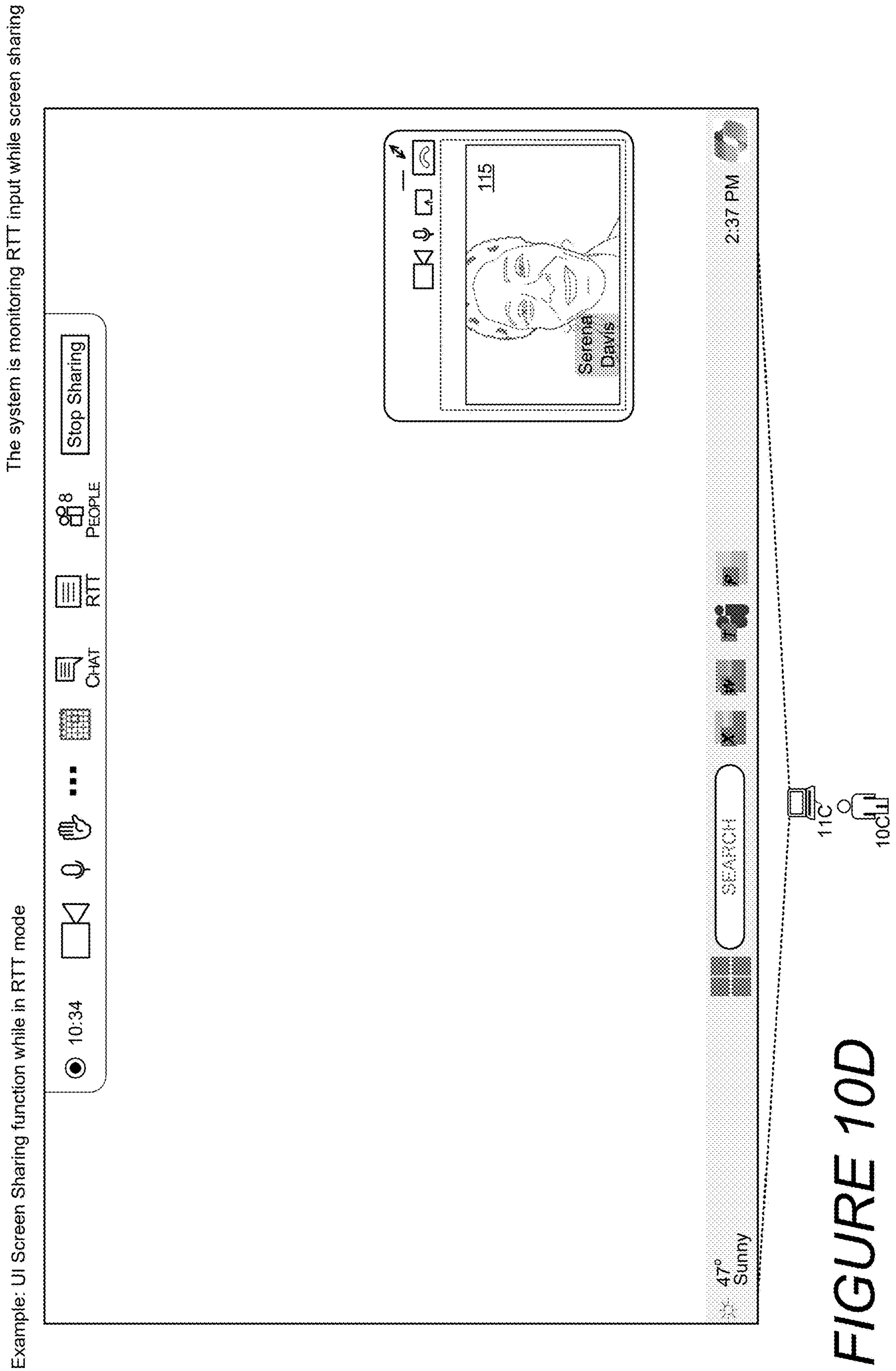
FIG. 10D pertains to a UI feature where a closed RTT window is automatically re-displayed when a user contributes RTT to a closed RTT window, this figure shows a state of the UI after the user has closed the RTT window.

Then, as shown in FIG. 10C, User C provides an input to close the RTT window, e.g., the UI 102 displaying RTT that is shared meeting participants. This may occur when User C needs to allocate more screen space for their presentation. As shown in FIG. 10D, in response to the user input, the UI 102 displaying RTT is closed. The UI 102 displaying RTT can be controlled independently from the meeting UI displaying the shared video streams and images.

Figure 10E:
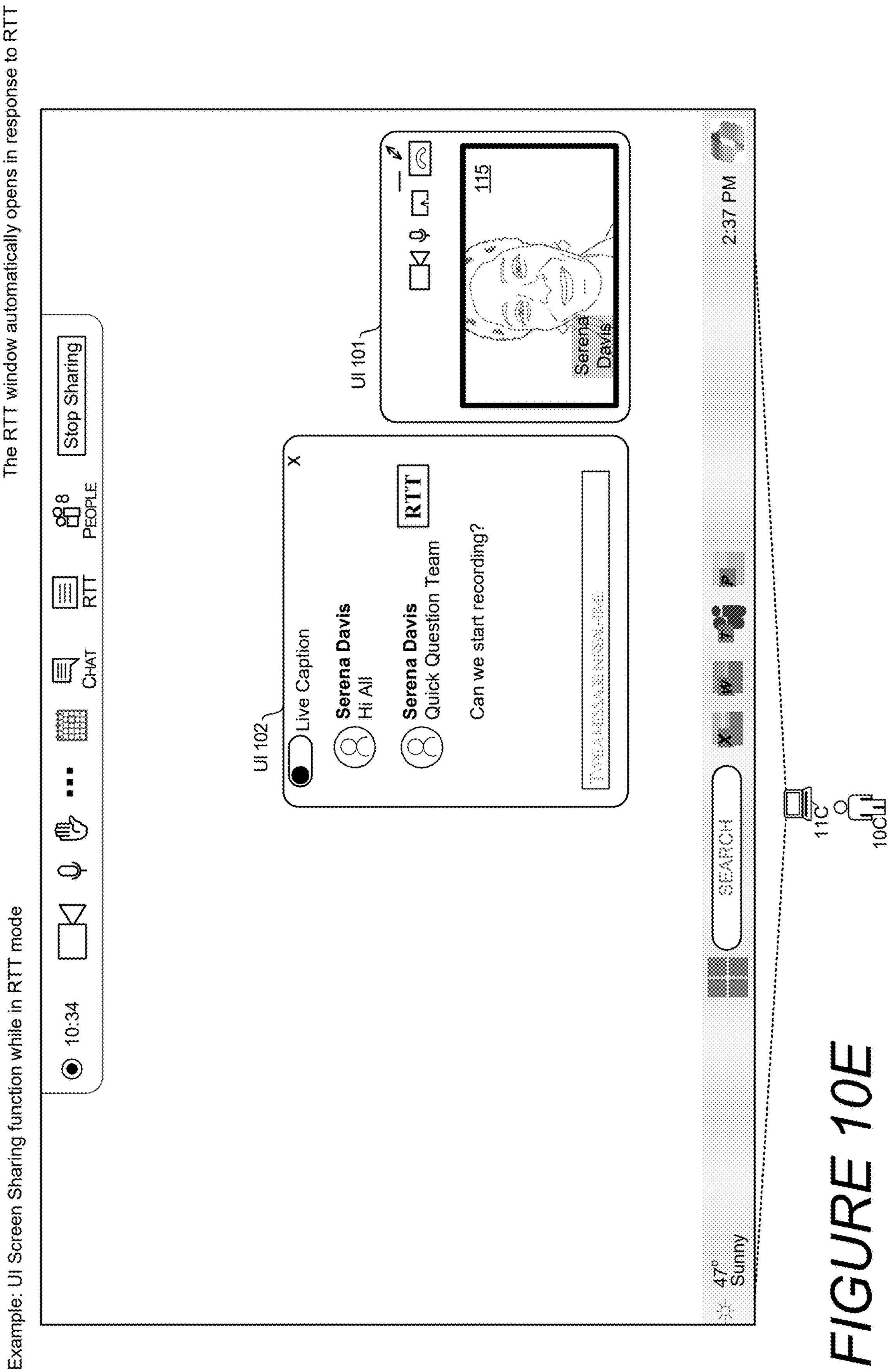
FIG. 10E pertains to a UI feature where a closed RTT window is automatically re-displayed when a user contributes RTT to a closed RTT window, wherein this figure shows a state of the UI where the RTT window is re-displayed in response to a user input that contributes new RTT.

When a UI 102 displaying the RTT is closed, the system monitors the activity of each device in the meeting. When any one of the devices receives an input to contribute RTT to the communication stream, the system re-displays (opens) the UI 102 displaying the communication stream for displaying the RTT. In this example, as shown in FIG. 10E, when User A provides an input to contribute RTT to the communication stream, the system automatically re-opens the UI 102 displaying the newly added RTT ("Quick Question Team Can we start recording?"). As shown, the newly added RTT is positioned in the communication stream. As shown, additional graphical indicators can be displayed to show the identity of the user providing the RTT and one or more labels can be displayed to show that the newly added text is RTT.

Figure 11:
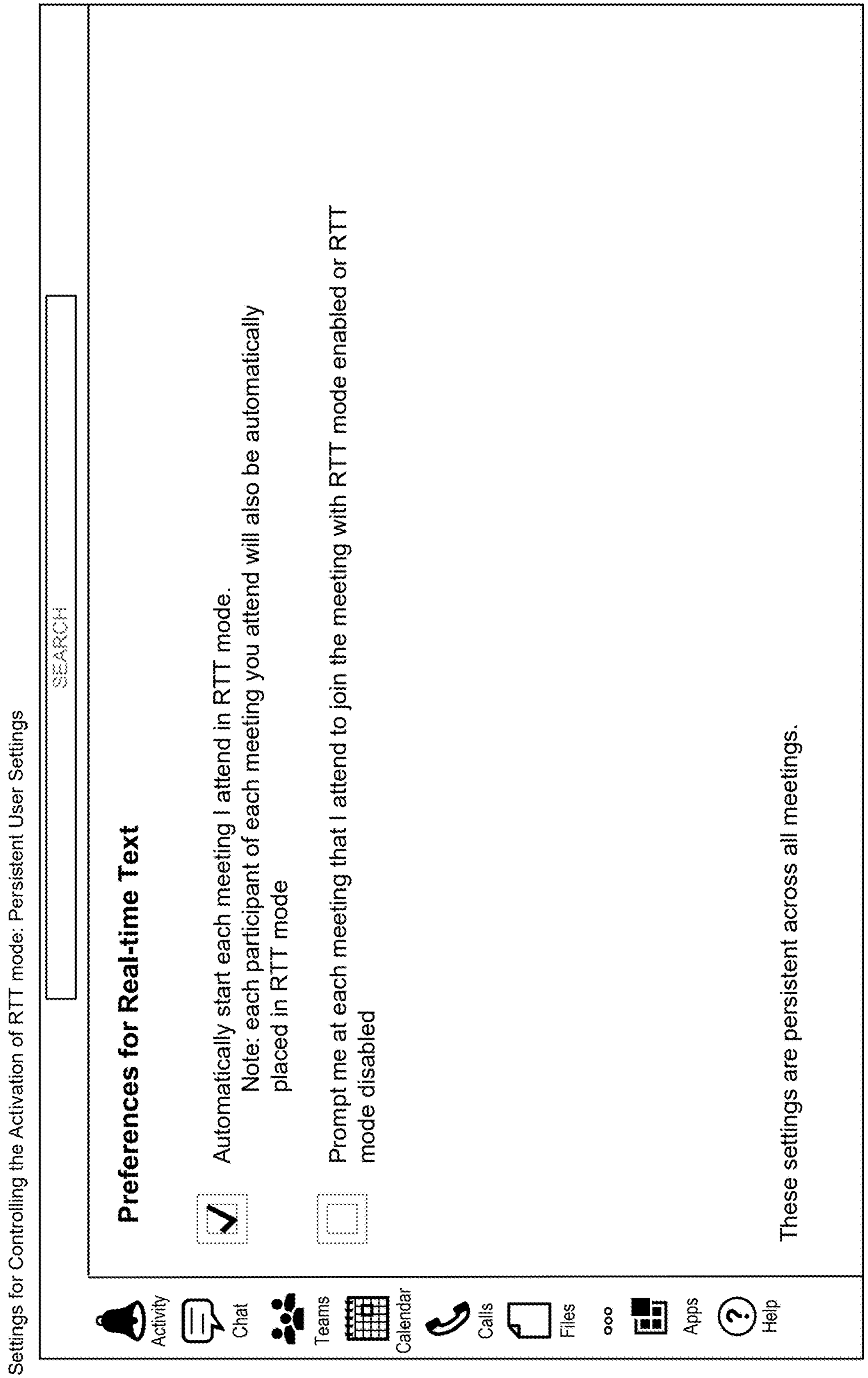
FIG. 11 shows an example of a UI that is used to set preferences for controlling the activation of RTT mode across multiple communication sessions.
Figure 12:
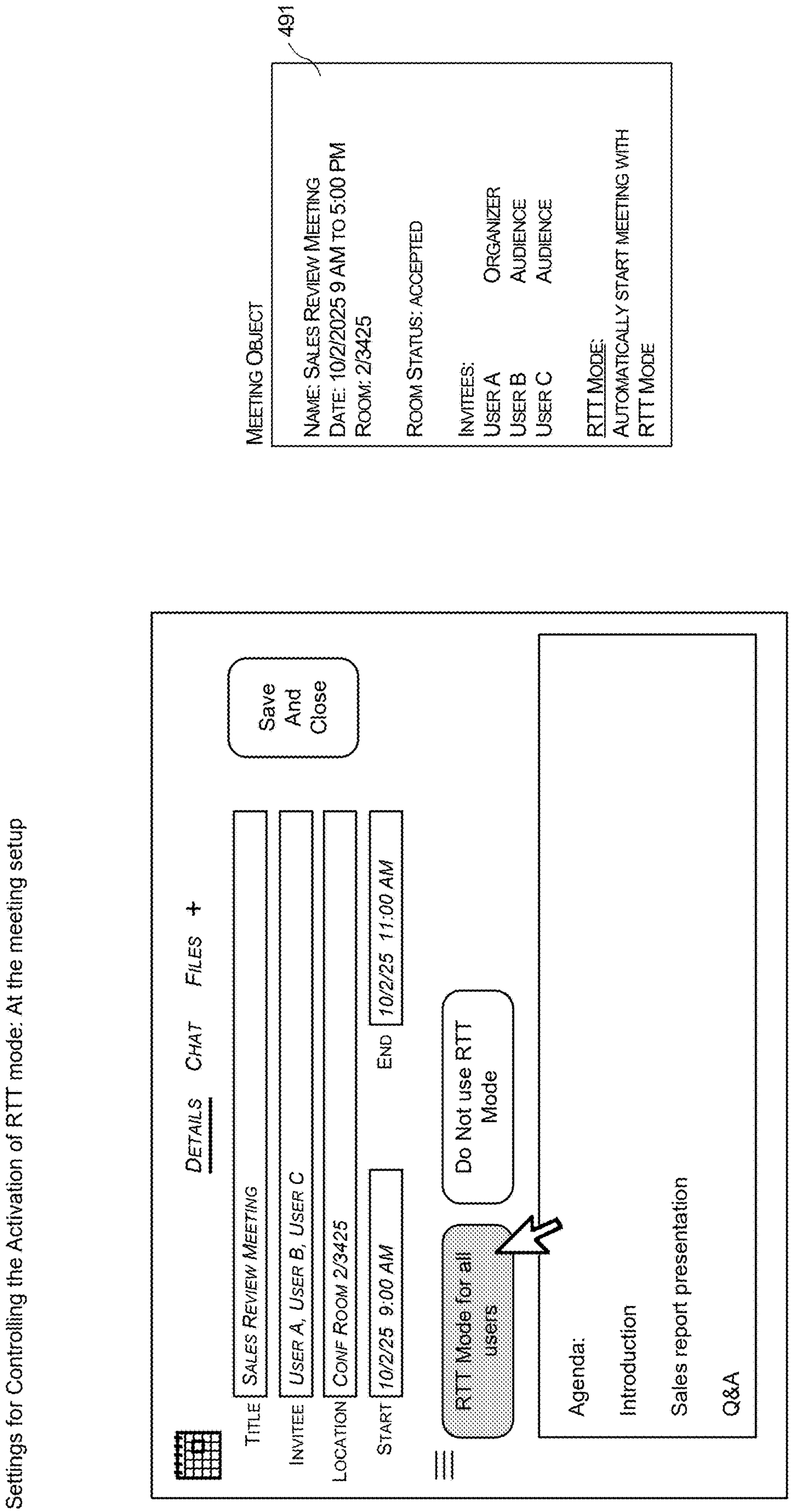
FIG. 12 shows an example of a UI that is used to set preferences for controlling the activation of RTT mode for a single communication session.
Figure 13:
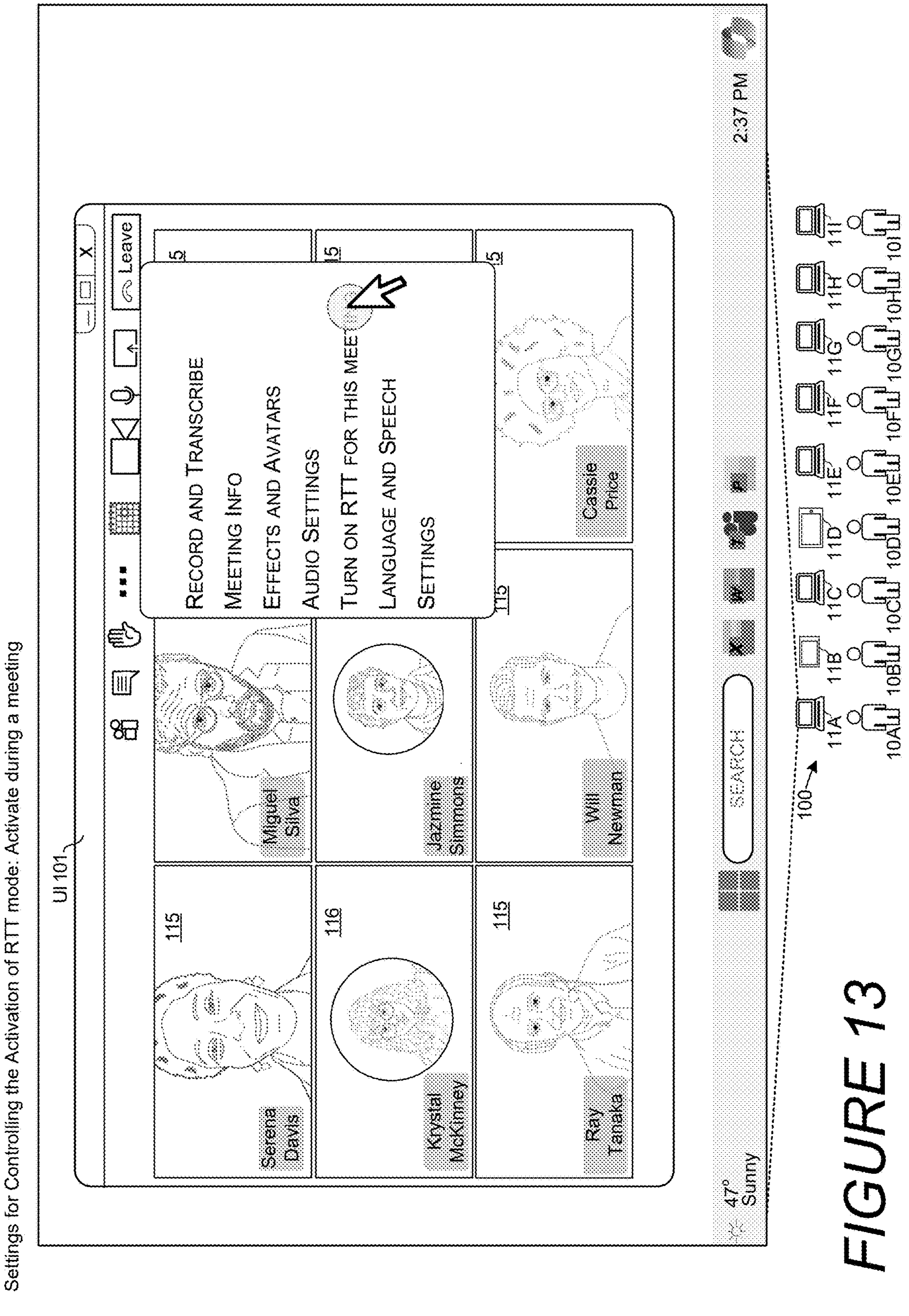
FIG. 13 shows an example of a UI that is used to activate RTT mode during a communication session.

With reference now to FIGS. 11, 12 and 13, features for controlling the activation of RTT mode is shown and described below. FIG. 11 shows an example of a UI that allows a user to configure persistent user settings. This enables the system to provide each person with settings that define individual preferences on how RTT is activated in each meeting they attend. For example, settings for a specific participant can cause a system to automatically activate RTT for all meetings that are joined by that particular user. That setting also means that, when that person joins a meeting, RTT is activated for all users in that meeting, and an RTT UI is displayed for all users of that meeting. So that each user has a universal experience in viewing, not only the content provided in the RTT, but also the speed and manner in which the text is provided by each user. The settings UI shown in FIG. 11 also allows the user to configure a setting so that the system prompts the user at the start of each meeting allowing them to activate or not activate RTT mode just before a meeting starts. These settings can be stored in a data structure that persists across multiple meetings.

FIG. 12 shows an example of a UI that allows a user to control the activation of RTT mode for a particular meeting during the meeting setup process. As shown, a meeting configuration UI includes a menu option for activating RTT mode for that particular meeting and a menu option for not activating RTT mode for that particular meeting. When the user settings are saved, the system generates a meeting object with attributes of the meeting, e.g., a title, time, date, and an attendee list, and an RTT mode setting that controls the activation of RTT mode for that particular meeting. FIG. 13 shows another an example of a UI that allows a user to control the activation of RTT mode during a meeting, similar to the other examples described herein.

Figure 14:
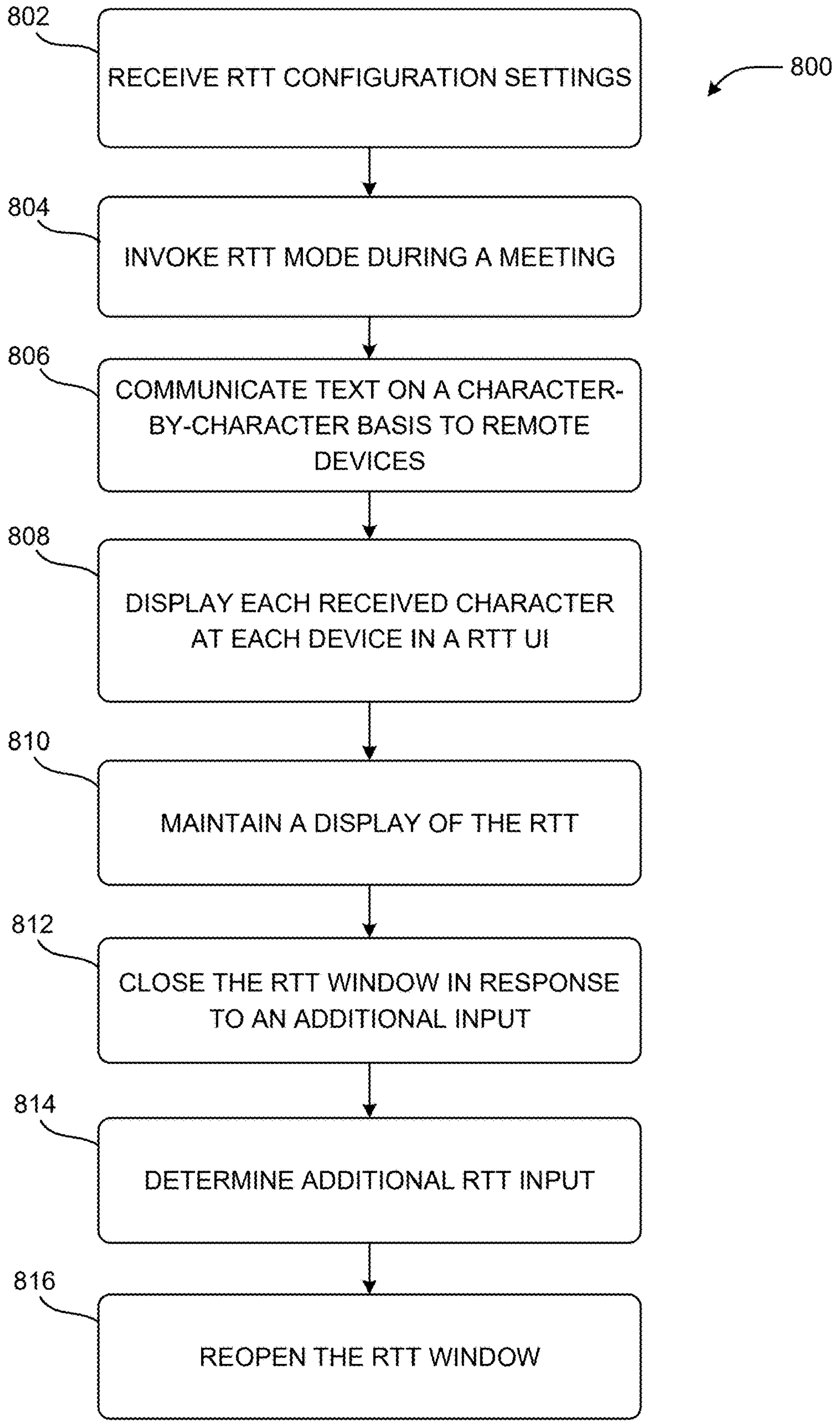
FIG. 14 is a flow diagram showing aspects of a routine for providing enhanced controls for real-time text in calls and meetings.

Turning now to FIG. 14, the following section describes aspects of a routine 800 for providing enhanced controls for the display of real-time text (RTT) in calls and meetings. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media and computer-readable media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine are described herein as being implemented, at least in part, by an application, component and/or circuit, such as a device module that can be included in any one of the memory components disclosed herein, including but not limited to RAM. In some configurations, the device module can be a dynamically linked library (DLL), a statically linked library, functionality enabled by an application programing interface (API), a compiled program, an interpreted program, a script or any other executable set of instructions. Data, such as input data or a signal from a sensor, received by the device module can be stored in a data structure in one or more memory components. The data can be retrieved from the data structure by addressing links or references to the data structure.

Although the following illustration refers to the components depicted in the present application, it can be appreciated that the operations of the routine may be also implemented in many other ways. For example, the routine may be implemented, at least in part, by a processor or circuit of another remote computer (which can be a server) or a local processor or circuit of a local computer (which can be a client device receiving a message or a client device sending the message). Any aspect of the routine, which can include the generation of a prompt, communication of any of the messages with the prompt to an Natural Language Processing (NLP) algorithm, use of an NLP algorithm, or a display of a result generated by an NLP algorithm, can be performed on either a device sending a message, a device receiving a message, or on a server managing communication of the messages for a thread. In addition, one or more of the operations of the routine may alternatively or additionally be implemented, at least in part, by a chipset working alone or in conjunction with other software modules. Any service, circuit or application suitable for providing input data indicating the state of any device may be used in operations described herein.

The routine 800 starts at operation 802, where the system receives one or more inputs defining configuration settings. This can occur using a UI that provides user setting options for RTT mode. The settings can persist across multiple communication sessions for a user. The settings define individual parameters to cause a system to invoke all meetings a person attends in RTT mode. The settings can also define individual parameters to cause a system to invoke all meetings and prompt the user to start RTT mode. Other embodiments described herein can control the activation of RTT mode by the use of specialized UIs that are used to set up individual meetings or UIs that can invoke RTT mode during a meeting.

At operation 804, the system invokes RTT mode for a meeting. As shown in FIGS. 1A-1D and FIG. 2A-2K, RTT mode is invoked in a number of ways. In one embodiment, an input is received for invoking RTT mode. In response, at operation 806, during the communication session, the system invokes a real-time text mode for generating the real-time text 111 for a message 112. The generation of the real-time text 111 includes communicating individual text characters 113 from a first computing device 11A to a number of computing devices 11B-11H of individual meeting participants 10B-10H, wherein each of the individual text characters 113 are separately transmitted from the first computing device 11A to the number of computing devices 10B-10H in response to individual input entries corresponding to each of the individual text characters 113.

The RTT is communicated and displayed on a character-by-character basis until one or more criteria are met. For instance, the RTT is communicated and displayed on a character-by-character basis until the user providing the RTT stops typing for a predetermined period of time. Once a person stops typing for a predetermined period of time, or if the user enters a predetermined key, the system causes the RTT to be stored in a communication stream in a collection of text or a message and additional RTT is not added to that collection or message if additional characters are received. If new characters are received after the person stops typing for a predetermined period of time, the new RTT is entered in a new collection of text or a new message.

At operation 808, the system causes a display of the individual text characters 113 at the number of computing devices 11B-11H of individual meeting participants. The individual text characters 113 are each displayed as they are received at each of the number of computing devices 11B-11H from the first computing device 11A. For illustrative purposes, a "communication stream" or a "conversation stream" can be a message thread, chat thread, or any other suitable data structure. The communication stream can now be provided to an AI engine as background data or as part of a prompt, or the conversation stream can be used as part of a transcript.

In operation 808, as shown in FIG. 1E, the system can generate a meeting UI that shows a stage and RTT. While in the real-time text mode, the system can cause a display of a first user interface arrangement 101 on the first computing device 11A. The first user interface arrangement 101 can include a first display area 121 reserved for displaying the real-time text 111 and a second display area 122 reserved for at least one of a video stream or an image shared between one or more computing devices 11A-11H participating in the communication session.

At operation 810, the system maintains the display of the RTT. This can occur even in response to a meeting UI being closed. If a UI includes RTT and shared content, e.g., shared images or videos, and that UI is closed, the UI maintains the display of the RTT but removes the shared content; or a new RTT UI or RTT window is generated showing the RTT without the shared content.

At operation 812, the system receives an additional input to close the RTT window. In response, the system closes or minimizes the RTT window. This can be applied to any window or UI displaying RTT. An input in any of the embodiments disclosed herein includes a voice command, a gesture input, or a device input, such as a touch surface, mouse pointer and/or a keyboard.

At operation 816, in response to the system closing or minimizing the RTT window, the system monitors activity of the computing devices 11B-11I of individual meeting participants to detect an input for contributing real-time text; and in response to detecting the input for contributing real-time text, re-opening the UI displaying the real-time text 111

In some embodiments, the operations described above can involve receiving an input to reduce a size of the first user interface arrangement (101) concurrently displaying the real-time text (111) and the at least one of the video stream (115) or the image (116) as shown in FIG. 3A. Then, as shown FIG. 3B the system can reduce the size of the meeting UI or close the meeting UI, while maintaining a display of the RTT. In response to the input to reduce the size of the first user interface arrangement (101) the system: causes a display of a second user interface arrangement (102) comprising the real-time text (111) without the at least one of a video stream (115) or an image (116), and generates generating a modified user interface arrangement (101') reducing the size of the first user interface arrangement (101), where the reduction of the size of the first user interface arrangement (101) removes the real-time text (111) from the first user interface arrangement (101), where the reduction of the size of the first user interface arrangement (101) reduces a number of the at least one of the video stream (115) or the image (116).

For illustrative purposes, the term "meeting stage" includes at least a portion of a user interface that includes the display of a video stream of one or more participants, shared files, a screenshare, or other content that is shared during a call or meeting. In some embodiments, the stage includes at least one image or video that has a rendering that is larger than other displayed renderings showing videos or representations of meeting participants. The stage can be controlled by a particular person, e.g., a presenter or administrator, with permissions to control the content that is displayed to all participants. This allows a presenter to play or pause a video, traverse through pages of a document or slide deck, etc.

Turning now to FIG. 14, a diagram illustrating an example environment 600 in which a system 602 can implement the disclosed techniques is shown. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 603. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603. A communication session 603 can include a call, which can be a direct call from a person to others, a communication session 603 can also include a meeting, which is an appointment that is established by a calendar event defining attendees.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds can be communicated with the messages.

The system 602 of FIG. 14 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses. Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a vocal input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 14 illustrates that client computing device 606(1) is in some way connected to a display device (e.g., a display screen 629(N)), which can display a UI according to the techniques described herein.

In the example environment 600 of FIG. 14, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 14) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 14, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer. The content 650 also include input data from each user, which can be used to control a direction and location of a representation. The content can also include instructions for sharing data and identifiers for recipients of the shared data. Thus, the content 650 is also referred to herein as input data 650 or an input 650.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 15:
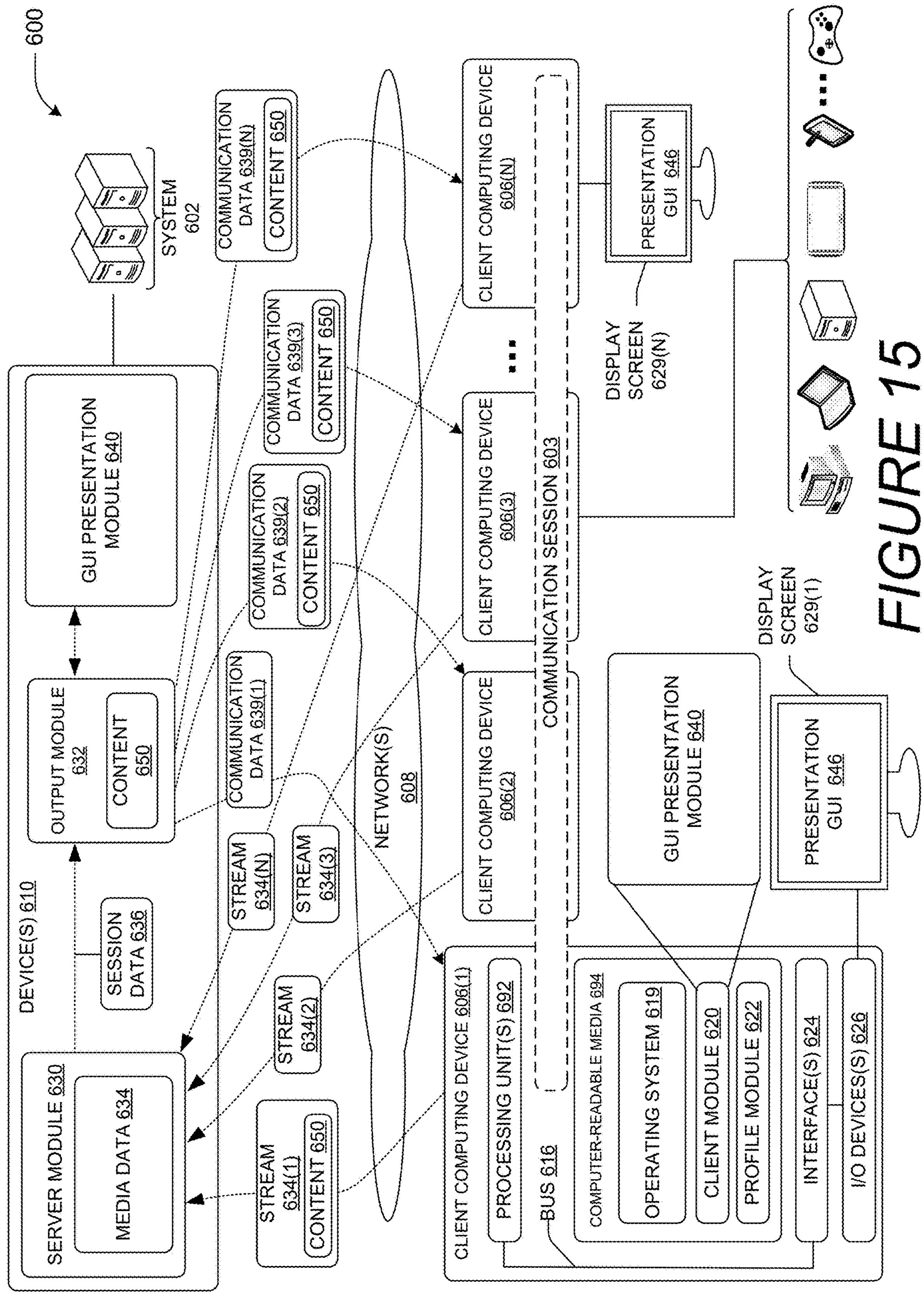
FIG. 15 is a diagram illustrating a distributed computing environment capable of implementing aspects of the techniques and technologies presented herein.
Figure 16:
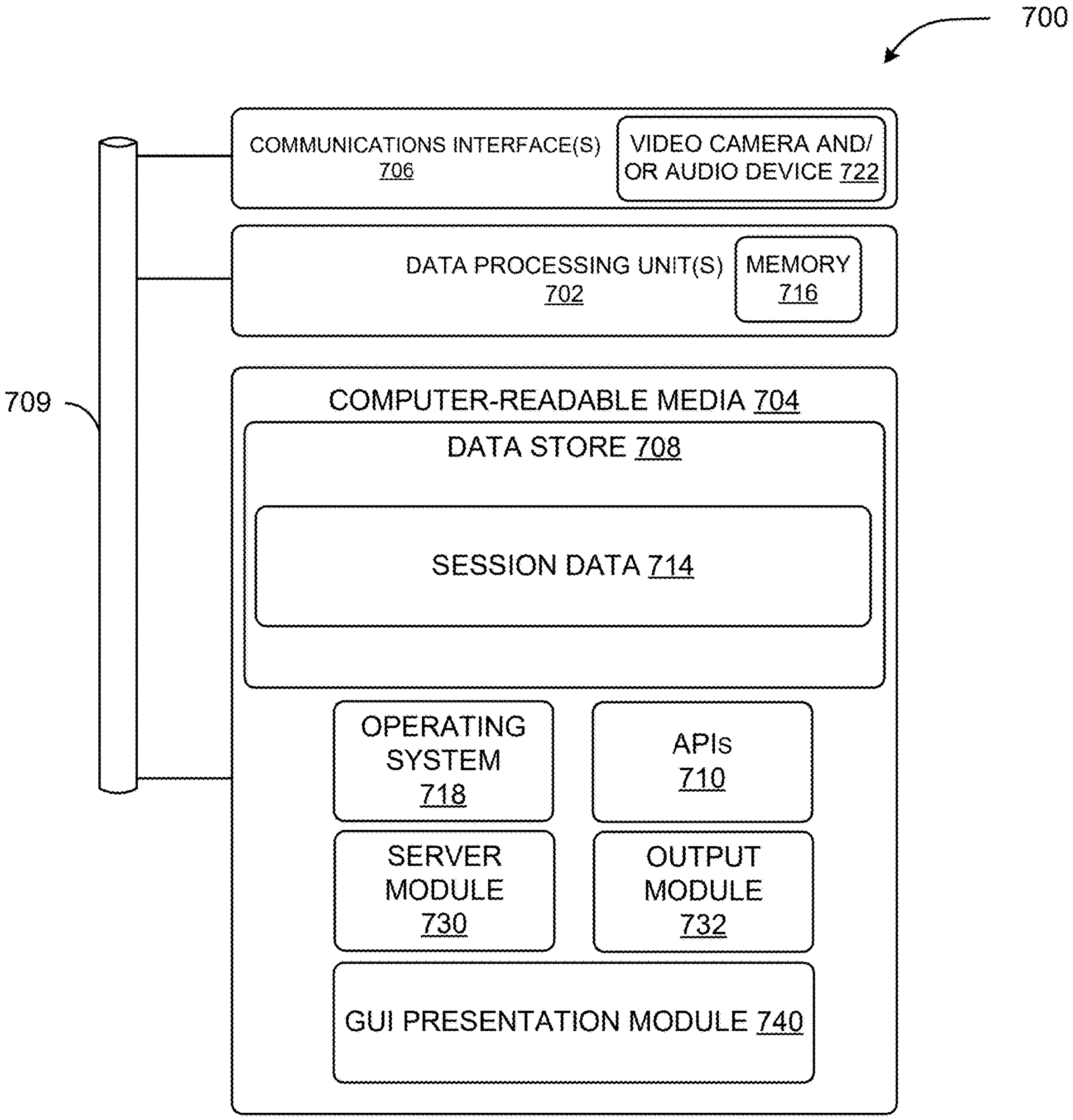
FIG. 16 is a computer architecture diagram illustrating a computing device architecture for a computing device capable of implementing aspects of the techniques and technologies presented herein.

FIG. 15 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, computer-readable storage medium, computer-readable storage device, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store the primary calendar and secondary calendar, and other session data that show the status and activity level of each user. The session data can include a total number of participants (e.g., users and/or client computing devices) in a communication session, activity that occurs in the communication session, a list of invitees to the communication session, and/or other data related to when and how the communication session is conducted or hosted. The data store 708 may also include session data 714, such as the meeting objects described herein. The session data 714 can also include video, audio, or other content that can be shared in a meeting. The session data can also include permissions for each user. For example, session data can indicate that past meetings included users having speaker roles and other roles. This data can also indicate preferences, e.g., that a user wants to join meetings with RTT activated for each meeting or only certain events having attributes that meet one more criteria, e.g., with predetermined invitees or meetings having shared content having a predetermined subject. The permissions can define specific instructions that are permitted and restricted during different states of a meeting or call that is in progress. For example, based on a role in a meeting, e.g., organizer or administrator, some users may have permissions to start or stop the RTT mode in a meeting, while others are restricted from such operations.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A method, executed by a data processing system, for controlling a user interface of a communication session comprising a display of the real-time text communicated to meeting participants, the method comprising:

during the communication session, invoking a real-time text mode for generating the real-time text, the generation of the real-time text comprising:

communicating individual text characters from a first computing device to a plurality of computing devices of individual meeting participants on a character-by-character basis, wherein each of the individual text characters are separately transmitted from the first computing device to the plurality of computing devices in response to individual character input entries received at the first computing device, and causing a display of the individual text characters at the plurality of computing devices of individual meeting participants, wherein the individual text characters are each displayed as they are received at each of the plurality of computing devices from the first computing device;

while in the real-time text mode:

causing a display of a first user interface arrangement on the first computing device, wherein the first user interface arrangement comprising a first display region reserved for displaying the real-time text and a second display region reserved for displaying at least one of a video stream or an image shared between computing devices participating in the communication session;

receiving an input to reduce a size of the first user interface arrangement concurrently displaying the real-time text and the at least one of the video stream or the image;

in response to the input to reduce the size of the first user interface arrangement, maintaining the display of the real-time text while, reducing the size of the first user interface arrangement, wherein the reduction of the size of the first user interface arrangement reduces a size of the at least one of the video stream or the image or a number of displayed video streams or images.

2. The method of claim 1, further comprising: determining that the plurality of computing devices includes all of the computing devices of the communication session.

3. The method of claim 1, wherein maintaining the display of the real-time text while reducing the size of the first user interface arrangement, comprises:

causing a display of a second user interface arrangement comprising the real-time text without the at least one of a video stream or an image, and generating a modified user interface arrangement having a reduced size relative to a size of the first user interface arrangement, wherein the modified user interface arrangement comprises a fewer number of video streams or images than a number of video streams or images of the first user interface arrangement.

4. The method of claim 1, wherein maintaining the display of the real-time text while reducing the size of the first user interface arrangement, comprises:

causing a display of a second user interface arrangement comprising the real-time text without the at least one of a video stream or an image, and generating a modified user interface arrangement having selectable graphical elements for controlling the communication session, wherein the modified user interface arrangement does not include the at least one of the video stream or the image.

5. The method of claim 1, wherein maintaining the display of the real-time text while reducing the size of the first user interface arrangement, comprises:

causing a display of a second user interface arrangement comprising the real-time text without the at least one of a video stream or an image, and reducing the size of the first user interface arrangement, comprises removing the display of the first user interface arrangement.

6. The method of claim 1, further comprising: generating an audio signal comprising a computer-generated voice enunciating the real-time text received at each client device of the communication session.

7. The method of claim 1, further comprising:

generating a graphical element in proximity to a video rendering, an image, or an identifier to bring visual focus to a user associated with the first computing device receiving the character input for the real-time text;

determining that the character input for the real-time text has stopped for a predetermined period of time; and in response to determining that the character input for the real-time text has stopped for a predetermined period of time:

removing the graphical element, and adding the real-time text to a communication stream as a timestamped entry, wherein the entry is restricted from an addition of real-time text characters.

8. The method of claim 1, further comprising:

activating a live caption mode in response to an input; and while in live caption mode:

processing a vocal input from a second computing device participating in the communication session, wherein the vocal input is processed to generate live caption text comprising words that are enunciated in the vocal input, and adding the live caption text to a communication stream that also includes the real-time text.

9. The method of claim 1, further comprising:

receiving an input to close the display of the real-time text that is maintained after the input to reduce the size of the first user interface arrangement;

in response to the input to close the display of the real-time text, closing a UI displaying the real-time text that is maintained after the input to reduce the size of the first user interface arrangement;

in response to closing the UI displaying the real-time text, monitoring activity of the computing devices of individual meeting participants to detect an input for contributing real-time text; and in response to detecting the input for contributing real-time text, re-opening the UI displaying the real-time text.

10. A system for controlling a user interface of a communication session comprising a display of the real-time text communicated to meeting participants, the system comprising:

one or more processing units; and a computer-readable storage medium having encoded thereon computer-executable instructions to cause the one or more processing units to:

during the communication session, invoke a real-time text mode for generating the real-time text, the generation of the real-time text comprising:

communicating individual text characters from a first computing device to a plurality of computing devices of individual meeting participants on a character-by-character basis, wherein each of the individual text characters are separately transmitted from the first computing device to the plurality of computing devices in response to individual character input entries received at the first computing device, and causing a display of the individual text characters at the plurality of computing devices of individual meeting participants, wherein the individual text characters are each displayed as they are received at each of the plurality of computing devices from the first computing device;

while in the real-time text mode:

cause a display of a first user interface arrangement on the first computing device, wherein the first user interface arrangement comprising a first display region reserved for displaying the real-time text and a second display region reserved for displaying at least one of a video stream or an image shared between computing devices participating in the communication session;

receive an input to reduce a size of the first user interface arrangement concurrently displaying the real-time text and the at least one of the video stream or the image;

in response to the input to reduce the size of the first user interface arrangement, maintain the display of the real-time text while, reduce the size of the first user interface arrangement, wherein the reduction of the size of the first user interface arrangement reduces a size of the at least one of the video stream or the image or a number of displayed video streams or images.

11. The system of claim 10, wherein maintaining the display of the real-time text and reducing the size of the first user interface arrangement, comprises:

causing a display of a second user interface arrangement comprising the real-time text without the at least one of a video stream or an image, and generating a modified user interface arrangement having a reduced size relative to a size of the first user interface arrangement, wherein the modified user interface arrangement comprises a fewer number of video streams or images than a number of video streams or images of the first user interface arrangement.

12. The system of claim 10, wherein maintaining the display of the real-time text while reducing the size of the first user interface arrangement, comprises:

causing a display of a second user interface arrangement comprising the real-time text without the at least one of a video stream or an image, and generating a modified user interface arrangement having selectable graphical elements for controlling the communication session, wherein the modified user interface arrangement does not include the at least one of the video stream or the image.

13. The system of claim 10, wherein maintaining the display of the real-time text while reducing the size of the first user interface arrangement, comprises:

causing a display of a second user interface arrangement comprising the real-time text without the at least one of a video stream or an image, and reducing the size of the first user interface arrangement, comprises removing the display of the first user interface arrangement.

14. The system of claim 10, wherein the instructions further cause the one or more processing units to: generate an audio signal comprising a computer-generated voice enunciating the real-time text received at each client device of the communication session.

15. The system of claim 10, wherein the instructions further cause the one or more processing units to:

generate a graphical element in proximity to a video rendering, an image, or an identifier to bring visual focus to a user associated with the first computing device receiving the character input for the real-time text;

determine that the character input for the real-time text has stopped for a predetermined period of time; and in response to determining that the character input for the real-time text has stopped for a predetermined period of time:

remove the graphical element, and add the real-time text to a communication stream as a timestamped entry, wherein the entry is restricted from an addition of real-time text characters.

16. A computer-readable storage medium having encoded thereon computer-executable instructions that cause a data processing system to control a user interface of a communication session comprising a display of the real-time text communicated to meeting participants, the computer-executable instructions causing the one or more processing units of the data processing system to:

during the communication session, invoke a real-time text mode for generating the real-time text, the generation of the real-time text comprising:

communicating individual text characters from a first computing device to a plurality of computing devices of individual meeting participants on a character-by-character basis, wherein each of the individual text characters are separately transmitted from the first computing device to the plurality of computing devices in response to individual character input entries received at the first computing device, and causing a display of the individual text characters at the plurality of computing devices of individual meeting participants, wherein the individual text characters are each displayed as they are received at each of the plurality of computing devices from the first computing device;

while in the real-time text mode:

cause a display of a first user interface arrangement on the first computing device, wherein the first user interface arrangement comprising a first display region reserved for displaying the real-time text and a second display region reserved for displaying at least one of a video stream or an image shared between computing devices participating in the communication session;

receive an input to reduce a size of the first user interface arrangement concurrently displaying the real-time text and the at least one of the video stream or the image;

in response to the input to reduce the size of the first user interface arrangement, maintain the display of the real-time text while, reduce the size of the first user interface arrangement, wherein the reduction of the size of the first user interface arrangement reduces a size of the at least one of the video stream or the image or a number of displayed video streams or images.

17. The computer-readable storage medium of claim 16, wherein maintaining the display of the real-time text and reducing the size of the first user interface arrangement, comprises:

causing a display of a second user interface arrangement comprising the real-time text without the at least one of a video stream or an image, and generating a modified user interface arrangement having a reduced size relative to a size of the first user interface arrangement, wherein the modified user interface arrangement comprises a fewer number of video streams or images than a number of video streams or images of the first user interface arrangement.

18. The computer-readable storage medium of claim 16, wherein maintaining the display of the real-time text while reducing the size of the first user interface arrangement, comprises:

causing a display of a second user interface arrangement comprising the real-time text without the at least one of a video stream or an image, and generating a modified user interface arrangement having selectable graphical elements for controlling the communication session, wherein the modified user interface arrangement does not include the at least one of the video stream or the image.

19. The computer-readable storage medium of claim 16, wherein maintaining the display of the real-time text while reducing the size of the first user interface arrangement, comprises:

causing a display of a second user interface arrangement comprising the real-time text without the at least one of a video stream or an image, and reducing the size of the first user interface arrangement, comprises removing the display of the first user interface arrangement.

20. The computer-readable storage medium of claim 16, wherein the instructions further cause the one or more processing units to: generate an audio signal comprising a computer-generated voice enunciating the real-time text received at each client device of the communication session.

* * * * *